(12) United States Patent
Felch

(10) Patent No.: US 9,110,826 B2
(45) Date of Patent: Aug. 18, 2015

(54) MEMORY ALLOCATION IN A SYSTEM USING MEMORY STRIPING

(71) Applicant: Cognitive Electronics, Inc., Boston, MA (US)

(72) Inventor: Andrew C. Felch, Palo Alto, CA (US)

(73) Assignee: Cognitive Electronics, Inc., Boston, MA (US)

( * ) Notice: Subject to any disclaimer, the term of this patent is extended or adjusted under 35 U.S.C. 154(b) by 0 days.

(21) Appl. No.: 14/209,632

(22) Filed: Mar. 13, 2014

(65) Prior Publication Data

US 2014/0281362 A1 Sep. 18, 2014

Related U.S. Application Data

(60) Provisional application No. 61/792,013, filed on Mar. 15, 2013.

(51) Int. Cl.
G06F 12/06 (2006.01)
G06F 12/10 (2006.01)
G06F 9/26 (2006.01)

(52) U.S. Cl.
CPC ........ G06F 12/1009 (2013.01); G06F 12/1027 (2013.01)

(58) Field of Classification Search
CPC ........ G06F 12/0292; G06F 9/26; G06F 12/06
USPC ............................... 711/206–207, 202; 710/3
See application file for complete search history.

(56) References Cited

U.S. PATENT DOCUMENTS

| | | | | |
|---|---|---|---|---|
| 6,976,174 | B2 * | 12/2005 | Terrell et al. | 726/22 |
| 7,370,174 | B2 * | 5/2008 | Arizpe et al. | 711/206 |
| 7,752,417 | B2 * | 7/2010 | Manczak et al. | 711/209 |
| 2006/0149919 | A1 * | 7/2006 | Arizpe et al. | 711/206 |
| 2007/0283125 | A1 * | 12/2007 | Manczak et al. | 711/207 |
| 2014/0129799 | A1 * | 5/2014 | Fleischer et al. | 711/207 |
| 2014/0281362 | A1 * | 9/2014 | Felch | 711/206 |
| 2014/0281366 | A1 * | 9/2014 | Felch | 711/207 |

\* cited by examiner

*Primary Examiner* — Christopher Shin
(74) *Attorney, Agent, or Firm* — Wolf, Greenfield & Sacks, P.C.

(57) ABSTRACT

A system and associated methods are disclosed for allocating memory in a system providing translation of virtual memory addresses to physical memory addresses in a parallel computing system using memory striping. One method comprises: receiving a request for memory allocation, identifying an available virtually-contiguous physically-non-contiguous memory region (VCPNCMR) of at least the requested size, where the VCPNCMR is arranged such that physical memory addresses for the VCPNCMR may be derived from a corresponding virtual memory addresses by shifting a contiguous set of bits of the virtual memory address in accordance with information in a matching row of a virtual memory address matching table, and combining the shifted bits with high-order physical memory address bits also associated with the determined matching row and with low-order bits of the virtual memory address, and providing to the requesting process a starting address of the identified VCPNCMR.

20 Claims, 48 Drawing Sheets

MEMORY ALLOCATION IN A SYSTEM USING MEMORY STRIPING

CROSS-REFERENCE TO RELATED APPLICATION

This application claims the benefit of U.S. Provisional Application No. 61/792,013, filed Mar. 15, 2013.

FIELD OF THE INVENTION

This invention relates to allocation of memory in parallel processing computer systems. In particular, this invention relates to allocation of virtually-contiguous physically-non-contiguous memory regions spanning multiple memory banks, processors, cards, and servers using a virtual-to-physical address mapping scheme that provides efficient storage of available memory regions and efficient translation of memory addresses.

BACKGROUND OF THE INVENTION

A particularly compute-intensive activity, employing large arrays of computers, is the performance of searches of the World Wide Web (the "Web"). Google and other companies implement "search engines," which sort through interconnected web sites and their underlying content from Internet-connected sources all over the world. Within fractions of a second of receiving a search request, a search engine typically returns to the requesting client a listing of applicable sites and textual references. Search engines exploit the massive parallelism of their search algorithms, dividing up web pages amongst their servers such that each server is responsible for searching only a tiny fraction of the Internet.

It is often desirable for processes of a parallel computing task, such as search, to share a single memory address space. However, it would highly inefficient for thousands of separate processors to access a single unified physical memory bank.

What is needed is a system that provides parallel processing with a single virtual memory address space, but the ability to make efficient use of memory local to each processor when possible.

SUMMARY OF THE INVENTION

A system and associated methods are disclosed for allocating memory in a system providing translation of virtual memory addresses to physical memory addresses in a parallel computing system using memory striping. One method comprises: receiving a request for memory allocation, identifying an available virtually-contiguous physically-non-contiguous memory region (VCPNCMR) of at least the requested size, where the VCPNCMR is arranged such that physical memory addresses for the VCPNCMR may be derived from a corresponding virtual memory addresses by shifting a contiguous set of bits of the virtual memory address in accordance with information in a matching row of a virtual memory address matching table, and combining the shifted bits with high-order physical memory address bits also associated with the determined matching row and with low-order bits of the virtual memory address, and providing to the requesting process a starting address of the identified VCPNCMR.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

DETAILED DESCRIPTION OF THE INVENTION

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

Figure 1:
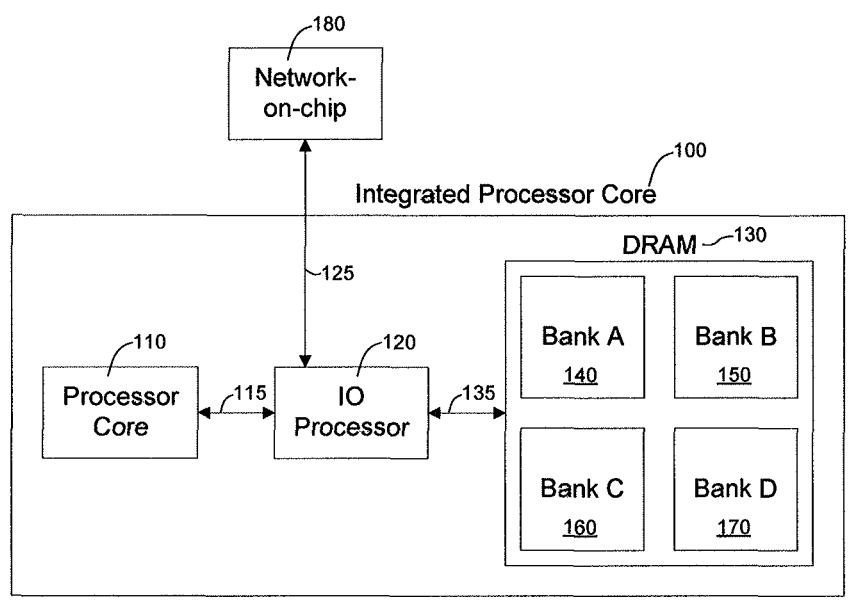
FIG. 1 is a simplified diagram of an embodiment of an integrated processor core.

FIG. 1 depicts an integrated processor core 100, including a processor core 110 communicating bidirectionally via connection 115 with an IO processor 120. The IO processor 120 communicates bidirectionally with a DRAM memory 130 containing four banks, Bank A 140, Bank B 150, Bank C 160 and Bank D 170. The IO processor 120 is the interface through which the DRAM memory 130 and the processor core 110 communicate with the Network-on-chip 180. The IO processor 120 is enabled to perform this communication through bidirectional connection 125. The network-on-chip enables connected Integrated Processor Core(s) 100 and its components to communicate with the outside world.

Figure 2:
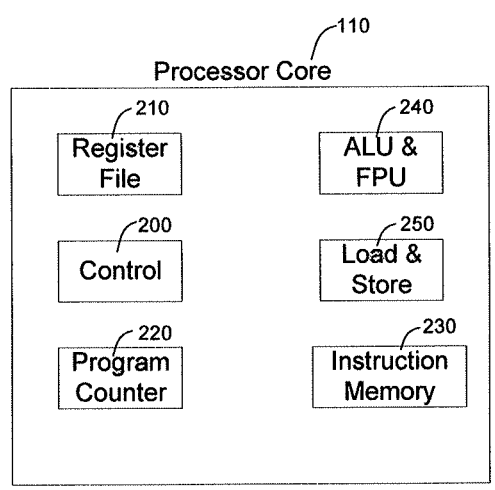
FIG. 2 is a simplified diagram of an embodiment of a processor core of the integrated processor core of FIG. 1.

FIG. 2 depicts an embodiment of a processor core 110 and its constituent components 200-250. The components of the processor core 110 include a register file 210, a control unit 200, a program counter 220, an arithmetic logic unit (ALU) & floating point unit (FPU) 240, Load & Store unit 250, and Instruction memory 230. The register file 210 may have multiple ports, such as two read ports and one write port. The register file may have a word width of, for example, 32 bits or 64 bits, or a larger width such as 128 bits, 256 bits, or 512 bits in the case of a processor core 110 optimized for SIMD execution. The register file 210 may have relatively few entries, such as four (4), or a large number of entries, such as one hundred twenty eight (128) entries, which is sometimes typical in SIMD-optimized architectures like the CELL processor. In one embodiment the register file 210 has sixty-four (64) entries of 64-bit words so that double-precision data can be operated upon efficiently, and re-usable values can be held in the significantly-sized register file 210 of sixty four (64) entries in order to reduce communication with the memory 130 and the network-on-chip 180, which would otherwise put pressure on connections 115, 125, and 135 and the IO processor 120, and potentially result in bandwidth-limited performance.

In another embodiment, the register file 210 has four (4) read ports and two (2) write ports, and the ALU & FPU 240 can operate on two sets of two inputs and produce two outputs. Thus, with four read ports and two write ports the register file 210 is enabled to feed the ALU & FPU 240 the maximum number of values that can be received and write the maximum number of values that can be produced by the ALU & FPU 240. The Load & Store Unit 250 interfaces with the IO processor 120 and allows the processor core 110 to communicate with elements outside of the processor core 110. The control unit 200 directs the flow of processing within the processor core 110 such as sending the program counter 220 to the instruction memory 230 in order to fetch the next instruction of a computer program.

Figure 3:
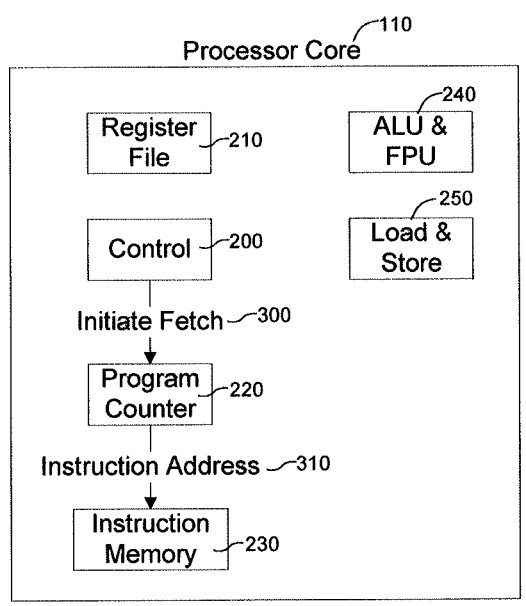
FIG. 3 is an illustration of the beginning of an exemplary instruction cycle of the processor core of FIG. 2.

FIG. 3 depicts the beginning of an exemplary instruction cycle. The control unit 200 of a processor core 110 sends the signal "Initiate Fetch" 300 to the program counter unit 220, which in turn sends the "Instruction Address" 310 communication to the Instruction memory 230. In this step of the instruction cycle, the register file 210, ALU & FPU 240, and Load & Store unit 250 are not performing operations for the instruction cycle.

Figure 4:
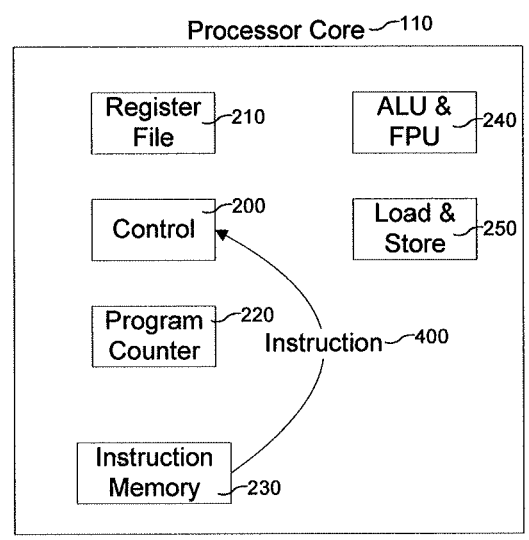
FIG. 4 is an illustration of another portion of an instruction cycle of the processor core of FIG. 2.

FIG. 4 depicts the second step in the exemplary instruction cycle of a processor core 110, wherein the Instruction Memory 230 sends an Instruction communication 400 to the control unit 200. In this stage of the example instruction cycle, the program counter 220, register file 210, ALU & FPU 240, and Load & Store unit 250 are not performing operations for the example instruction cycle.

Figure 5:
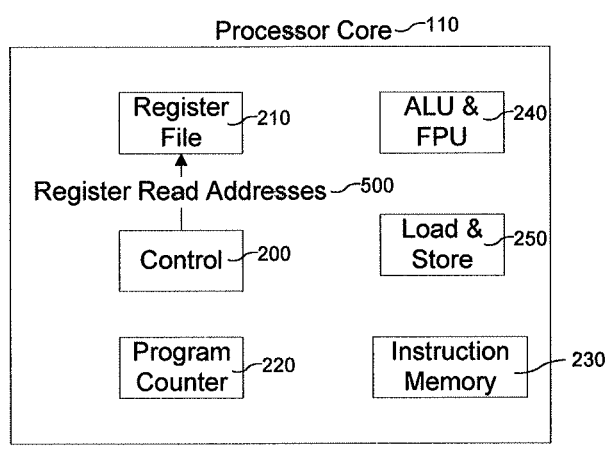
FIG. 5 is an illustration of another portion of an instruction cycle of the processor core of FIG. 2.

FIG. 5 depicts the third step of the exemplary instruction cycle being performed in the processor core 110. In this step, the control unit 200 sends the Register Read Addresses communication 500 to the Register File 210. The Control unit 200 determines the Register Read Addresses communication 500 based on the Instruction communication 400. In this step of the exemplary instruction cycle the program counter 220, ALU & FPU 240, Load & Store Unit 250, and Instruction Memory 230 are not performing operations for the exemplary instruction cycle.

Figure 6:
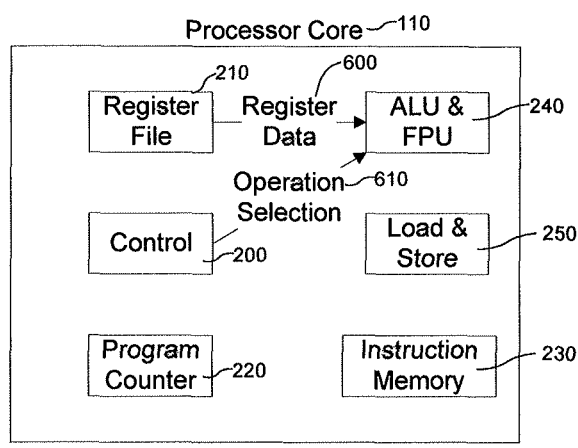
FIG. 6 is an illustration of another portion of an instruction cycle of the processor core of FIG. 2.

FIG. 6 depicts the fourth step of the exemplary instruction cycle being performed in the processor core 110. Here the Register File 210 sends the Register Data communication 600 to the ALU & FPU 240. The Register Data 600 may be, for example, two values such as the two inputs to an addition operation or the two inputs to a multiplication operation. The data sent by the Register File 210 is determined by fetching data from a memory internal to the Register File 210 from the address designated by the Register Read Addresses communication 500 it has received. Because the ALU & FPU 240 can handle both integer and floating point data, the Register Data 600 sent from the Register File 210 may be integer data or it may be floating point data.

The Control unit 200 sends the Operation Selection communication 610 to the ALU & FPU 240, which selects what operation (or operations) should be performed by the ALU & FPU 240 on the Register Data 600 inputs. The Control unit 200 determines the Operation Selection communication 610 from the Instruction communication 400. The ALU & FPU 240 then performs the operation(s) designated by the Operation Selection 610 communication on the Register Data 600 inputs. The Program Counter 220, Load & Store unit 250, and Instruction Memory 230 do not perform operations during this stage of the exemplary instruction cycle.

Figure 7:
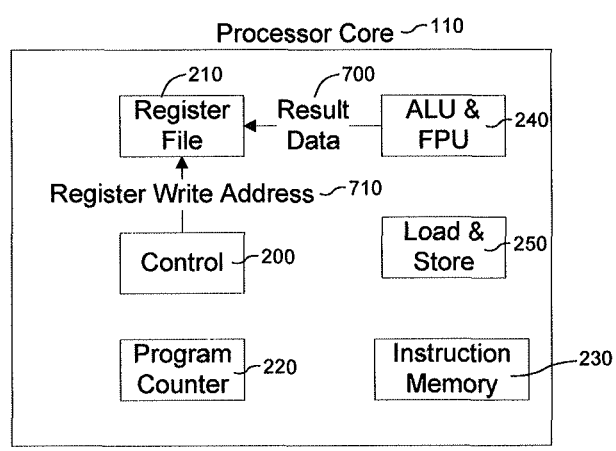
FIG. 7 is an illustration of another portion of an instruction cycle of the processor core of FIG. 2.

FIG. 7 depicts an exemplary Processor Core 110 performing the fifth step of the exemplary instruction cycle. In this step, the result produced by the ALU & FPU 240 performing the operation designated by the Operation Selection 610 communication on the input data provided by the Register Data 600 communication is transmitted through the Result Data communication 700, which is sent from the ALU & FPU 240 to the Register File 210. The Register File 210 writes this data to its internal memory (not shown). The internal memory of the Register File 210 may be implemented as SRAM in the case that the capacity is large and the number of ports for reading and writing required to the memory are not excessive. Alternatively, the memory internal to the Register File 210 may be implemented as registers in the case that more ports are desired than are reasonable for an SRAM implementation, and the number of registers is not excessive. In general the SRAM implementation is also preferred for embodiments where the latency of the Register File 210 is less important, and a register implementation of the memory internal to the Register File 210 is preferred if a low latency of operation is desired.

The address at which the Result Data 700 is stored in the memory internal to the Register File 210 is designated by the Register Write Address communication 710, which is transmitted from the Control unit 200 to the Register File 210. The Register Write Address 710 is determined by the Control unit 200 from the Instruction communication 400. The Load & Store unit 250, Instruction Memory 230, and Program Counter 220 do not perform operations during this stage of the example instruction cycle.

Figure 8:
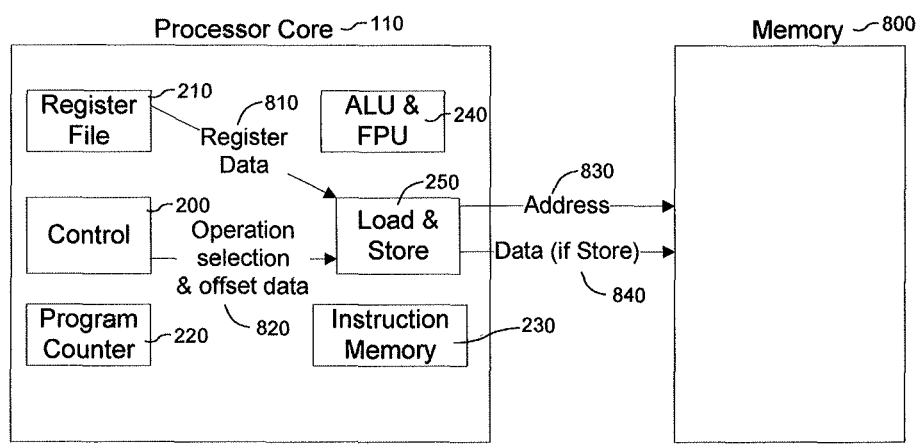
FIG. 8 is an illustration of alternative portion of an instruction cycle of the processor core of FIG. 2.

FIG. 8 depicts an alternative to the fourth step depicted in FIG. 6, which occurs when the Instruction communication 400 indicates to the Control unit 200 that the instruction is not an ALU & FPU 240 type instruction, but a Load & Store 250 type instruction. In this step of the example the Register File 210 sends the Register Data communication 810 to the Load & Store unit 250. The data transmitted in the Register Data communication 810 is determined by the Register File 210 reading from its internal memory at the address indicated to it previously by the Register Read Addresses communication 500. The task to be performed by the Load & Store unit 250 is determined by the Operation selection & offset data communication 820. The Control unit 200 determined the data to send in the Operation selection & offset data communication 820 from the Instruction communication 400 it previously received.

The Load & Store unit 250 receives the Register Data communication 810 and the Operation selection & offset data communication 820 which affect its behavior. The Load & Store unit 250 determines what data to send in the Address communication 830 by combining the data representing the base address in the Register Data communication 810 and the offset data from the Operation selection & offset data communication 820. In one power-efficient case, the Address data in the Address communication 830 is produced by the Load & Store unit 250 by adding the first piece of data from the Register Data communication 810, representing the base address, with the offset data from the Operation selection & offset data communication 820. The offset data in the Operation selection & offset data communication 820 may be negative resulting in the Address data in the Address communication 830 being less than the original base address data from the Register Data communication 810.

If the Operation data from the Operation selection & offset data communication 820 indicates that the operation desired operation is a Store operation then the Load & Store unit 250 also produces a Data communication 840 with data to be written to the Memory 800. In this case the data in the Data communication 840 is determined from the Register Data communication 810 and, in one embodiment is taken from the second value sent in the Register Data communication 810. The Data communication 840 sent from the Load & Store unit 250 to the Memory 800 also indicates to the Memory 800 to perform a store of the data of the Data communication 840 at the address indicated by the Address communication 830.

If the Data communication 840 does not indicate a Store operation then it indicates a Load operation, which occurs when the Operation selection data from the Operation selection & offset data 820 indicates that a Load operation is desired. In this case the data portion of the Data communication 840 is not used. The Memory 800 receives both the Address communication 830 and the Data communication 840 and performs the indicated operation at the indicated address and, if the indicated operation is a store, uses the indicated data.

During the alternative version of the fourth step of the example instruction cycle depicted in FIG. 8, the ALU & FPU 240, Program Counter 220, and Instruction Memory 230 do not perform operations for the completion of the example instruction cycle.

Figure 9:
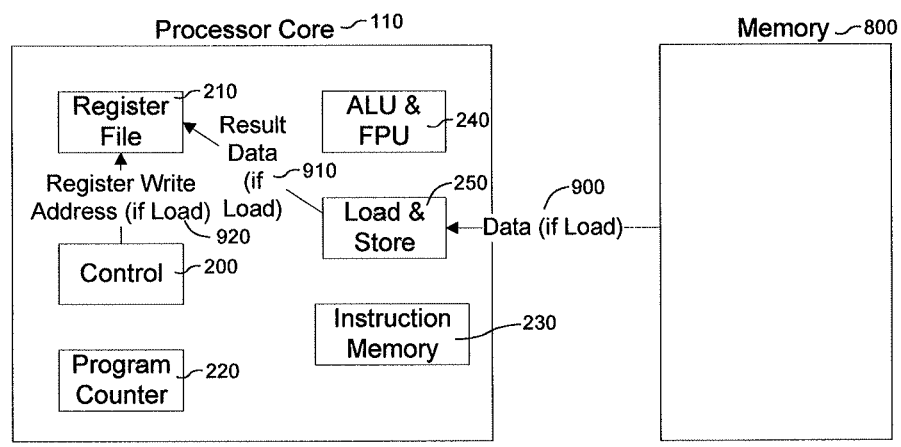
FIG. 9 is an illustration of another alternative portion of an instruction cycle of the processor core of FIG. 2.

FIG. 9 depicts an alternative to the fifth step depicted in FIG. 7, which occurs when the Instruction communication 400 indicates to the Control unit 200 that the instruction is not an ALU & FPU 240 type instruction but a Load & Store 250 type instruction. In the case that the instruction data from the Instruction communication 400 indicated to the Control unit 200 that the desired operation is a Load then the Register Write Address communication 920 is sent from the Control unit 200 to the Register File 210. Similarly in the Load case the Result Data communication 910 is sent from the Load &

Store unit 250 to the Register File 210, which contains the data to be written to the memory internal to the Register File 210. The write address data in the Register Write Address communication 920 is determined by the Control unit 200 from the instruction data of the Instruction communication 400.

During the alternative version of the fifth step of the example instruction cycle depicted in FIG. 9, the ALU & FPU 240, Program Counter 220, and Instruction Memory 230 do not perform operations for the completion of the example instruction cycle.

Figure 10:
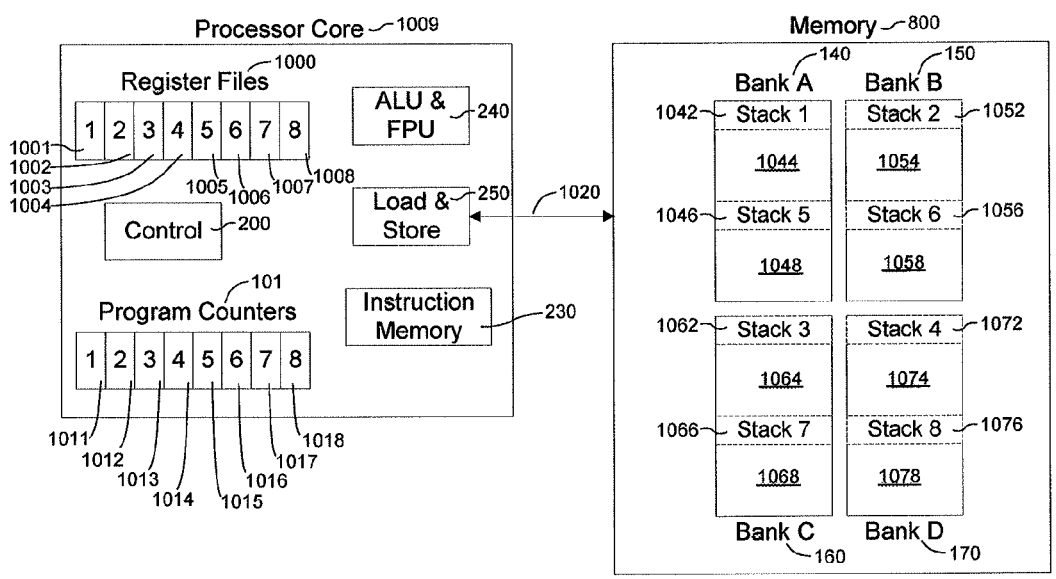
FIG. 10 depicts an exemplary power-efficient multi-threaded Processor Core of the integrated processor core of FIG. 1.

FIG. 10 depicts an exemplary power-efficient multi-threaded Processor Core 1009. In this embodiment multiple programs or program instances can run at the same time, each with a different Program Counter (1011-1018) specific to that thread from the set of Program Counters 1010. Similarly each thread gets a unique Register File 1001-1008 from the set of Register Files 1000. Each program instance is called a thread or it may be called a hardware thread. In this text we generally use the term "virtual processor", sometimes shortened VP. Each virtual processor also gets its own Stack 1042, 1052, 1062, 1072, 1046, 1056, 1066, 1076 which is held in Memory 800 and holds temporary data, or data being passed from one program subroutine to the next or previous. The Stacks 1042, 1052, 1062, 1072, 1046, 1056, 1066, 1076 may also be initialized with static data whose location is determined at initialization and whose value may or may not change at runtime. The bidirectional communication link 1020 transfers information between the Load & Store unit 250 and the Memory 800. An IO processor 120 may act as an intermediary along the bidirectional communication link 1020.

The power-efficient Processor Core implements a pipeline that, it one embodiment, is N stages and supports N virtual processors, with each virtual processor executing a different stage at any given moment in a strict round-robin ordering. In this scenario the Load & Store unit 250 may be called upon to perform a memory operation during each Processor Core 1009 cycle. A power-efficient architecture may use Memory 800 implemented with multiple banks 140, 150, 160, 170, where any individual bank may not have sufficient throughput to initiate a memory operation once per Processor Core 1009 cycle. In this case, the Banks 140, 150, 160, 170 may be operated in a round-robin ordering so that, although an arbitrary bank is not necessarily ready to initiate a memory operation during any cycle of the Processor Core 1009, some bank, either Bank A 140, Bank B 150, Bank C 160, or Bank D 170 will be ready to initiate a memory operation during a given cycle. If no idle cycles are scheduled and the Processor Core 1009 supports N virtual processors and Memory 800 supports M banks of memory, and M divides N evenly, then each virtual processor can be assigned a bank such that it can initiate an operation on its stack values whenever it is executing the Load & Store unit 250.

In FIG. 10, the exemplary power-efficient Processor Core 1009 is depicted as supporting 8 virtual processors (see the eight register files 1001-1008 and eight Program Counters 1011-1018). The Memory 800 supports four banks 140, 150, 160, 170. Since 4 divides 8 evenly (no remainder) then if the banks 140, 150, 160, 170 can be run at a clock speed one quarter that of the Processor Core 1009, then Bank A can be synchronized and scheduled to initiate memory operations whenever virtual processor #1 or #5 are, or might be, operating the Load & Store unit. Similarly, Bank B can be synchronized and scheduled to initiate memory operations whenever virtual processor #2 or #6 are, or might be, operating the Load & Store unit. Bank C can be synchronized and scheduled to initiate memory operations whenever virtual processor #3 or #7 are, or might be, operating the Load & Store unit. Bank D can be synchronized and scheduled to initiate memory operations whenever virtual processor #4 or #8 are, or might be, operating the Load & Store unit.

At any given moment there will be memory space in the banks 1044, 1054, 1048, 1058, 1064, 1068, 1074, 1078 that is dedicated to non-stack data such as Heap Data, system-level functionality such as data transfers, or it may be unallocated and waiting to be allocated should the need arise.

Figure 11:
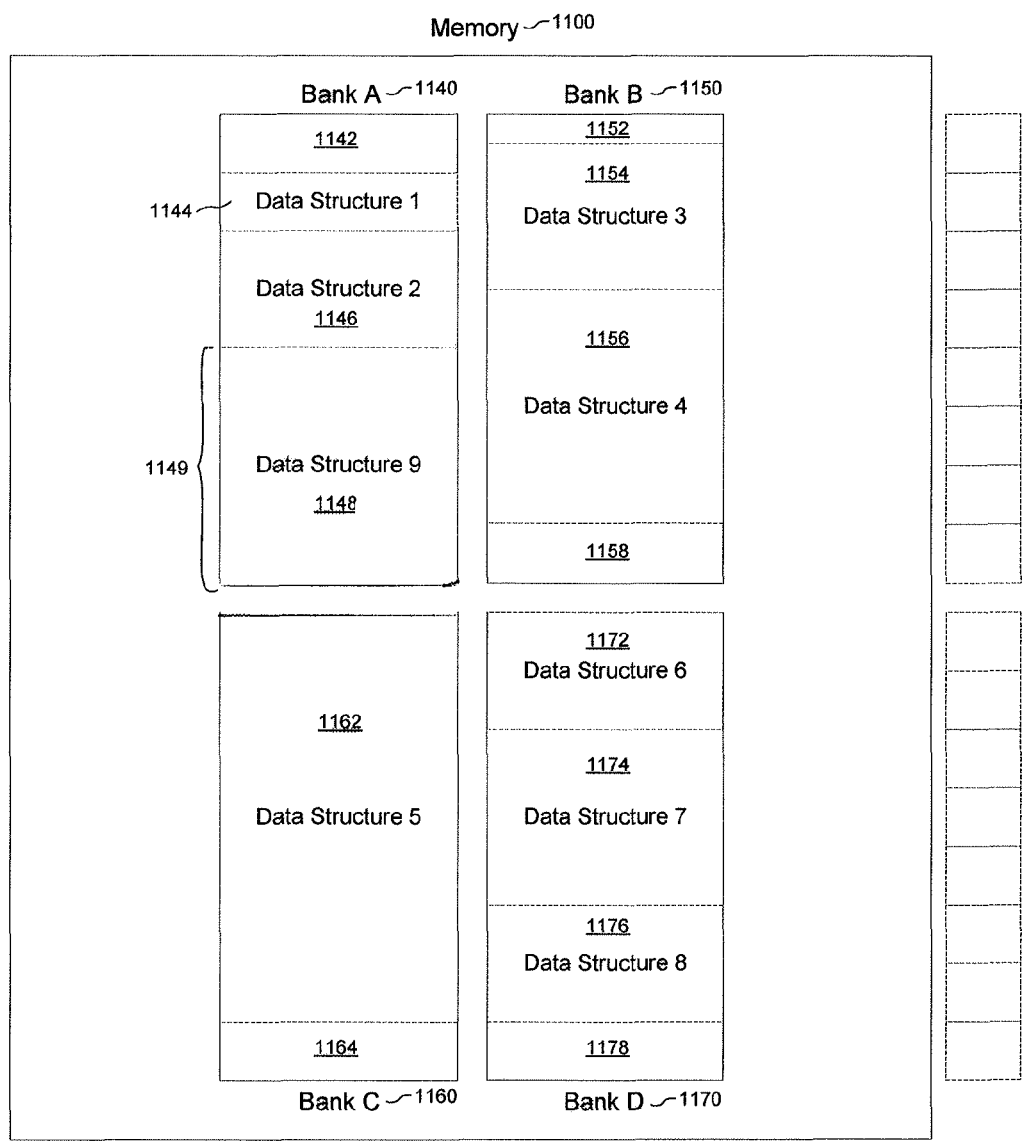
FIG. 11 depicts an exemplary Memory of the integrated processor core of FIG. 1 with some unallocated regions.

FIG. 11 depicts an exemplary Memory 1100 with some unallocated regions 1142, 1152, 1158, 1164, 1178. Some memory regions are dedicated to different Data Structures, such as Data Structures 1, 2, and 9 (1144, 1146, 1148 resp.) which are allocated in Memory Bank A 1140. Similarly Data Structures 3 and 4, 1154, 1156, respectively, are allocated in Bank B 1150. Data Structure 5, 1162, is allocated in Bank C 1160, and Data Structures 6, 7, and 8, 1172, 1174, 1176, respectively, are allocated in Bank D 1170. FIG. 11 begins an example wherein a memory allocation issue involving Data Structures 2 and 9, 1146 and 1148, respectively, will be studied. To this end, it can be useful to consider the Data Structures as having been allocated in the order suggested by their names, i.e. Data Structure 1 (1144) was allocated first, Data Structure 2 (1146) was allocated second, and so on. In this case Data Structure 9 would be allocated last. In this example we can see that after Data structures 1-8 (1144, 1146, 1154, 1156, 1162, 1172, 1174, 1176) had been allocated, a memory region for Data Structure 9 (1148) was requested. We can see that amongst the then-unallocated regions (1142, 1152, 1158, 1164, 1178, and 1149) only memory region 1149 was sufficiently large to house the entirety of Data Structure 9 (1148).

Figure 12:
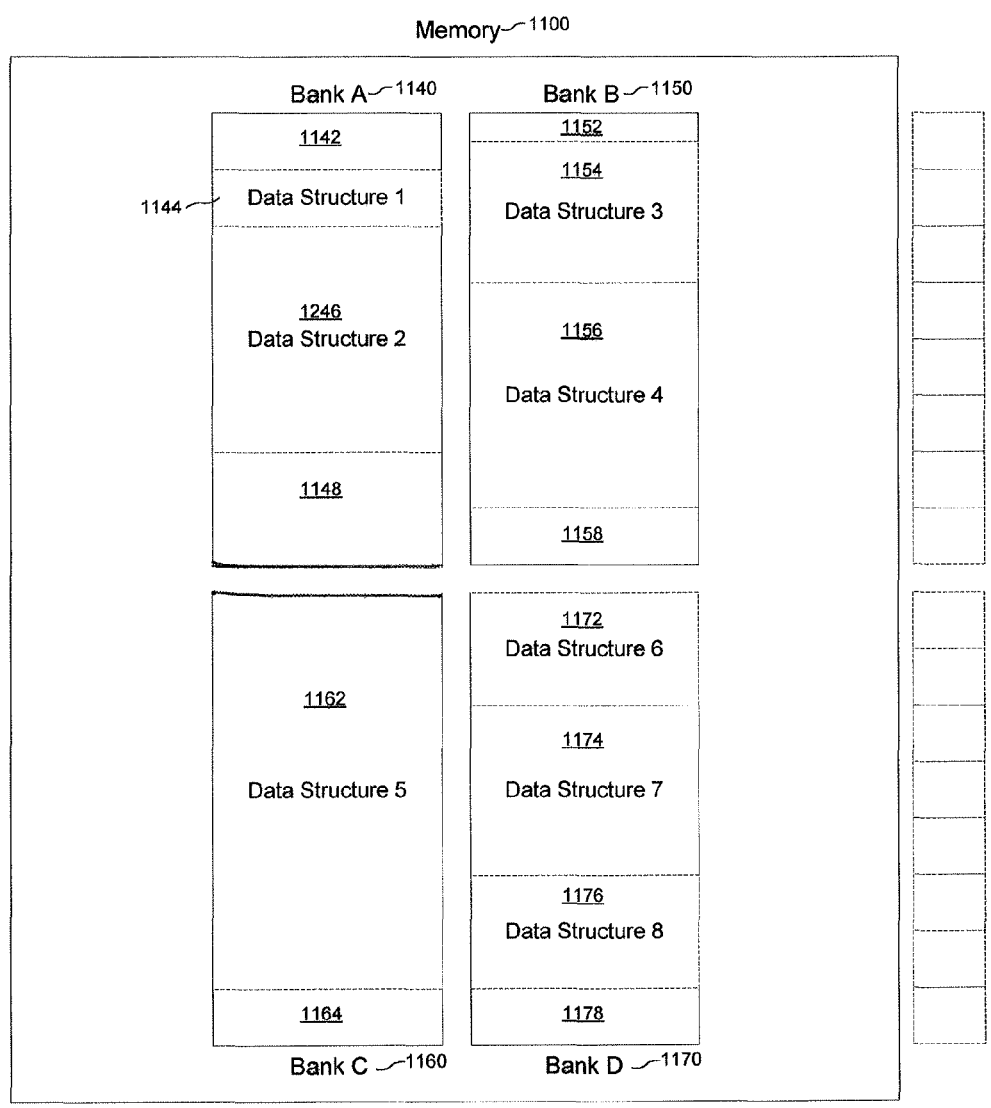
FIG. 12 depicts another exemplary allocation of a Memory of the integrated processor core of FIG. 1.

FIG. 12 depicts an exemplary allocation setting in Memory 1100 nearly identical to that of FIG. 12 with the exception that Data Structure 2 (1246) is significantly larger than in FIG. 11 (1146). Although both Data Structures 1146 and 1246 have the same starting address, which is just after the end of Data Structure 1 (1144), Data Structure 2 (1246) now continues much longer than it did in FIG. 11 (1146). Furthermore, Data Structure 9 (1148) is not allocated in FIG. 12, and the memory region 1149 that was dedicated to Data Structure 9 (1148) is instead dedicated to the second half of Data Structure 2 (1246) and a free memory region 1248. All of these data structures are in Bank A 1140.

To continue the example of FIG. 11, FIG. 12 is in a situation where a memory region for Data Structure 9 (1148) is requested, however in contrast to FIG. 11 there is not a single unallocated memory region (1142, 1148, 1152, 1158, 1164, 1178) sufficiently large to hold Data Structure 9 (1148).

Figure 13:
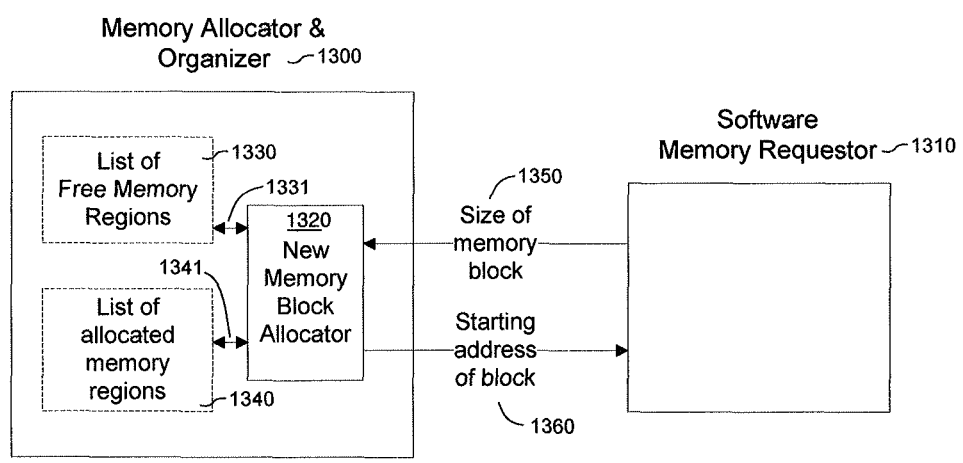
FIG. 13 depicts an exemplary Memory Allocation & Organizer of a system utilizing the integrated processor core of FIG. 1.

FIG. 13 depicts an exemplary Memory Allocation & Organizer 1300 comprising or maintaining a List of Free Memory Regions 1330 and List of allocated memory regions 1340 bidirectionally connected to a New Memory Block Allocator 1320 via links 1331 and 1341 respectively. A Software Memory Requestor 1310 sends a Size of memory block 1350 communication to the New Memory Block Allocator 1320 within the Memory Allocator & Organizer 1300. The New Memory Block Allocator 1320 uses its communication links 1331 to search the List of Free Memory Regions 1330 for an adequate memory region that, once found, determines what data is sent back to the Software Memory Requestor 1310 by the New Memory Block Allocator 1320 via the Starting address of block communication 1360. Once this return value is determined, the List of allocated memory regions 1340 is modified via 1341 to include the memory region that has been newly dedicated to the Software Memory Requestor 1310. The memory region found in the List of Free Memory Regions 1330 that was used to satisfy the memory request is removed from the List of Free Memory Regions 1330, and if it was larger than the requested size, then the remaining piece may have an entry created and added to the List of Free Memory Regions 1330 via bidirectional link 1331.

It is important to note that the typical use case of the Memory Allocator & Organizer 1300 for the Software Memory Requestor 1310 is simply to ask for the starting address of a memory region 1360 that is large enough for its purposes, as it designates in 1350. This interface is strikingly simple relative to the methods that may be employed by the Memory Allocator & Organizer 1300 to satisfy the request.

Figure 14:
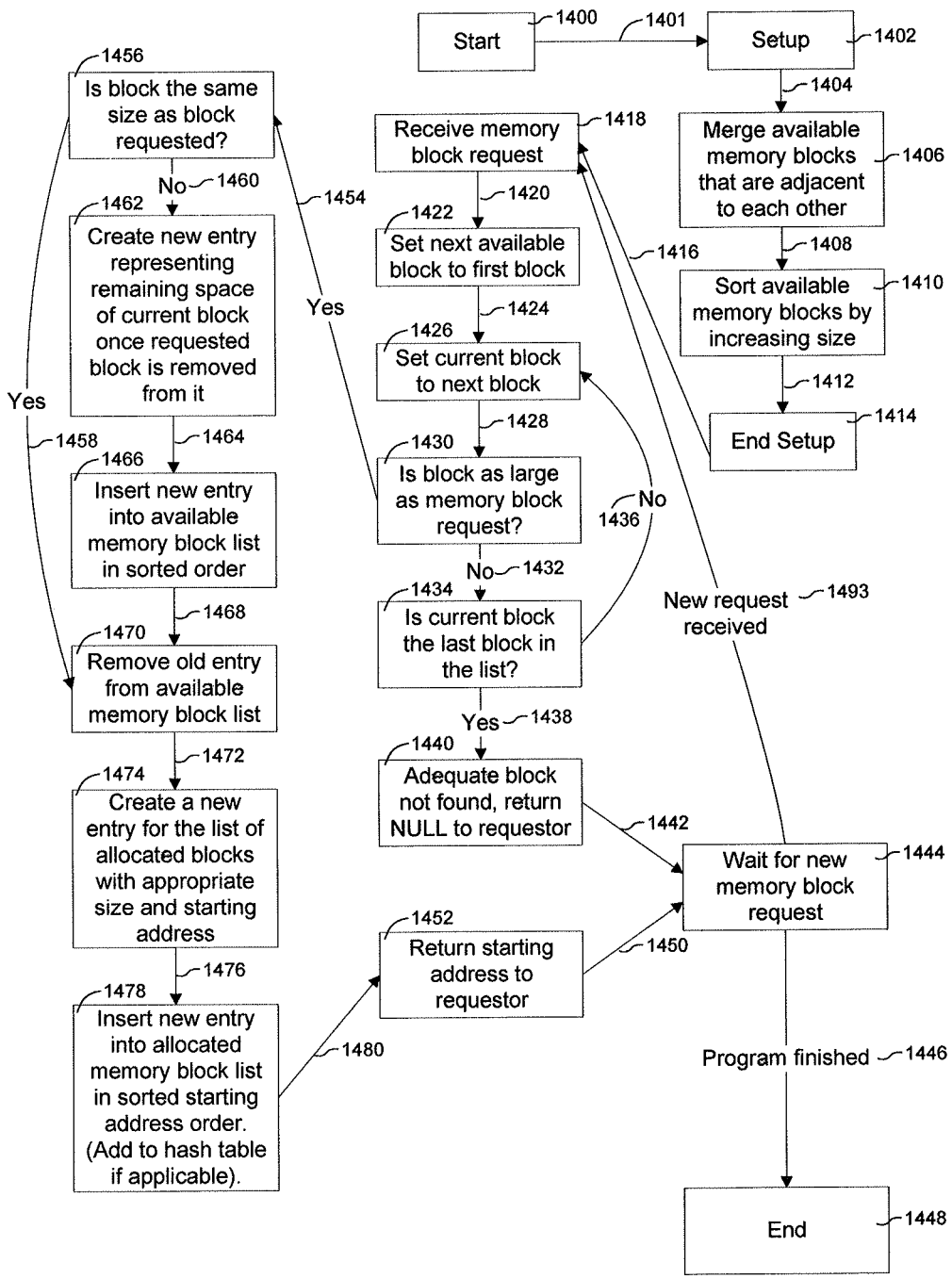
FIG. 14 depicts an exemplary process by which memory block requests are serviced in a system utilizing the integrated processor core of FIG. 1.

FIG. 14 depicts an exemplary process by which memory block requests (requests for the dedication of contiguous regions of memory) are serviced. The process starts at the Start box 1400 and proceeds via link 1401 to the Setup box 1402, which signifies the beginning of the Setup process, which is a process that does not need to be repeated for each memory block request that is received, but rather only once at the beginning of a process that may receive and service multiple memory block requests over time.

The Setup box proceeds via link 1404 to the "Merge available memory blocks that are adjacent to each other" box 1406. After this step there will not be any unallocated memory blocks contiguous in the address space that are adjacent to each other. In the case that two such memory blocks exist before step 1406, they are merged into a single block during step 1406.

Step 1406 proceeds via link 1408 to the "Sort available memory blocks by increasing size" step 1410. In this step, the list of unallocated memory blocks (also called "available" memory blocks) are reordered as necessary so that the smaller blocks occur earlier in the list than larger blocks, as measured by the size of each block in the units of allocation (such as bytes). After step 1410 the process proceeds via link 1412 to step 1414 "End Setup" which demarcates the end of the Setup Phase. The beginning of the post-setup phase, step 1418, is then proceeded to via link 1416.

Step 1418 is the "Receive memory block request" step during which a Software Memory Requestor 1310 sends the size of the memory block being requested (1350) to the Memory Allocator & Organizer (1300). The process then proceeds via link 1420 to the "Set next available block to first block" step 1422. The "next available block" may preferably be a pointer variable used by the allocation process as it iterates through the List of Free Memory Regions 1330.

The process then proceeds via link 1424 to the "Set current block to next block" step 1426, wherein the current block pointer is set to point at the next block in the List of Free Memory Regions 1330. When proceeding directly from step 1418 to 1422 and then 1426 this sets the current block to the first block in the List of Free Memory Regions 1330. When proceeding to 1426 from link 1436, step 1426 sets the current block pointer to the block following the current block pointed to by the current block pointer.

After step 1426 has completed, the process proceeds to step 1430 via link 1428. Step 1430 is the "Is block as large as memory block request" step, during which the block pointed to by the current block pointer is analyzed in terms of its size (e.g., in total bytes of the current block). The size of the current block is compared to the size of the Size of the memory block 1350 requested. If the current block is not at least as large as the Size of the memory block 1350 requested then the process proceeds via the "No" link 1432 to step 1434, otherwise the process proceeds via the "Yes" link 1454 to step 1456.

In the "No" case the process arrives at the "Is current block the last block in the list?" step 1434. In this step, the current block is checked to see if it is the last block in the List of Free Memory Regions 1330. If it is the last entry in the List of Free Memory Regions 1330 then the process proceeds via the "Yes" link 1438 to step 1440, otherwise the process proceeds via the "No" link 1436 to step 1426 which will begin the process of analyzing the subsequent entry to the current block in the List of Free Memory Regions 1330. It is noteworthy that FIG. 14 is just one example of a standard method for finding an adequate block to fulfill the memory block request. Another method that is efficient in the case of processing a sorted list is a binary search method, which requires fewer steps to determine whether a satisfactory block exists, and if so which is the smallest block in the list that satisfies the request. The binary search method requires log(n) steps, where n is the size of the list, instead of n steps as in the linear search case depicted in FIG. 14.

In the case that the process has gone through all of the entries in the List of Free Memory Regions 1330 without finding a block of adequate size to satisfy the Size of memory block 1350 requested, the process will arrive at the "Adequate block not found, return NULL to requestor" step 1440. During this step a NULL value is sent as the Starting address of block communication 1360, which is a special value understood by the Software Memory Requestor 1310 to mean failure. The process then proceeds via link 1442 to the "Wait for new memory block request" 1444.

At the "Wait for new memory block request" step the process may proceed via the "New request received" link 1493 back to step 1418 where the process will begin trying to accommodate the new request. Alternatively, step 1444 may proceed to the End 1448 if the Program finished 1446, which may be indicated by a special type of request indicating that all relevant requests that will ever be made by the program are known to have already been requested, an interrupt, an updated shared variable that is intermittently checked, via an interrupt and subsequent deletion of the process, or by some other method.

As previously explained, Step 1430 proceeds to step 1456 via the "Yes" link 1454 in the case that an unallocated block of sufficient size is found. The "Is block the same size as block requested" block further examines the size of the current block and the requested block and selects which step to proceed to based on the outcome. In the case that the requested block and the current block are the same size then the process proceeds via the "Yes" link 1458 to step 1470. It is noteworthy that it may be sufficient for the current block and the requested block size to be within some threshold of difference so that if they differ by only a few bytes, or however many bytes is the minimum unit of allocation, then the algorithm may be configured to treated act as though they are equal acting upon the judgment that they are close enough. In the case that the requested block and current block are not equal nor sufficiently close then the process proceeds via the "No" link 1460 to step 1462.

The "Create new entry representing remaining space of current block once requested block is removed from it" step 1462 is proceeded to via the "No" link 1460. In this step 1462 the remaining space is calculated as the size of the current block minus the Size of memory block requested 1350. An entry for the List of Free Memory Regions 1330 is then created to represent the remaining space of the current block once the requested block has been removed from it. The process then proceeds via link 1464 to step 1466.

At "Insert new entry into available memory block list in sorted order" step 1466, the entry created in step 1462 is inserted into the List of Free Memory Regions 1330 in sorted order. It is noteworthy that using binary search the location of the insertion can be performed in log(n) steps where n is the number of entries in the List of Free Memory Regions 1330. Insertion, however, may require a number of steps on the order of n if the List of Free Memory Regions 1330 is stored as an array because all of the entries occurring after the desired location will have to move further down in the array. If a linked list is used instead of an array for storage of the List of Free Memory Regions 1330 then insertion can be performed after only a few steps (a constant number of steps that does not increase relative to the number of entries in the List of Free Memory Regions 1330) however use of a linked list disallows use of the binary search that might otherwise replace the linear search implemented by the loop of steps 1426, 1430 and 1434. Thus, the standard method depicted in FIG. 14 uses a linear search and a very fast insertion method as an example. The process then proceeds via link 1468 to step 1470, which is also reached via the "Yes" link 1458.

The "Remove old entry from available block list" step 1470 is reached by both the "Yes" link 1458 from step 1456, and the 1468 link from step 1466. In this step 1470 the block pointed to by the current block pointer is removed from the List of Free Memory Regions 1330. If step 1466 preceded step 1470 (i.e., link 1468 was followed, rather than "Yes" link 1458) and an array data structure is being used to store the List of Free Memory Regions 1330, then it is possible to combine the insertion and deletion since entries occurring in the List of Free Memory Regions 1330 that occur in the list subsequent to the block pointed to by the current block pointer would be moved one space back during the insertion and then one space forward during the deletion of step 1470, and therefore do not need to be moved. Entries occurring after the desired new entry location of step 1466 and before the current block pointer would still need to be moved back in the list. It is noteworthy that in the case that a large block is being used to satisfy a small request, the difference in position from the desired location of the new entry and the location of the current block pointer may not be far from each other, or may even be the same location, thereby requiring very little processing. Thus the selection of the array data structure for List of Free Memory Regions 1330 might be a superior request if it is anticipated that the entries in the List of Free Memory Regions 1330 will be large and the requests will be small.

If a linked list is used to store the List of Free Memory Regions 1330 then the deletion requires only a few steps (a constant number that does not increase with the length of the List of Free Memory Regions 1330). The process then proceeds via link 1472 to step 1474.

The "Create a new entry for the list of allocated blocks with appropriate size and starting address" step 1474 is proceeded to via link 1472. In this step 1474 an entry representing the memory region allocated to the Software Memory Requestor 1310 is created for future addition to the List of allocated memory regions 1340, including its start address and size. The process then proceeds via link 1476 to step 1478.

The "Insert new entry into allocated memory block list in sorted starting address order" step 1478 is proceeded to via link 1476. In this step 1478 the entry created in step 1474 is inserted into the List of allocated memory regions 1340. The List of allocated memory regions 1340 may be stored as a table or hash table since the deallocation process requires the lookup of the size of the memory region given only its starting address. Because the List of allocated memory regions 1340 is only used for lookup purposes, a data structure supporting instant lookup, inclusion, and removal of entries is ideal, and therefore the hash table data structure is a reasonable choice. In the case that a table can be made sufficiently large, a standard lookup table can be used and no hashing functionality is required. After step 1478 completes, the process proceeds to step 1452 via link 1480.

In the "Return starting address to requestor" step 1452, the starting address of the memory region found to satisfy the memory region request is returned to the Software Memory Requestor 1310 in the Starting address of block communication 1360. Once step 1452 is completed, the process proceeds to step 1444 via link 1450, wherein the process will either begin processing another memory block request or proceed to the End 1448.

Figure 15:
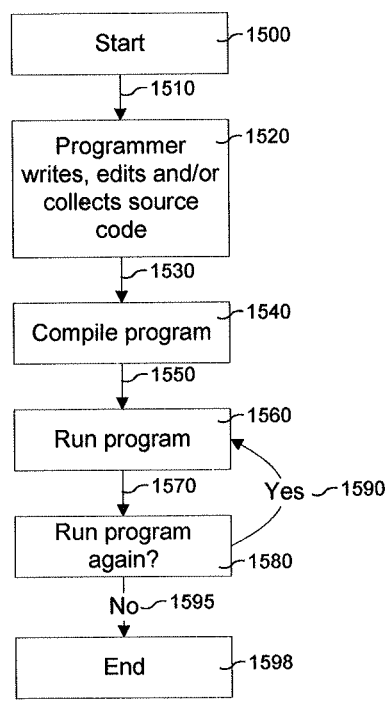
FIG. 15 depicts an exemplary method by which programs are created and run in a system utilizing the integrated processor core of FIG. 1.

FIG. 15 depicts an exemplary method by which programs are created and run. The "Start" step 1500 begins the process, which proceeds immediately via link 1510 to the "Programmer writes, edits and/or collects source code" step 1520. In this step 1520 a programmer prepares a collection of source code for execution. The source code collection is made of one or more source code files and instructions to the compiler that direct the compilation process, including any options that should be taken into consideration during compilation. In a typical scenario the programmer will use an Integrated Development Environment (IDE) to create a new project, which automatically creates a project file in which the compilation instructions reside, as well as a folder into which source code files can be placed for inclusion in the compilation. The programmer then creates new files and edits those files, adding lines of source code that perform operations the programmer desires to be performed in the program. Step 1520 proceeds via link 1530 to step 1540.

The "Compile program" step 1540 is proceeded to via link 1530. In this step 1540 a compiler program is executed using the source code collection and instructions collected during the previous step 1520. The compiler program uses the source code files as input and parses the source code to build internal representations that capture the meaning of the source code from the perspective of the programming language definition. After multiple passes the representations are converted into an assembly file, which contains a human readable form of the computer instructions required to carry out the program on a computer. A version of these instructions is constructed that is machine-readable, which is called a binary file. The binary file is the executable file that can be run on a computer, or computers, to perform the functions of the program. Step 1540 leads directly to step 1560 via link 1550.

"Run program" step 1560 is proceeded to via link 1550 in the case that the program has not yet been run, and also via the "Yes" link 1590 in the case that the program is to be run again. In this step 1560 a computer is commanded to execute the binary program created in step 1540, thereby performing the functions originally desired by the programmer to be carried out by the program. At the end of step 1560 the program finishes executing. The program may finish executing through full completion of the program which is the case when the program reaches its end. Alternatively the program may be forced or signaled to end by a user. After the program has finished the process continues via link 1570 to step 1580.

The "Run program again?" step 1580 is proceeded to via link 1570. In this step 1580 it is determined whether the program should be run again. Typically a user is deciding whether to run the program again but it is also common to have a scheduler program run the program at a given interval or at certain times of the day. In addition there may be a separate program, often called a "watchdog" program, which monitors the execution of the program run in step 1560. If it exits, the watchdog restarts the program. In the case that the program is to be restarted, the process proceeds via the "Yes"

link 1590 to step 1560 wherein the program will be run again. Otherwise, the process proceeds to the "End" 1598 via the "No" link 1595.

Figure 16:
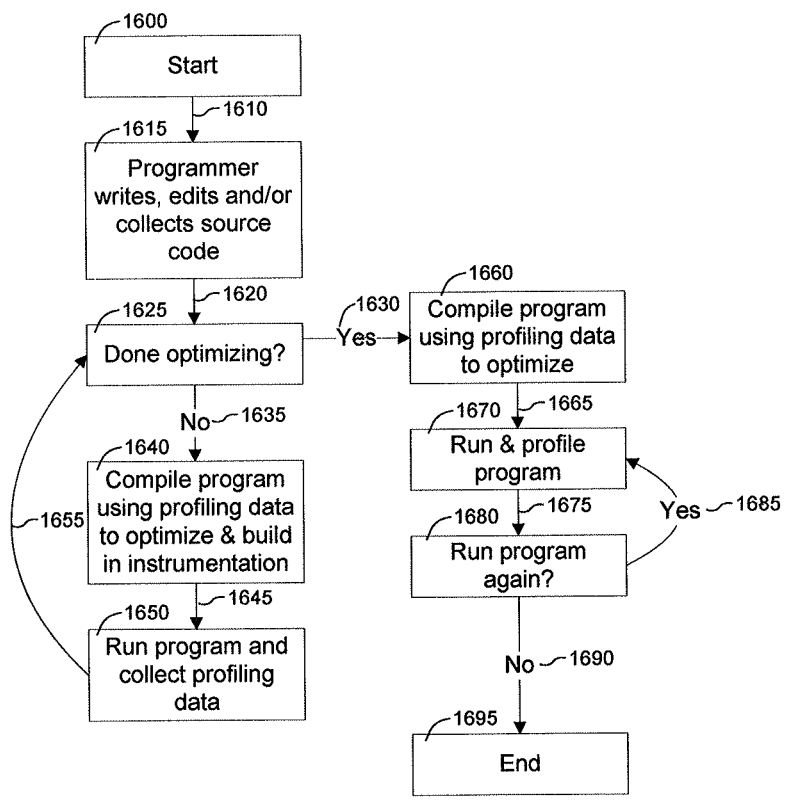
FIG. 16 depicts an alternative method by which programs are created and run in a system utilizing the integrated processor core of FIG. 1.

FIG. 16 depicts an alternative to the process described in FIG. 15, wherein the program is optimized using some automated systems that require the program to be run multiple times before the optimizations are put in place. The "Start" step 1600 begins the process, which immediately proceeds via link 1610 to the "Programmer writes, edits and/or collects source code" step 1615. This step is similar to the step of the same name (1520) in FIG. 15. After step 1615 the process proceeds to step 1625 via link 1620.

The "Done optimizing?" step is proceeded to the first time via link 1620 and all subsequent times, if any, via link 1655. If this is the first time through this step, and no optimizing is to be done, then the process proceeds to step 1660 via the "Yes" link 1630. Similarly, if optimizing has already been performed, wherein link 1655 was followed to arrive at the current step 1625, and no more optimization is desired, then the process proceeds to step 1660 via the "Yes" link 1630. If the optimization process is to be run again, or run for the first time, then the process proceeds via the "No" link 1635 to step 1640. One reason that the "No" link 1635 might be followed is if the program performance is known to not yet be adequate and it is suspected that improvements might still be had through further optimization. The "Yes" link 1630 might be followed if performance and efficiency are not a priority, in which case no optimization would be desired. Another reason the "Yes" link 1630 might be followed is if the desired level of performance has been achieved and no further optimization is necessary.

The "Compile program using profiling data to optimize & build in instrumentation" step 1640 is proceeded to via the "No" link 1635. This step differs from the "Compile program" step 1540 of FIG. 15 in several important ways. First, the program is compiled with "instrumentation," which is a set of routines that are built into the program in order to monitor the behavior of the program while it is running. For example, if it is desired that the number of times a certain exception or interrupt has been triggered, code would inserted into the binary to increment a counter assigned to that counting task, which would be intermittently and/or upon completion of the program be logged to a repository for later review. In one embodiment, code is inserted into the binary to initialize a hardware timer interrupt that will periodically execute profiling code. This code can observe the value that was held in the program counter prior to initiation of the interrupt. Using this value, the instrumented code can increment a counter assigned to represent the particular instruction or co-executing series of instructions coupled with the instruction indicated by the program counter value (this group of co-executing series of instructions is called a "basic block"). If a group-logging method is used, it may be useful to use a table data structure indexed by the program counter, whose values indicate which counter is to be incremented. Using the timer instrumentation method, it is possible to detect, from counters, the frequency with which a certain memory instruction is executed. During an interrupt that occurs while a memory instruction is still being carried out, it is possible to log the address or base address of the memory instruction, which can assist in determining the latency of the memory operation. These counters can help to focus the optimizer on the important pieces of the program.

The current step 1640 also uses previously collected profiling data, if present (i.e. not during the first processing of step 1640, but all subsequent passes through step 1640, if any) to optimize the binary that gets built from the source code.

One method by which this may be accomplished is the mapping of memory instructions to the location in source code that originally requested the memory be allocated. This memory request may be augmented with a request for a specific locality, such as very close, or not very close, to the processor core. This in turn can reduce the number of cycles taken by those memory instructions during execution, thereby reducing the number of cycles required by the program to get a unit of work done, which improves performance. This may also improve power efficiency, since earlier completion of a program allows it to exit sooner, enabling the computer to enter a powered down state so that less energy is consumed overall.

Some existing systems use profiling to advise programmers in which parts of their source code is the "hot spot", or executed most frequently, in order to direct the programmer's attention toward those parts of the source code where improvements would have the biggest impact in overall performance. It is unusual, however, to create a system in which profiling is required in order to get a reasonable level of performance. In the present system, for example, it may be the case that a program runs very slowly during its first compilation and run, and this may persist for multiple compilations and executions. The present system may only achieve reasonable performance relative to existing systems after the program has been recompiled with profiling data taken into account. It is the loss of good performance in the uninformed compilation that allows the power efficient processor core 110 to forgo certain functionality in exchange for increased efficiency in the profiling-data-informed recompilation case, which no longer needs the forgone functionality to achieve good performance. The increased efficiency may enable the architecture to reach higher levels of performance-per-watt than a system that is optimized to deliver good performance when running a binary that was compiled without any profiling data to inform the compiler about optimizations. After the program has been compiled with instrumentation and used profiling data, if available (i.e. not the first time through step 1640), to optimize the compiled program the binary has been created and is ready for execution. Step 1640 then proceeds to step 1650 via link 1645.

The "Run program and collect profiling data" step 1650 is proceeded to via link 1645. In this step 1650, the binary for the program created in step 1640 is started and runs to completion as in step 1560. In addition, the profiling data collecting code instrumentation inserted into the binary in step 1640 collects data that is periodically recorded to a data recorder such as network-attached-storage (NAS), a tape drive, memory, or some other collecting device so that it can be used later during a recompilation step that uses profiling data. The profiling data may also be presented to the user. Source code changes that would improve performance may also be automatically derived from the profiling data and inserted into a new version of the source code, which may then be presented to the programmer for acceptance. After the program has been run and the data collected, the process proceeds to step 1625 via link 1655.

The "Compile program using profiling data to optimize" is proceeded to via the "Yes" link 1630. This step 1660 is similar to step 1640 in that the compiler attempts to improve the performance of the program by recompiling using profiling data collected during step 1650. A key difference, however, is that this version of the binary is not instrumented, which itself improves performance because there is some overhead included in the instrumentation code that will not be included in the binary output by step 1660. It may be the case that no profiling data has been collected, which happens if step 1640 was never reached because the first encounter with step 1625 led to step 1660 via "Yes" link 1630. In the event that no profiling is performed, the compilation process of step 1660 does not perform optimizations that require profiling data. The process then proceeds to step 1670 via link 1665.

The "Run & profile program" step 1670 is proceeded to via link 1665. When the program completes, as in scenarios previously described, the process proceeds to step 1680 via link 1675.

The "Run program again?" step 1680 is proceeded to via link 1675. If the program is to be run again, as determined by an initiator such as a scheduler or user, which was previously described, the process proceeds via the "Yes" link 1685 back to step 1670, otherwise the process proceeds via the "No" link 1690 to the "End" 1695.

Figure 17:
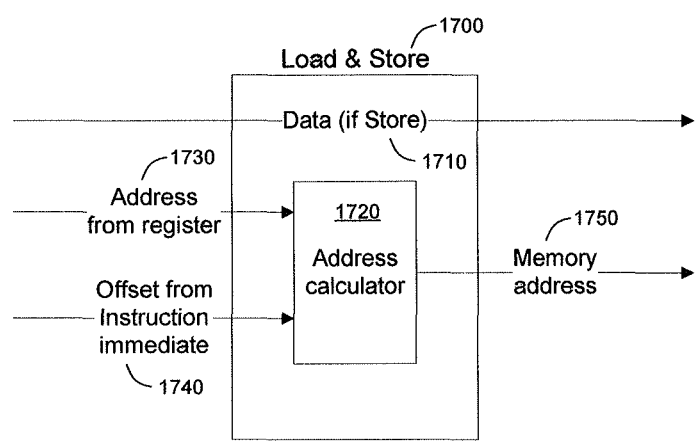
FIG. 17 depicts an exemplary Load & Store unit of the integrated processor core of FIG. 1.

FIG. 17 depicts a Load & Store unit 1700. This unit computes a Memory address 1750 output from two inputs, Address from register 1730 and Offset from Instruction immediate 1740, which are added together by the Address calculator unit 1720 internal to the Load & Store unit 1700. The Address from register input 1730 may be the base address of a data structure that has been fetched from a register file such as Register File 210. The Offset from Instruction immediate 1740 input is a positive or negative number sent in a communication such as the Operation selection & offset data communication 820 of FIG. 8. During Store operations, Data communications 1710 will be present and will pass through the Load & Store unit for use by a downstream unit, such as a Memory 800.

Figure 18:
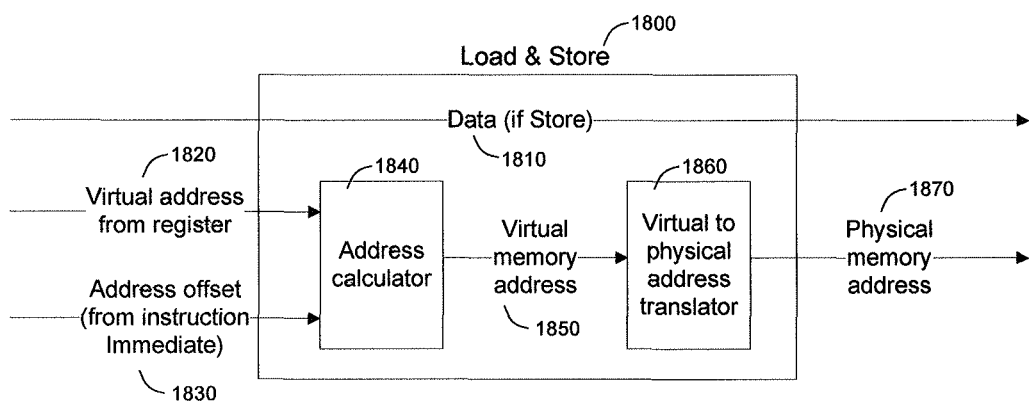
FIG. 18 depicts an exemplary Load & Store unit of the integrated processor core of FIG. 1, which also receives a Virtual address from register input.

FIG. 18 depicts a Load & Store unit 1800 that receives an Address offset (from instruction immediate) input 1830 similar to 1740 of FIG. 17, but also receives a Virtual address from register input 1820. The Address calculator 1840 adds these two inputs together to form a single Virtual memory address output 1850. The Address calculator 1840 and its output 1850 are internal to the Load & Store unit 1800. The Virtual-to-physical address translator 1860 receives the Virtual memory address 1850 as input and creates a Physical memory address output 1870. The virtual address 1850 is translated into a physical address 1870 by means of table lookup. In the case that not all virtual addresses that may be presented as input 1850 have some table entry in the translator 1860 to enable their translation, the translator implements a content-addressable-memory (CAM). The CAM is a hardware implementation of hash-table-like functionality, which is capable of holding a working set of table entries so that some of the virtual addresses that are presented as input 1850 can be translated. A secondary process, such as a software handler, initiated via hardware interrupt, is used to handle virtual addresses for which a table entry handling its translation cannot be found within the translator 1860 at the time that the translation must be performed. In this case, the software handler might remove an entry in the translation table to make room for an entry that can handle the virtual memory address that originally caused the interrupt, which is subsequently entered into the table. The handler would then return the process back to the state in which the memory operation was initiated so that the memory operation is retried, this time with the proper entry in the translation table to enable translation to Physical memory address 1870.

Similarly to FIG. 17, FIG. 18 has a Data communication 1810 that is present when the Load & Store unit 1800 is processing a Store memory operation, in which case the Data communication 1810 passes through the Load & Store unit 1800 to a downstream unit such as a Memory 800.

Figure 19:
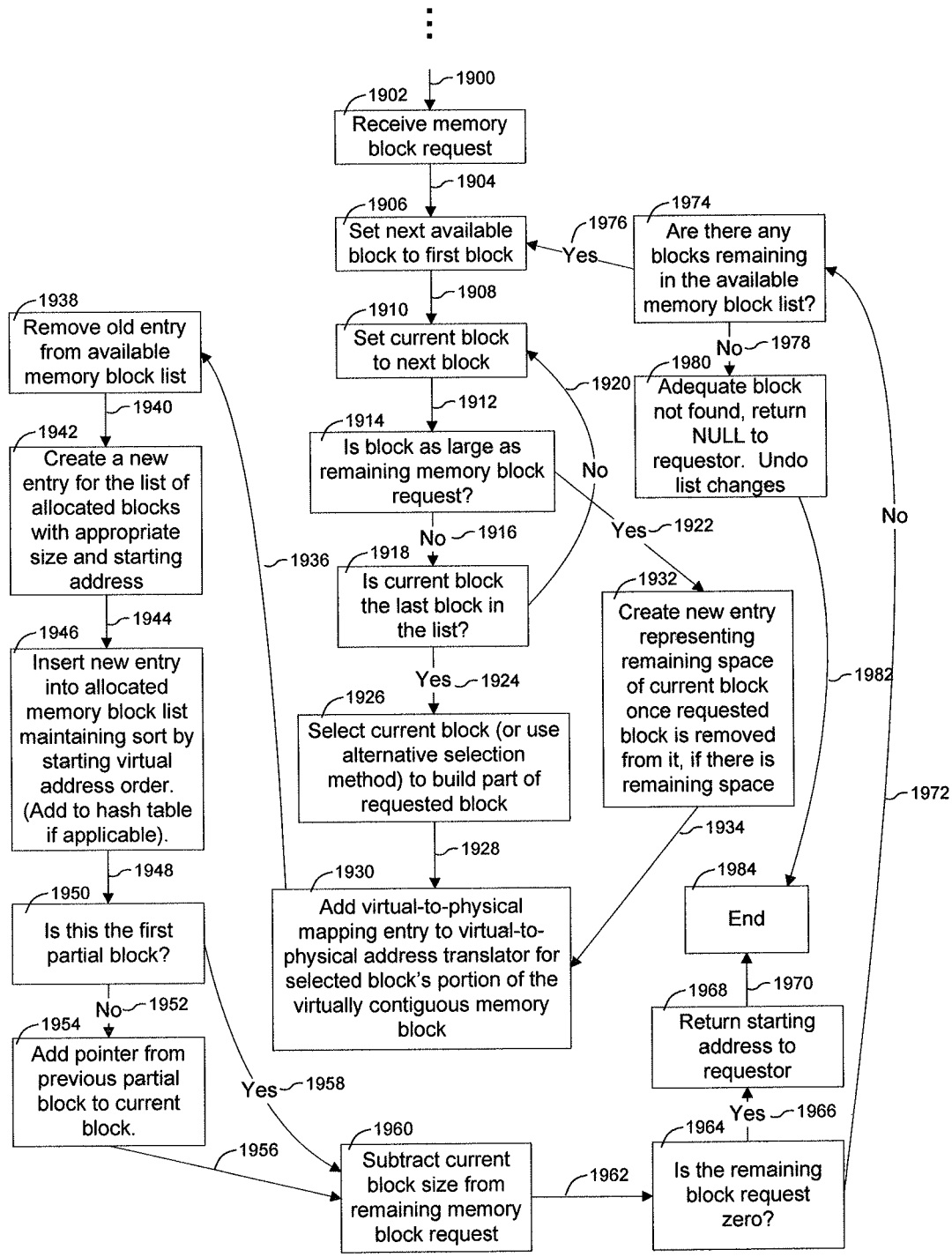
FIG. 19 depicts an exemplary process by which a memory allocation may be made to create a virtual contiguous memory region to satisfy a memory request in a system utilizing the integrated processor core of FIG. 1.

FIG. 19 depicts an exemplary process by which a memory allocation may be made to create a virtual contiguous memory region to satisfy a memory request. The exemplary process solves the problem depicted in FIG. 12, wherein a memory region is requested that is larger than any contiguous physical block of unallocated memory, such as a memory region to accommodate Data Structure 9 (1148) of FIG. 11. By loading the translation table of Virtual-to-physical address translator with the appropriate entries, a contiguous range of addresses can be provided to the virtual address space using multiple physically discontiguous memory regions.

After initialization the process proceeds via link 1900 to step 1902. It may also be the case that the process of FIG. 19 has been run previously reaching its "End" 1984 and that prior to proceeding to 1902 via link 1900, a new memory request was being waited for and once waiting was no longer necessary, the process proceeded via link 1900 to step 1902.

The "Receive memory block request" step 1902 is proceeded to via link 1900. This step signals the beginning of processing a new memory request. The process immediately proceeds to step 1906 via link 1904.

The "Set next available block to first block" step 1906 is proceeded to via link 1904 during the first iteration of the process depicted in FIG. 19, and by the "Yes" link 1976 for subsequent iterations if applicable. In this step 1906, the next available block pointer is set to point at the first block in the List of Free Memory Regions 1330. The process then proceeds to step 1910 via link 1908.

The "Set current block to next block" step 1910 is proceeded to via link 1908 and via the "No" link 1920. If this step is arrived at by the 1908 link then the current block pointer is set to the beginning of the List of Free Memory Regions 1330. If this step is arrived at via the "No" link 1920, the current block pointer is set to point at the block subsequent to the current block pointed to by the current block pointer in the List of Free Memory Regions 1330. The process then proceeds via link 1912 to step 1914.

The "Is block as large as remaining memory block request?" step 1914 is proceeded to via link 1912. In this step a comparison is made between the size of the remaining memory block request and the size of the block pointed to by the current block pointer. The size of the remaining memory block request starts with a value that is the entire size of the memory block request. If some blocks have already been found that will contribute a memory region to fulfill the memory block request, but the request has not been entirely filled, then the size of the remaining memory block request will be the size of the memory block request minus the sum of the sizes of all such previously found blocks contributing to said fulfillment.

If the size of the remaining memory block request is less than or equal to the size of the memory block pointed to by the current memory block pointer, the process proceeds to step 1932 via the "Yes" link 1922, otherwise the process proceeds to step 1918 via the "No" link 1916.

The "Is current block the last block in the list?" step 1918 is proceeded to via the "No" link 1916. In this step 1918, it is checked whether the current block pointer is pointing to the last block in the List of Free Memory Regions 1330. If it is pointing at this block, then step 1926 is proceeded to via the "Yes" link 1924, which will lead to the current block making a contribution to the memory block request. When the List of Free Memory Regions 1330 is in sorted order, this results in the largest unallocated block being dedicated to fulfill the memory block request in the event that no single block can satisfy the request. If, in the end, it turns out that the memory block request cannot be fulfilled, because the sum the sizes of all unallocated blocks is less than the size of the memory block request, then the current block will not be dedicated to the fulfill the memory block request because the memory block request will not be fulfilled.

If, instead of pointing at the last block in the List of Free Memory Regions 1330, the current block pointer is pointing at a different block, then step 1910 is proceeded to via the "No" link 1920, which leads to the processing of the block subsequent to the block pointed to by the current block pointer in the List of Free Memory Regions 1330.

The "Select current block (or use alternative selection method) to build part of requested block" step 1926 is proceeded to via the "Yes" link 1924. In this step 1926 the block pointed at by the current block pointer, which is the last block in the List of Free Memory Regions 1330, is selected to contribute toward the fulfillment of the memory block request. Alternatively a fallback selection mechanism may be used, such as a brute force attempt to find the set of unallocated memory blocks that, when their sizes are summed, is as close to the size of the memory block request as possible without going over. The method depicted in FIG. 19 of simply selecting the last block in the List of Free Memory Regions 1330 is a greedy method that will result in the fewest blocks being dedicated to the fulfillment of the memory block request. This is because the List of Free Memory Regions 1330 is sorted such that by selecting the last block in the list 1330, we are always selecting the largest memory block in the list 1330 to contribute toward the fulfillment of the memory block request, except in the case of selecting the final memory block in which case the smallest block that can complete the fulfillment of the memory request is used.

The greedy method of FIG. 19 is useful when it is desired to use the smallest number of unallocated blocks to fulfill a memory request and, after that requirement has been met, it is desired to quickly satisfy the request while minimizing the degree to which the memory blocks dedicated to the memory block request are larger in total than the size of the memory block request. The brute force method is useful in keeping the total size of all memory blocks in the List of Free Memory Regions 1330 as large as possible. Other methods that make different tradeoffs in terms of total size of the allocation, total number of blocks dedicated to the allocation, and speed with which the memory block request is filled can be employed. For example, in the case where all blocks are of sizes that are rigidly limited, such as powers of two, it is possible for a greedy method to be very fast and also to assign the optimal set of blocks to the fulfillment of the memory block request such that the smallest satisfactory amount of memory is dedicated to the fulfillment. After the selection is made the process proceeds via link 1928 to step 1930.

The "Add virtual-to-physical mapping entry to virtual-to-physical address translator for selected block's portion of the virtually contiguous memory block" step 1930 is proceeded to from step 1926 via the 1928 link and from step 1932 via the 1934 link. In this step 1930, an entry is added to Virtual-to-physical address translator 1860 mapping a contiguous region of virtual memory addresses to a contiguous region of physical addresses of the same size. The physical address region starting address is the starting address of the selected block from step 1926 or 1932. If this is the first block to contribute toward the fulfillment of the memory block request, the virtual address may be determined as the address of the next word following the virtual address of the last word that has previously been allocated in the virtual address space. In this case, the virtual address may need to be aligned to some degree (e.g., a multiple of 4096) if the translation table of the Virtual-to-physical address translator 1860 places such requirements on its entries.

If the selected block is not the first block to contribute to the fulfillment of the memory block request, the virtual address is determined as the previously used virtual address for the previously created entry in the translation table of the Virtual-to-physical address translator 1860, plus the size of the previously added memory block (i.e., the memory block that was selected prior to the currently selected memory block). After the virtual-to-physical mapping entry has been added in step 1930, the process proceeds to step 1938 via link 1936.

The "Create new entry representing remaining space of the current block once requested block is removed from it, if there is remaining space" step 1932 is proceeded to via the "Yes" link 1922. In this step 1932, one of two actions are performed. In the first case, the block pointed to by the current block pointer is the same size as the size of the remaining memory block request. In this case, the current block is selected and the process proceeds via link 1934 to step 1930. If the block pointed to by the current block pointer is larger than the size of the remaining memory block request (or if it is larger by X in the case where X is the minimum difference between an allocation and requested size that is required to justify division of a memory block into two blocks), a new entry is created representing the remaining space that will be left over after the memory region necessary to complete fulfillment of the memory block request is removed from the block pointed to by the current block. This entry is then placed into the List of Free Memory Regions 1330. In a standard case, the List of Free Memory Regions is being maintained in sorted order and the new entry will be inserted in the appropriate location so as to maintain the sorted ordering. The current block is then selected. The link 1934 is then followed to step 1930.

The "Remove old entry from available memory block list" step 1938 is proceeded to via the link 1936. In this step 1938, the selected block is removed from the List of Free Memory Regions 1330. Step 1938 proceeds via link 1940 to step 1942.

The "Create a new entry for the list of allocated blocks with appropriate size and starting address" step 1942 is proceeded to via link 1940. In this step 1942, an entry is prepared for the List of allocated memory regions 1340 representing the current block. Three important pieces of data are associated with the entry. The first is its physical starting address. This value can be taken directly from the starting address of the selected block. The second is its size, which represents the amount of memory that will be deallocated when it is deallocated in the future. The size is calculated as the size of the current block, unless a path through step 1932 was followed on the way to this step 1942, and step 1932 determined to make a new entry due to a mismatch in the size of memory necessary to complete fulfillment of the memory block request and the size of the selected memory block. In this case the size of the memory block is the size of the memory region that is dedicated from the selected block toward the fulfillment of the memory block request. The third piece of data is the virtual starting address, which is the means by which entry will be looked up in the future for deallocation. We will see in step 1954 that if the selected block is not the first block contributing to the fulfillment of the memory block request, a pointer from the previously selected memory block to the currently selected memory block is made so that when the requested memory block is deallocated the whole set of dedicated memory blocks will be deallocated together. If the currently selected block is the first block to be dedicated to the fulfillment of the memory block request, then the virtual address is calculated in a manner similar to how step 1474 calculated the starting address relevant to that step. The process then proceeds to step 1946 via link 1944.

The "Insert new entry into allocated memory block list maintaining sort by starting virtual address order (Add to hash table if applicable)" step 1946 is proceeded to via link 1944. In this step 1946, the entry created in step 1942 is inserted into the appropriate location in the List of allocated memory regions 1340 using the virtual address of the entry for sorting, hashing, or table index purposes. The process then proceeds to step 1950 via step 1948.

From "Is this the first partial block?" step 1950, the process proceeds to step 1954 via the "No" link 1952 if the selected block is not the first block to be dedicated to the fulfillment of the memory block request. Otherwise the process proceeds via the "Yes" link 1958 to step 1960.

The "Add pointer from previous partial block to current block" step 1954 is proceeded to via the "No" link 1952. This step 1954 is reached if the selected block is not the first block contributing to the fulfillment of the memory block request. In this case, a pointer from the previously selected memory block to the currently selected memory block is made so that when the requested memory block is deallocated the whole set of dedicated memory blocks will be deallocated together. The process then proceeds to step 1960 via link 1956.

The "Subtract current block size from remaining memory block request" step 1960 is proceeded to via the "Yes link 1958 and link 1956. In this step 1960, the size of the remaining memory block request is calculated so that future iterations of the process of FIG. 19 are informed as to how much memory remains to be allocated to complete fulfillment of the memory block request. The size of the remaining memory block request starts in step 1902 as the size of the original memory block request and is reduced to zero, or possibly below zero in the case where allocations of arbitrary granularity can't be made, by step 1984 if the memory block request can be fulfilled, or will remain above 0 if the memory block request can't be fulfilled. The size of the remaining memory block request assigned in step 1960 is the result of subtracting the size of the currently selected block from the current value. After this calculation, the process proceeds to step 1964 via link 1962.

The "Is the remaining block request zero?" step 1964 is proceeded to via link 1962. In this step 1964 it is determined whether the memory block request has been completely filled. If the memory block request has been completely fulfilled then the size of the remaining memory block request will be zero or less, and the process proceeds via the "Yes" link 1966 to step 1968. Otherwise, step 1974 is proceeded to via the "No" link 1972.

The "Are there any blocks remaining in the available memory block list?" step 1974 is proceeded to via the "No" link 1972. In this step, the List of Free Memory Regions 1330 is analyzed and the number of blocks remaining it is compared with zero. If the number of blocks remaining in the List of Free Memory Regions 1330 is greater than zero, the process goes back to step 1906 via the "Yes" link 1976. Otherwise, the process has failed to fulfill the memory block request and proceeds to step 1980 via the "No" link 1978.

The "Adequate block not found, return NULL to requestor. Undo list changes" step 1980 is proceeded to via the "No" link 1978. In this step 1980, the failure to fulfill the memory block request is acknowledged and a response is sent back to the Software Memory Requestor 1310. The process responds to the Software Memory Requestor 1310 with failure by returning the NULL as the Starting address of block 1360. The Software Memory Requestor 1310 understands that the NULL response is the failure response and will enter into special error handling or exception handling in order to avoid and prevent future writing of data to the NULL address.

The process also undoes all of the changes to the List of Free Memory Regions 1330 and List of allocated memory regions 1340 that were performed during the process depicted in FIG. 19. These changes can be undone by logging old values of table entries in a special temporary buffer and maintaining pointers to all new entries in a second buffer. When step 1980 is reached, all of the entries pointed to by pointers in the list of pointers to new entries are removed, and all of the old entries are re-inserted back into their original data structures in their proper location. In addition, any new entries into the Virtual-to-physical address translator 1860 that were inserted during the process depicted in FIG. 19 are removed, and any entries that were removed from the Virtual-to-physical address translator 1860 to make room for new entries are added back. Step 1980 then proceeds to step "End" 1984 via link 1982, thereby concluding the process depicted in FIG. 19.

The "Return starting address to requestor" step 1968 is proceeded to via the "Yes" link 1966. This step 1968 is encountered once a sufficient set of memory blocks has been found to fulfill the memory block request. During this step 1968, the starting virtual address for the first block contributing to the memory block request fulfillment is returned to the Software Memory Requestor 1310. The Software Memory Requestor 1310 will then proceed further along in its program and will be able to execute memory operations that assume access to a contiguous address space of its originally requested size has been granted starting at the returned virtual address. The process then proceeds via step 1970 to End 1984.

Figure 20:
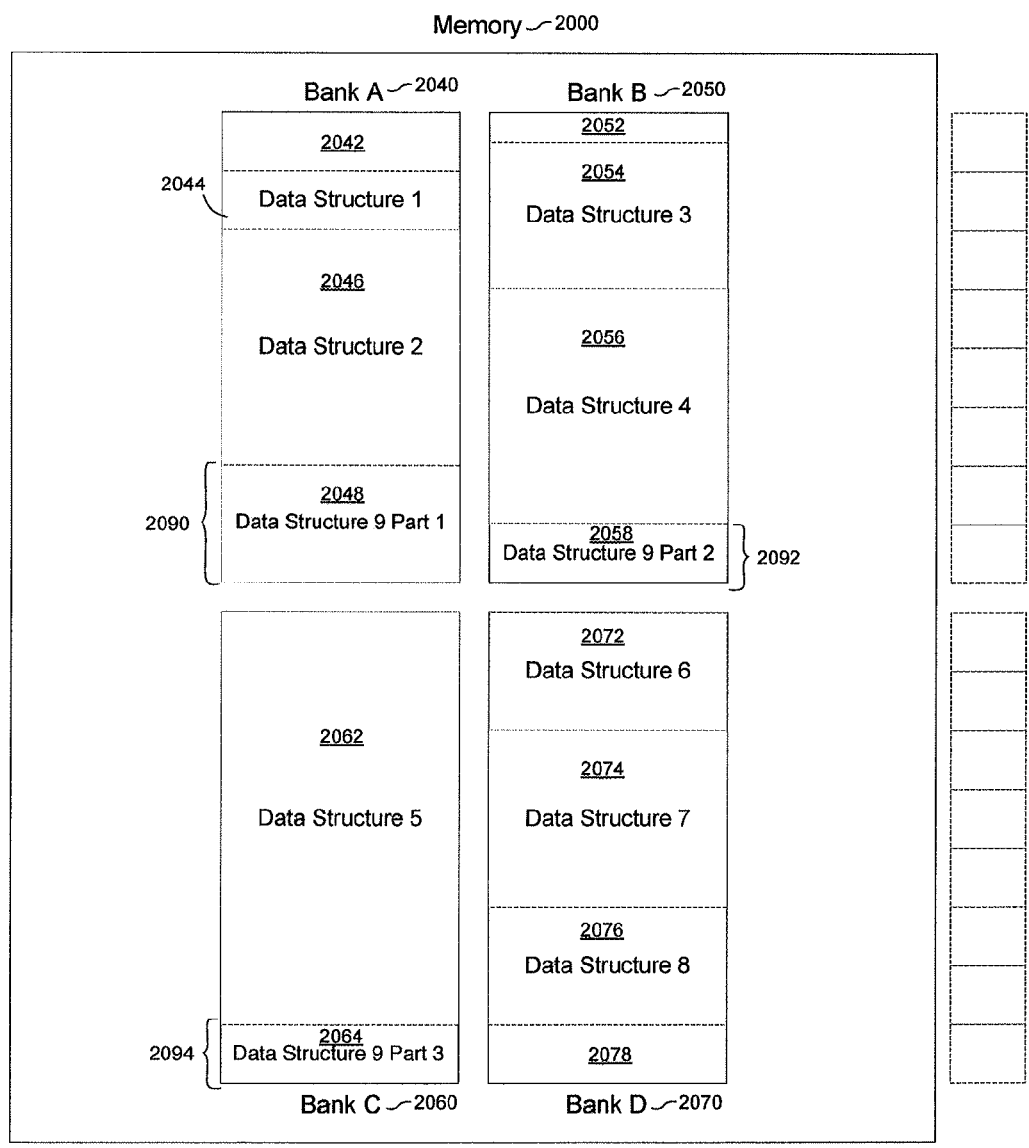
FIG. 20 depicts another exemplary allocation of a Memory of the integrated processor core of FIG. 1.

FIG. 20 continues the example of FIG. 12, in which an allocation is desired for a Data Structure 9 of a size identical to that Data Structure 9 1148 of FIG. 11, but no contiguous region of physical memory remains unallocated of a size sufficient to house Data Structure 9. Using the Load & Store unit 1700 of FIG. 17, it is not possible to solve this problem. However, the Load & Store unit 1800 of FIG. 18 may be used and the translation table of the Virtual-to-physical address translator 1860 filled using the process depicted in FIG. 19, such that a non-contiguous collection of physical memory regions may be combined to form a virtually contiguous memory block.

The example depicted in FIG. 20 depicts a memory layout within a Memory 2000. Memory 2000 comprises four banks named Bank A 2040, Bank B 2050, Bank C 2060, and Bank D 2070. Prior to allocation of Data Structure 9, Data Structures 1 through Data Structure 8 (2044, 2046, 2054, 2056, 2062, 2072, 2074, 2076 resp.) have already been allocated. Memory regions 2042, 2052, 2078, 2090, 2092, and 2094 remain unallocated prior to allocation of memory blocks for Data Structure 9. The amount of memory required to fulfill a request for Data Structure 9 is equal to half of one bank of physical memory. However, the largest contiguous region of memory that remains unallocated after Data Structure 8 has been allocated, but prior to allocation of Data Structure 9, is only one quarter of one memory bank 2090.

Application of the process depicted in FIG. 19 allows a virtually contiguous memory region to be constructed from multiple discontiguous physical memory blocks. In this example, the translation table internal to the Load & Store unit's 1800 Virtual-to-physical address translator 1860 has three entries added: one mapping memory region 2090 to the first half of the virtually contiguous memory region, one mapping memory region 2092 to the third quarter of memory the virtually contiguous memory region, and one mapping memory region 2094 to the fourth quarter of the virtually contiguous memory region. These virtual-to-physical address mappings house Data Structure 9 Part 1 (2048), Data Structure 9 Part 2 (2058) and Data Structure 9 Part 3 (2064) respectively.

Figure 21:
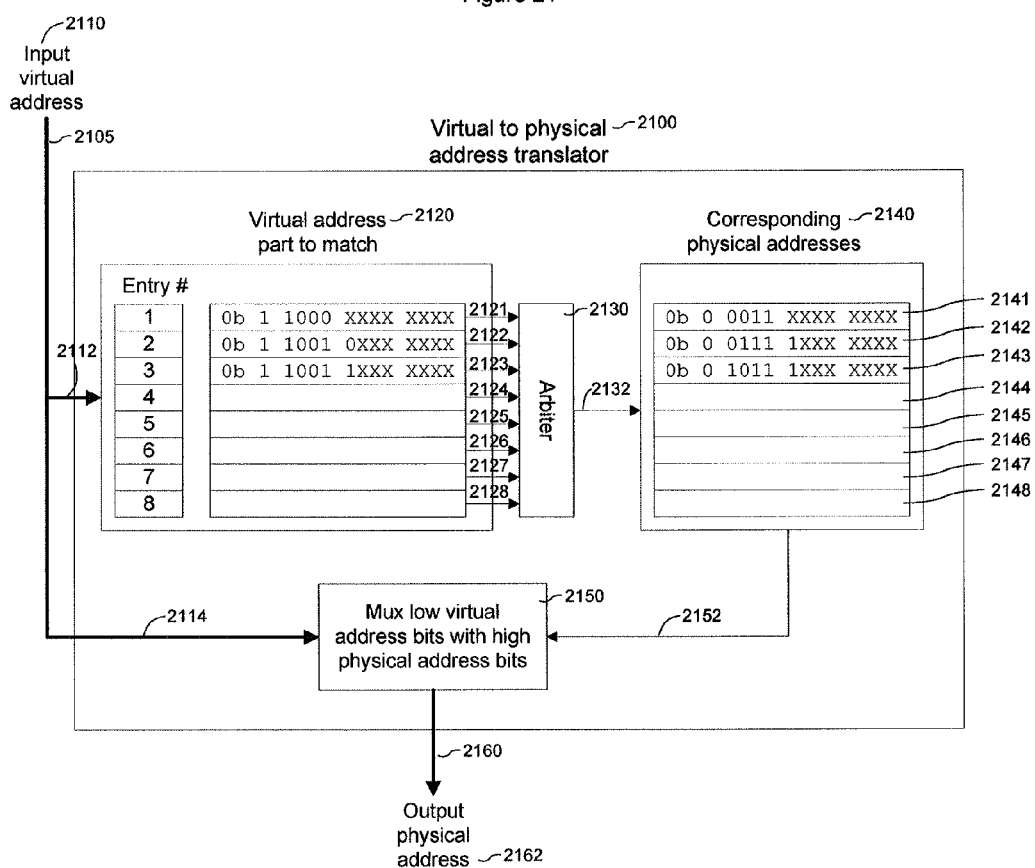
FIG. 21 depicts an embodiment of a Virtual-to-physical address translator in a system utilizing the integrated processor core of FIG. 1.

FIG. 21 depicts an embodiment of a Virtual-to-physical address translator 2100 with three entries 2121, 2122, 2123 in a "Virtual address part to match" table 2120, and three entries 2141, 2142, and 2143 in a Corresponding physical addresses table 2140, which create the virtual-to-physical mapping of the contiguous memory region dedicated to Data Structure 9 (2048, 2058, 2064) to the three physically discontiguous memory regions 2090, 2092, and 2094.

The Virtual-to-physical address translator 2100 receives an Input virtual address communication 2110, which proceeds through link 2105 and forks to links 2112 and 2114, which provide input to the "Virtual address part to match" table 2120 and the "Mux low virtual address bits with high virtual address bits" unit 2150 respectively. The "Virtual address part to match" table 2120 is depicted as having eight entries, which receive input from link 2112 and send individual outputs 2121-2128 to an Arbiter 2130. The "Virtual address part to match" table 2120 may have more or fewer table entries. A driving force for the architecture is the expense at which additional table entries come. A primary reason for this is that the input to the "Virtual address part to match" table is not matched via simple table lookup. Instead, a more complex matching operation is performed like a hash-table lookup which, when implemented in hardware, is sometimes referred to as a content-addressable-memory, or CAM. The more complex nature of the mechanism by which the input is matched to a table entry results in increased silicon area, power consumption, and latency, when performing the matching operation. Thus, a smaller "Virtual address part to match" table results in lower power, smaller silicon area, and higher performance of the table circuitry. Smaller silicon area results in lower manufacturing cost of the overall integrated circuit utilizing the smaller "Virtual address part to match" table for two reasons: 1) More parts can be fabricated per silicon wafer, which comes at a fixed cost for acquisition and foundry processing, and 2) yield (i.e., percentage of properly functioning parts) improves because the potential area for defects decreases per part, and each defect forces the discard of a smaller total area of silicon because the silicon die on which the defect occurred is smaller. Performance improves because the number levels of logic that must be traversed in operate the "Virtual address part to match" within a given number of cycles decreases as the number of table entries decreases, which results in lower maximum latency of the circuit, allowing for a higher clock speed of the circuit and more functional operations per second.

The "Virtual address part to match" table 2120 matches an entry 2121-2128 to an Input virtual address 2110 when the numeric part of the binary number held in the entry matches the Input virtual address 2110 at the same positions. Binary numbers are started with the prefix "0b" to indicate that it is binary ("0x" is typically used to indicate hexadecimal, and "0o" is used to indicate octal). The first number following the "0b" prefix is the most significant of the numbers following the prefix, and the last number to follow is the least significant. The numbers are divided into groups of four for readability. Values of "x" indicate "don't care" meaning that a match for that table entry does not depend on matching bits in that position. In the example of FIG. 21, the last five entries, entries 4-8 (2124-2128) of the "Virtual address part to match" table and the last five entries, entries 4-9 (2144-2148) of the "Corresponding physical addresses" table 2140 are blank and are not used in the example. However, in a typical use case, these entries would be filled to allow for additional virtual-to-physical address mappings that might be needed by a user program.

The "Virtual address part to match" table 2120 may be implemented more efficiently by forcing the "Don't care" x-values to be in constant positions that are not allowed to change within each entry. Circuits implementing such a table require less logic to implement and thus may hold cost and performance advantages over other table implementations. However, they are less flexible and may require multiple table entries to represent what might have otherwise required only a single table entry. For example, if "Don't care" x-values were forced to be in the first seven bit positions, but were not allowed in the eighth bit position, then the first entry 2121 in the "Virtual address part to match" table 2120 would have required two entries to carry out the same mapping instead of the single entry 2121 of FIG. 21. Furthermore, the Arbiter 2130 may be simplified in the case where the "Don't care" bit positions are fixed and inflexible, at the expense of potentially needing to increase the size of the "Virtual address part to match" table 2120 to provide a certain minimum number of virtually contiguous memory region mappings.

This principle of increasing the utility of each entry of the tables held in the "Virtual-to-physical address translator" 2100 is shown subsequently to extend further in the system in order to more dramatically reduce the number of entries required for these tables 2120 and 2140, thereby reducing cost and increasing performance for use cases in which the improved mappings are valuable.

The Arbiter unit 2130 outputs a single Entry # via link 2132 to the Corresponding physical addresses table 2140. The Arbiter 2132 is necessary since it is possible that multiple entries match the Input virtual address 2110 provided via link 2112. The Arbiter 2130 may be constructed such that the first entry, starting at Entry #1 and ending at Entry #8 that matches the Input virtual address 2110 is identified as the singularly matching entry. Alternatively, the Arbiter 2130 may be constructed such that the matching entry with the largest number of "Don't care" x-values, which might be considered the "largest" entry, is identified as the singularly matching entry. A second alternative implementation of the Arbiter 2130 identifies the matching entry with the smallest number of x-values as the singularly matching entry. This last method allows larger mapping entries to be overruled by smaller mapping entries, thereby allowing single entries to declare large rules to which exceptions are allowed. The first method described above, wherein the first matching entry is identified as the singularly matching entry, may implement this last method of allowing the smallest mappings to overrule the largest mappings, when the "Virtual address part to match" table 2120 has its entries sorted in order of increasing mapping size, and in which no two entries having identical x-values in the same positions are allowed to have matching numerical bit values. Implementation of the first method via the third may be more efficient because the tie-breaking method does not depend on values held within the entries 2121-2128, but instead simply on the entry position in the table. The system is able to operate under different Arbiter 2130 implementations such as those described above. However, implementations in which the smallest mapping is selected by the Arbiter is a often a preferred embodiment, whether using the sorted technique of the first method or by some other technique.

It is noteworthy that some integrated circuits have forced system software to implement this rule of having one and only one entry capable of matching a given Input virtual address 2110 and, in the case where it was not followed, the hardware was permanently destroyed. Such hardware is implemented at increased risk in order to achieve increased circuit efficiency by handing the complexity over to the software system. The system described herein is applicable to both the destructive and nondestructive forms of "Virtual address part to match" tables 2120 and Arbiters 2130.

The "Corresponding physical addresses" table 2140 receives input from the Arbiter 2130 and is a simple table lookup because the output from the Arbiter 2130 is a value from 1-8 indicating which entry 2141-2148 is to have its "Corresponding physical address" output onto link 2152.

The "Mux low virtual address bits with high physical address bits" unit 2150 receives input from the Input virtual address 2110 via input 2114 and from the "Corresponding physical addresses" table 2140 via link 2152. This unit 2150 integrates the virtual address bits received as input 2114 that are to not be remapped with the physical address bits received as input 2152 that are to be remapped. One method by which this integration may occur is through use of the numeric physical address bits received from the "Corresponding physical addresses" table 2140 via input 2152 and replacing the x-values with the corresponding bit values from the Input virtual address 2110 received via input 2114.

An alternative method for implementation of the unit 2150 is to derive the virtual address bits using the x-values from the corresponding entry in the "Virtual address part to match" table 2120, rather than from the x-values of the entry in the "Corresponding physical addresses" table 2140, which may not be in identical locations, although using identical locations enables a simpler implementation and is a preferred embodiment. This alternative method is completed by adding together the virtual address part and physical address part instead of bitwise-OR'ing them as in the first method. This allows the start of physical address regions to be aligned in memory at a different granularity than the alignment of the virtual address region matched by the "Virtual address part to match" table 2120, thereby enabling increased flexibility in how the physical memory blocks are utilized. The present system is able to utilize either of these techniques in integrating input 2114 and input 2152 in unit 2150. Unit 2150 then provides its computed result as output 2160 which comprises the Output physical address 2162 which signifies where the virtual address lies in physical memory.

Figure 22:
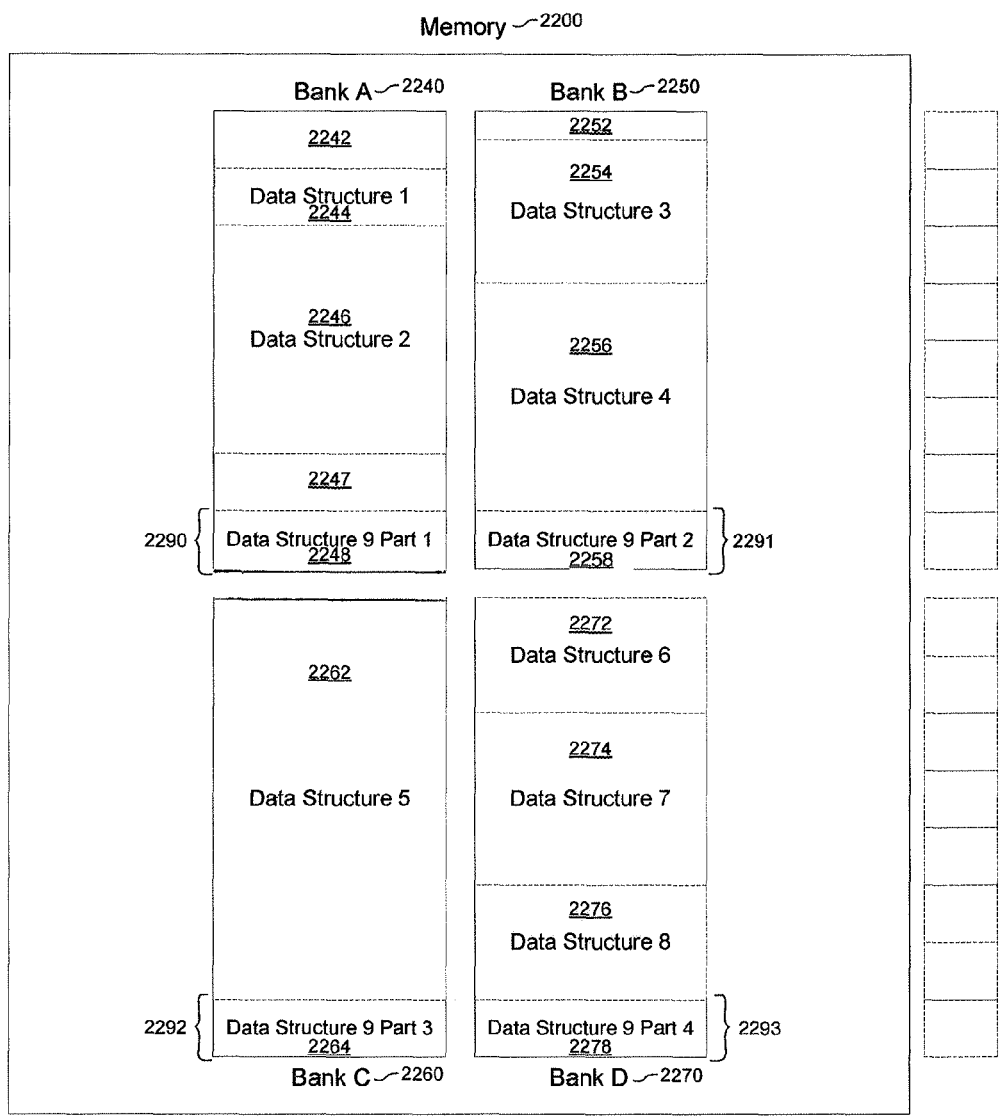
FIG. 22 depicts another exemplary allocation of a Memory of the integrated processor core of FIG. 1.

FIG. 22 depicts an alternative solution to the allocation problem presented in FIG. 20. In FIG. 22, a Memory 2200 comprises four banks named Bank A 2240, Bank B 2250, Bank C 2260, and Bank D 2270. The example picks up where the example of FIG. 12 leaves off. In this example, Data Structures 1-8 (2244, 2246, 2254, 2256, 2262, 2272, 2274, 2278) have been allocated and an appropriate allocation for Data Structure 9 is requested. Memory regions 2242, 2247, 2290, 2252, 2291, 2292, and 2293 are unallocated when the Software Memory Requestor 1310 requests a memory block for Data Structure 9. Rather than allocating the largest blocks first, as in the process described by FIG. 19 and laid out in FIG. 20, it is possible to create an allocation that fulfills the request with a "regular" layout. In such a layout the same relative memory region of each bank is dedicated to the fulfillment of the memory block request for Data Structure 9. In this example, the last eighth of each memory bank, namely regions 2290, 2291, 2292, and 2293 are dedicated to providing physical memory regions to support a virtual contiguous address region for Data Structure 9 Part 1 (2248), Data Structure 9 Part 2 (2258), Data Structure 9 Part 3 (2264), and Data Structure 9 Part 4 (2278) respectively.

Figure 23:
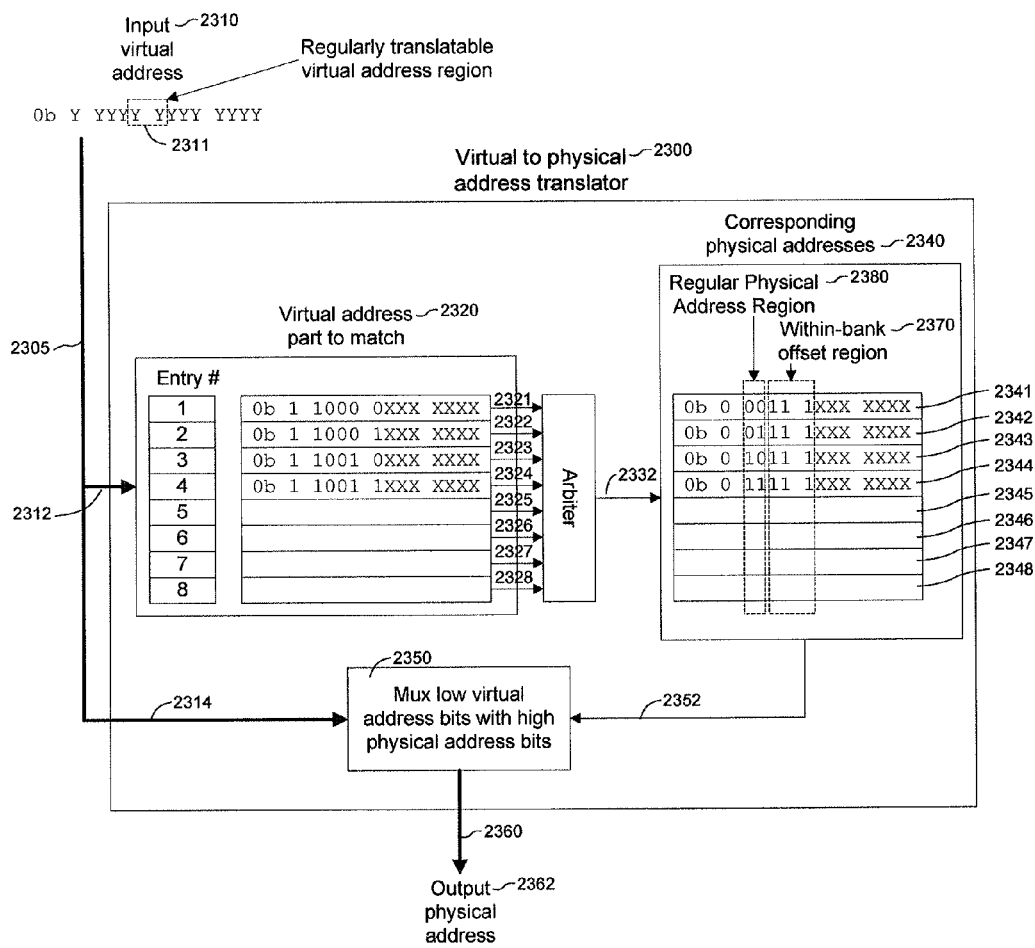
FIG. 23 depicts an embodiment of a Virtual-to-physical address translator of a system utilizing the integrated processor core of FIG. 1.

FIG. 23 depicts a Virtual-to-physical address translator 2300 with four entries (2321, 2322, 2323, 2324) in the "Virtual address part to match" table 2320 and four entries (2341, 2342, 2343, 2344) in the "Corresponding physical addresses" table 2340 implementing the mapping of the virtual contiguous address region to allocated physical memory regions. These entries (2321 & 2341, 2322 & 2342, 2323 & 2343, 2324 & 2344) implement the mapping of the previously unallocated memory regions 2290, 2291, 2292, 2293 in order to provide memory space for Data Structure 9 Part 1 (2248), Data Structure 9 Part 2 (2258), Data Structure 9 Part 3 (2264), and Data Structure 9 Part 4 (2278).

Portions of the Input virtual address 2310 that represent the Regularly translatable virtual address region 2311 are noted in the upper left of FIG. 23, with a dotted-line box surrounding bits 7 and 8 of the 13-bit binary input. The Input virtual address 2310 is sent via link 2305, where it is sent to the "Virtual address part to match" table 2320 as input 2312, and to the "Mux low virtual address bits with high physical address bits" 2350, as input 2314. Entries 5-8 2325, 2326, 2327, 2328 of the "Virtual address part to match" table 2320 and entries 5-8 2345, 2346, 2347, 2348 of the "Corresponding physical addresses" table 2340 represent unused portions of these tables for this example. The "Regular Physical Address Region" dotted-line box denotes the portion of the physical address regions that increments regularly in order to contribute the four memory regions 2290, 2291, 2292, 2293 that make up the physical memory region contributions to the virtual contiguous address region for Data Structure 9 (2248, 2258, 2264, 2278) of FIG. 22. We can see that the denoted bits 2380 are the $11^{th}$ and $12^{th}$ bits of the entries in the "Corresponding physical addresses" table 2340 are "00", "01", "10" and "11" for entries 2341, 2342, 2343, and 2344. These are equivalent to values "0", "1", "2", and "3". Obviously these values reproduce the first four digits of counting by units of one starting by zero. This ordered set of numbers is quite regular and orderly. Put another way, the value in the "Regular Physical Address Region" 2380 can be generated, directly from the entry number. In this example the value is equal the entry number minus 1. The system takes advantage of this regularity in order to reduce, and in one preferred embodiment eliminate entirely, the quantity of entries required to map a virtual contiguous address region to multiple physically discontiguous and separate memory regions.

The "Within-bank offset region" 2370 also represents a range of bits within the entries of the "Corresponding physical Address Region" table 2340 that contain regularity. In this case the regularity is that all of the entries that contribute to a virtual contiguous address space have the same value, namely "0b 111", for the $8^{th}$, $9^{th}$, and $10^{th}$ bits of the entries. The regularity of the x-values, which comprise the first 7 bits of the entries (2341, 2342, 2343, 2344), signify that each entry maps 128 bytes of physical address space, which is one eighth of a memory bank in the example of FIG. 22. The value "111" is equal to 7, which indicates the $8^{th}$ (since it is zero-indexed) bank segment of $\frac{1}{8}^{th}$ of a bank for each entry. Thus, each of the first four entries of FIG. 23 map the bottom eighth of each memory bank 2290, 2291, 2292, 2293 of FIG. 22 to a virtual contiguous memory region able to hold Data Structure 9 2248, 2258, 2264, 2278.

The output 2352 of unit 2340 is sent to unit 2350 which may operate similar to unit 2150 of FIG. 21. Output via link 2360 of the Output physical address 2362 is also similar to 2160 and 2162 of FIG. 21 respectively.

Figure 24:
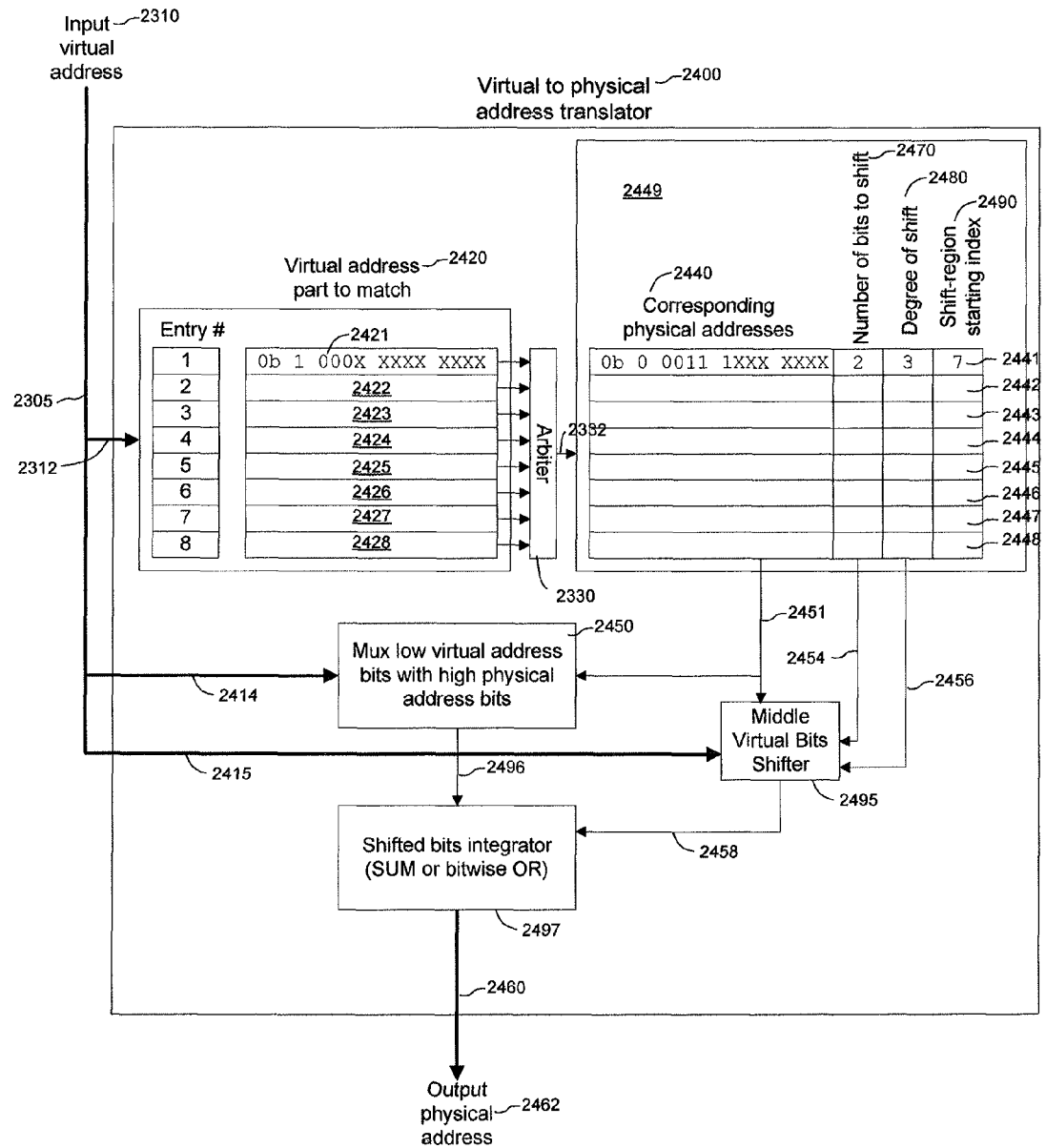
FIG. 24 depicts a preferred embodiment of the Virtual-to-physical address translator of a system utilizing the integrated processor core of FIG. 1.

FIG. 24 depicts a preferred embodiment of the Virtual-to-physical address translator 2400 with a "Virtual address part to match" table 2420 with only the first of its eight entries 2421-2428 being utilized. We can see from the locations of the x-values that the lowest-order 9 bits of the entry 2421 are "Don't care" x-values, which signifies that the virtual address region is 2^9=512 bytes, which is the entire size requested for Data Structure 9 (2248, 2258, 2264, 2278). The means by which four physically discontiguous address regions can be mapped to a single virtually contiguous address region can be seen in unit 2449 and the units 2450, 2495, 2497 to which its output 2451, 2454, 2456 is fed.

We can see that the single active entry 2441 of the eight entries 2441-2448 of unit 2449 has seven x-values, thereby signifying a physical address memory region mapping 2^7=128 bytes. The single entry has an enhanced meaning in the system due to additional attributes 2470, 2480, 2490 associated with the entry 2441. The "Number of bits to shift" attribute 2470 for the entry 2441 has a value of two, the "Degree of shift" 2480 a value of three, and the "Shift-region starting index" 2490 a value of seven. These three values instruct the downstream units 2450, 2495, 2497 to the two bits (designated by 2470) starting at bit 7 (designated by 2490) to be shifted left three bit positions (designated by 2480). Thus the downstream units carry out an operation whereby a binary virtual address of thirteen bits:

0b $B_{12} B_{11} B_{10} B_9 B_8 B_7 B_6 B_5 B_4 B_3 B_2 B_1 B_0$, has its bits shifted from indices 7 & 8 to 10 & 11 respectively (three places) to become:

0b $B_{12} B_8 B_7 B_9 0 0 B_6 B_5 B_4 B_3 B_2 B_1 B_0$, where $B_x$ is the value of the bit positioned at index X in the Input virtual address 2310 (where index 0 is the least significant bit position). The number of bits, the degree of the shift, and the starting index of the shift are configurable using the table columns 2470, 2480, and 2490. The shift occurs in the Middle Virtual Bits Shifter 2495 utilizing the relevant pieces of the Input virtual address 2310 fed over input 2415 from link 2305. The shift is controlled by values held in columns 2470, 2480, 2490 for the singularly matching entry determined by the arbiter 2330 and fed as input 2332 to unit 2449. The column values 2470, 2480 for the singularly matching entry have their values transmitted as output from 2449 which become inputs 2454 and 2456, respectively, for the Middle Virtual Bits Shifter 2495. The Middle Virtual Bits Shifter 2495 performs the operation described above and places the relevant pieces of output onto output 2458, which are received as input by the "Shifted bits integrator (SUM or bitwise OR)" unit 2497. It is noteworthy that the Shift-region starting index 2490 may not need to be transmitted to the Middle Virtual Bits Shifter 2495 if the value is held as a constant or single configurable value and integrated into the circuitry that constructs the Middle Virtual Bits Shifter 2452. The column is depicted as 2490 to point out this important value, however its storage location may be unique for each entry 2441-2448 or even internal to unit 2449.

In one preferred embodiment, some of the positions of the x-values in the "Corresponding physical addresses" column 2440 are held constant or configurable by only a single value that is not configurable per entry, thereby decreasing the overhead of the hardware implementation of each entry 2441-2448. One preferred embodiment declares a portion of the x-value bit positions as constant or configured via a single parameter, and the remaining bit positions as declared by per-entry column value 2490. In one preferred embodiment, the x-value bit positions that can be individually configured for each of the entries 2441-2448 in the Corresponding physical addresses column 2440 are transmitted link 2451 to the Middle Virtual Bits Shifter 2495 via input 2452. In that preferred embodiment the bit index left of the left-most x-value bit position is identified as the Shift-region starting index and is interpreted as such by the Middle Virtual Bits Shifter 2495.

In one preferred embodiment of the system, the value for the "Number of bits to shift" column 2470 is derived by subtracting the index of the position of the left-most x-value.

The system may also derive the value of the Number of bits to shift 2470 for a given entry (one of 2441-2448) from the left-most positions of the x-values in the Corresponding physical addresses column 2440 and the Virtual address part to match column 2420. In the example of FIG. 24, the x-value in the leftmost bit position of entry 2421 is at index 8. The left-most bit position of entry 2441 in unit 2449 is at index 6, and the difference of 8 and 6 is two, which is the value that would go in the "Number of bits to shift" column 2470. By passing the left most bit position from the "Virtual address part to match table" 2420 through the Arbiter 2330 to unit 2449, and out through link 2451 to an input of the "mux low virtual address bits with high physical address bits" unit 2450 and to an input to the "Middle Virtual Bits Shifter" unit 2495, the value from column 2470 does not need to be transmitted since it can be calculated internal to the units 2450, 2495 as necessary. This decreases the overhead associated with each table entry, reducing cost and increasing performance when implemented over a given number of pipeline stages.

Unit 2450 merges the bits of the Input virtual address 2310 conveyed via 2305 as input 2414 at those positions at which x-values are present from the singularly matched entry 2441 column 2440. Those bits are merged with the non-x-values of the corresponding physical addresses 2440 of the entry 2441. Continuing the example, the output 2496 from unit 2450 would be:

0b 0 0 0 1 1 1$B_6 B_5 B_4 B_3 B_2 B_1 B_0$

Note that those portions of inputs 2496 and 2458 to the "Shifted bits integrator (SUM or bitwise OR)" unit 2497 that will always be the same do not need to be processed by both units 2450 and 2495 since the availability of these bits to unit 2497 requires only one of these units to transfer them to the unit 2497. The unit performing the processing may be selected to optimize the hardware implementation for shorter wiring, thereby reducing the cost of implementation. In one preferred embodiment, only the 2450 unit conveys the lower bits. In the example, these would be the least significant bits $B_6$ through $B_0$ transmitted over 2496, but not 2458 to improve the efficiency of the implementation.

The "Shifted bits integrator (SUM or bitwise OR)" unit 2497 merges the results from the upstream units 2450 & 2452 provided by inputs 2496 & 2458 and provides the "Output physical address" 2462 via output 2462. The merge can be performed by bitwise-OR'ing the relevant inputs together or by summing. In this example the input 2496 may be logically represented as:

0b 0 0 0 1 1 1 $B_6 B_5 B_4 B_3 B_2 B_1 B_0$ and input 2458 may be represented as:

0b $B_{12} B_8 B_7 B_9 0 0$

Which can be merged in unit 2497 using bitwise-OR to become output 2460:

0b $B_{12} B_8 B_7$ 1 1 1 $B_6 B_5 B_4 B_3 B_2 B_1 B_0$

The coordinated transformations of input to output of the constituent units 2420, 2449, 2450, 2452, and 2497 of the Virtual-to-physical address translator 2400 enables a single table entry 2421, 2441 to create one virtually contiguous address region from multiple physically discontiguous memory regions 2290, 2291, 2292, 2293.

Figure 25:
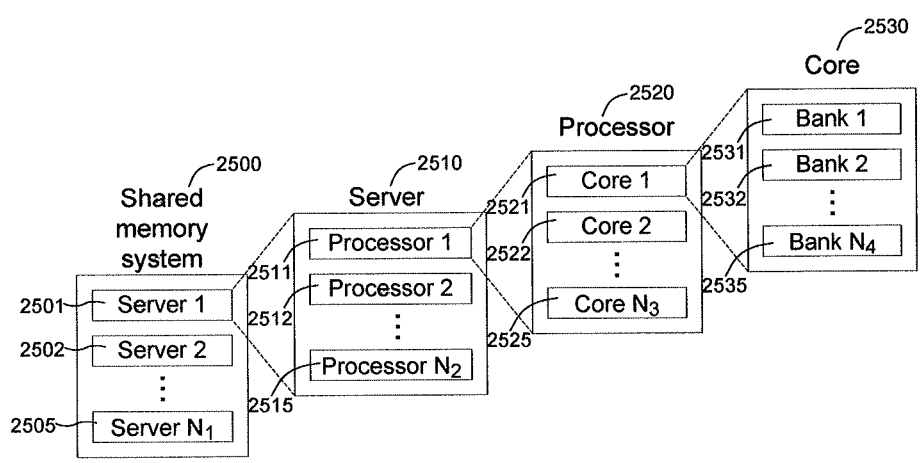
FIG. 25 depicts multi-tiered system utilizing the integrated processor core of FIG. 1.

FIG. 25 depicts how a number of servers 2501, 2502, 2505 (totaling $N_1$) can be organized into a Shared memory system 2500. Each server 2510 comprises $N_2$ Processors 2511, 2512, 2515. Each Processor 2520 comprises $N_3$ Cores 2521, 2522, 2525. Each Core 2530 comprises $N_4$ memory Banks 2531, 2532, 2535. Thus the total number of processors is $N_1*N_2$. The total number of Cores is $N_1*N_2*N_3$. The total number of Banks is $N_1*N_2*N_3*N_4$.

The memory banks can be numbered, for example, starting with 1, such that the last bank is numbered $N_1*N_2*N_3*N_4$. When the addresses are ordered according to bank number and each bank comprises 1 Megabyte (MB) of memory, then the first memory represents the first 1 MB of physical memory including addresses 0x00000-0xFFFFF, the second bank represents the second MB including addresses 0x100000-0x1FFFFF. If $N_1=N_2=N_3=N_4=16$, then the last memory bank will process memory addresses 0xFFFF00000-0xFFFFFFFFF. The 65536 memory banks together provide 64 Gigabytes of addressable memory.

Figure 26:
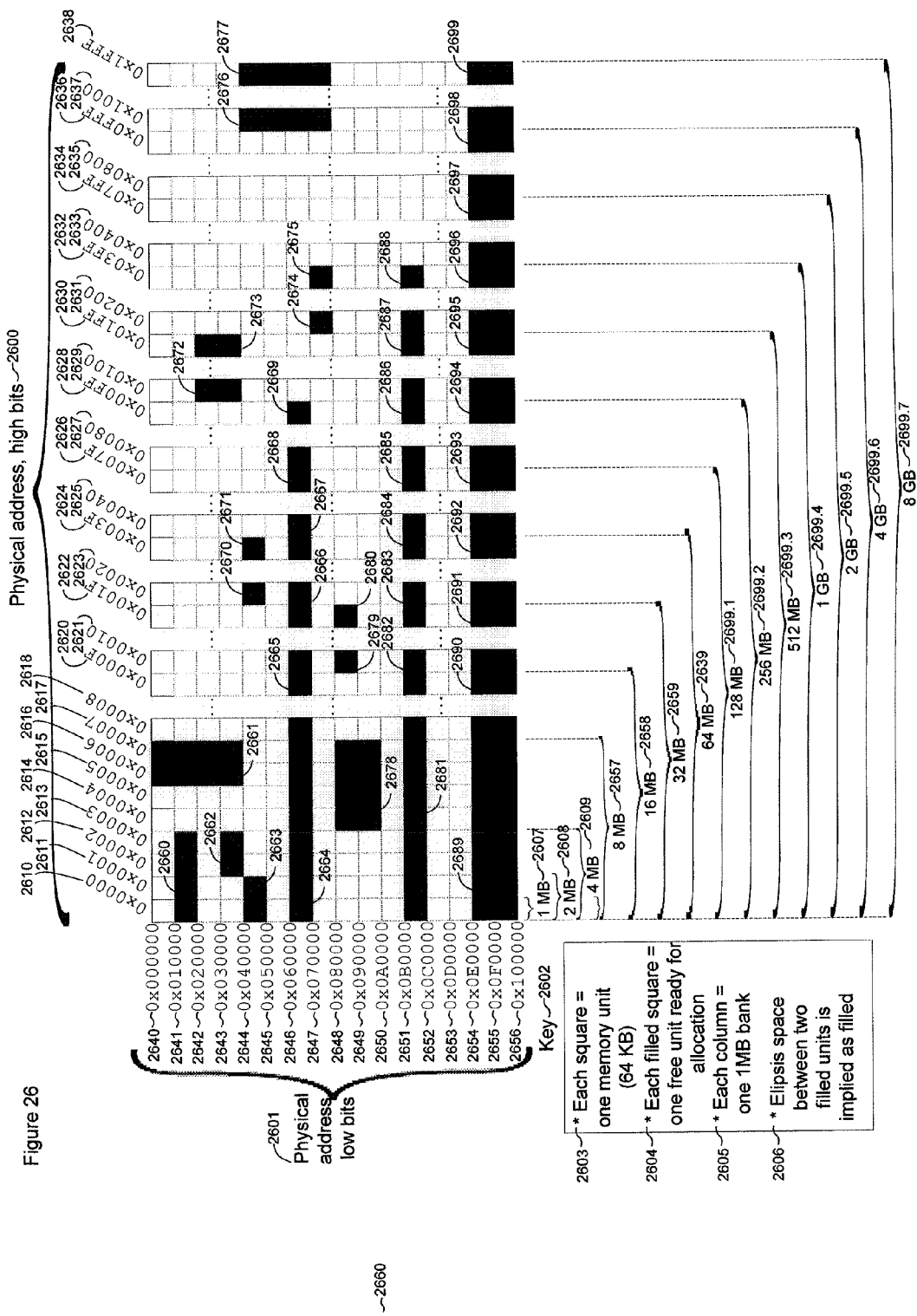
FIG. 26 depicts exemplary memory banks of a multi-tiered system utilizing the integrated processor core of FIG. 1.

FIG. 26 depicts exemplary memory banks as columns 2610-2638, each providing 1 MB of memory (2605) to a Shared Memory System 2500. The memory banks are listed from left to right representing the lowest to highest parts of the physical address space respectively. A total of 8192 memory banks are represented, with ellipses between the first bank of the second 8 Megabytes (2618) and the last bank of the first 16 MB (2620), between the first bank of the second 16 MB (2621) and the last bank of the second 16 MB (2622), between the first bank of the second 32 MB (2623) and the last bank of the second 32 MB (2624), between the first bank of the second 64 MB (2625) and the last bank of the second 64 MB (2626), between the first bank of the second 128 MB (2627) and the last bank of the second 128 MB (2628), between the first bank of the second 256 MB (2629) and the last bank of the second 256 MB (2630), between the first bank of the second 512 MB (2631) and the last bank of the second 512 MB (2632), between the first bank of the second 1 GB (2633) and the last bank of the second 1 GB (2634), between the first bank of the second 2 GB (2635) and the last bank of the second 2 GB (2636), between the first bank of the second 4 GB (2637) and the last bank of the second 4 GB (2638).

Each square in FIG. 26 represents one memory unit 2603, which is 64 kilobytes (KB), which may simply be called a unit. The address range representing the first unit of each memory bank has the least significant address digits (2601) ranging from 0x000000 (2640) to 0x00FFFF; t address range representing the second unit of each memory bank always has the least significant address digits ranging from 0x010000 (2641) to 0x01FFFF, and so on (2642-2655).

The range of columns comprising the first 1 MB is labeled 2607, the first 2 MB is labeled 2608, the first 4 MB is labeled 2609, the first 8 MB is labeled 2657, the first 16 MB is labeled 2658, the first 32 MB is labeled 2659, the first 64 MB is labeled 2639, the first 128 MB is labeled 2699.1, the first 256 MB is labeled 2699.2, the first 512 MB is labeled 2699.3, the first 1 GB is labeled 2699.4, the first 2 GB is labeled 2699.5, the first 4 GB is labeled 2699.6, and the first 8 GB (in fact representing all the memory in the example) is labeled 2699.7.

For this example, in cases where an ellipsis column occurs and the units immediately to the left and right of the same ellipsis column in the same row (one of 2640-2655) are filled, the units represented by the ellipsis are implied as filled (see note 2606 of key 2602). Each filled square represents one free unit ready for allocation 2604. Therefore, two units in the same row separated by an ellipsis column implies many intervening free units in the same row, ready for allocation.

The high bits of the address range 2600 for a given memory bank are listed above its column 2610-2638. The system is able to treat physically discontiguous units as a virtual contiguous address range with only a single entry in each of the tables (2420, 2449) of the Virtual-to-physical address translator 2400. This enables the creation of very large virtually contiguous address regions with many physically discontiguous memory units. In some cases, thousands or more physically discontiguous units join to create very large virtual address regions, such as the memory units comprising the free set of units 2681, 2682, 2683, 2684, 2685, 2686, 2687, 2688, which combine to create a 64 MB virtual contiguous address region with 1024 physically discontiguous units. A translation table capable of holding 1024 entries to represent the whole virtual address region at once would require considerable resources and place significant performance and cost constraints on the resulting system. The present system's ability to represent such a virtual contiguous address space with only a single table entry, or pair of entries across the coordinated tables, is a distinct advantage in cases where efficient translation of the full address region (such as in the case of random lookups) at any given moment via the primary translation mechanism is a design criteria.

This is of increased importance when many virtual processors share a data structure that no single virtual processor has the memory space to accommodate. The importance also increases when the cost of accessing the data structure at an unpredictable time is low, as in the case of cores that are time sliced so that each virtual processor runs relatively slow, thereby reducing the penalty of memory access latency and increasing the performance of reduced overhead for each memory access. For these reasons use of the primary memory address translation mechanism for arbitrary accesses within a virtual contiguous address space may be important and the system of high value.

FIG. 26 contains many examples of virtual contiguous memory regions (VCMR) that can be represented by single translation entries (or entry pairs in the case that two tables are used, joined by an Arbiter) in the system. Example 2660 may be allocated as a single 256 KB VCMR spanning the first 4 banks (2610, 2611, 2612, 2613). Example 2661 may be allocated as a single 512 KB VCMR spanning two banks (2616, 2617) with four units per bank. Example 2662 may be allocated as a single 128 KB VCMR spanning banks 2612, 2613 with one unit per bank. Example 2663 may be allocated as a single 128 KB VCMR spanning banks 2610, 2611 with one unit per bank. An example comprising 2672 & 2673 may be allocated as a single 32 MB VCMR spanning banks 2629 & 2630 and all banks between (256 banks in total), with two units per bank.

An example comprising 2670 & 2671 may be allocated as a single 2 MB VCMR spanning banks 2623 & 2624 and all banks between (32 banks in total), with one unit per bank. An example comprising 2679 & 2680 may be allocated as a single 1 MB VCMR spanning banks 2621 & 2622 and all banks between (16 banks in total), with one unit per bank. An example comprising 2678 may be allocated as a single 512 KB VCMR spanning banks 2614, 2615, 2616, & 2617 with two units per bank.

An example comprising 2674 & 2675 may be allocated as a single 32 MB VCMR spanning banks 2631 & 2632 and all banks in-between (512 in total) with one unit per bank. An example comprising 2676 & 2677 may be allocated as a single 1 GB VCMR spanning banks 2637 & 2638 and all banks in-between (4096 in total) with four units per bank.

Finally, an example comprising 2689-2699 may be allocated as a single 1 GB VCMR spanning banks 2610 through 2638 and all banks in-between (8192 in total) with two units per bank.

Figure 27:
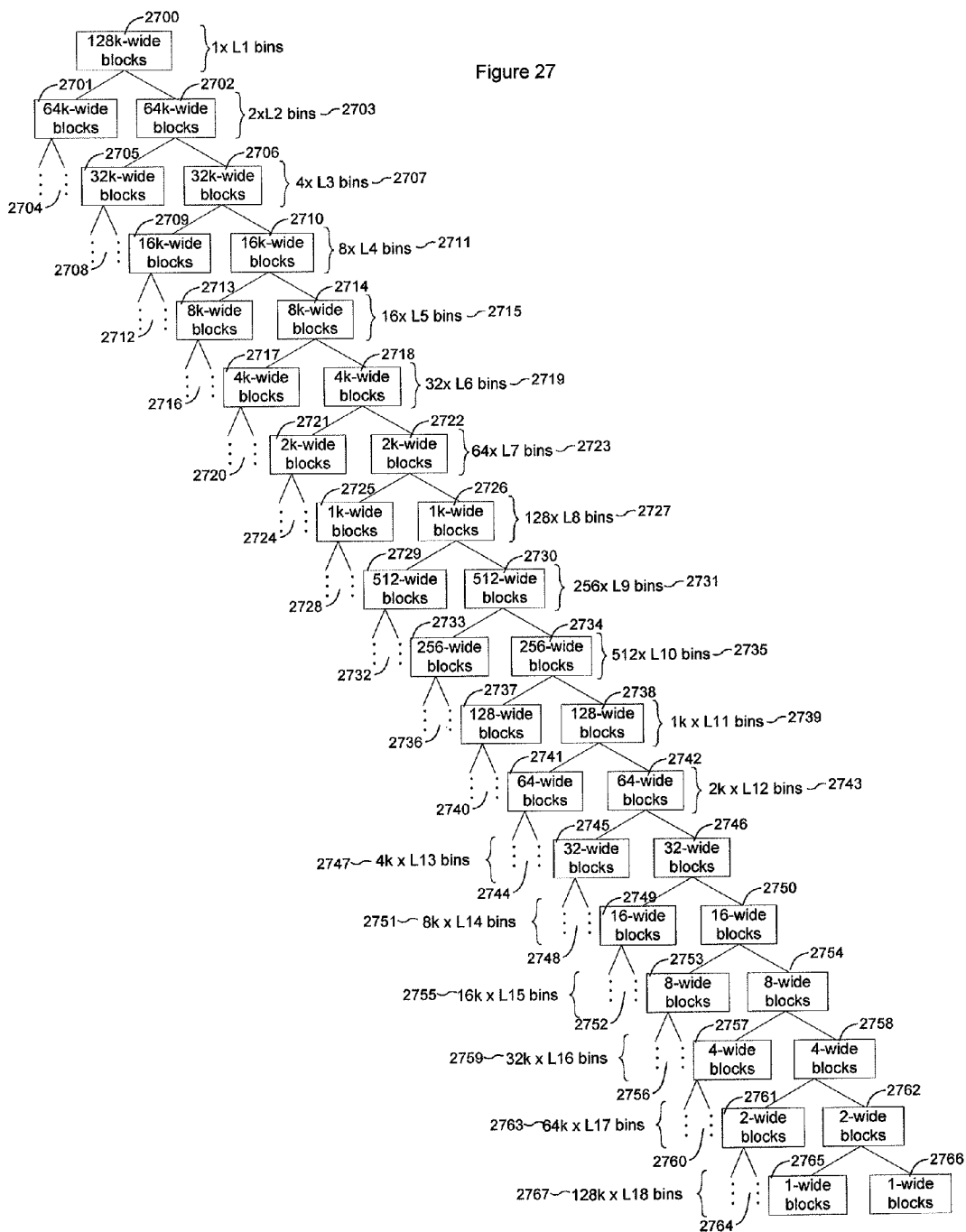
FIG. 27 depicts a tree data structure of memory blocks of a multi-tiered system utilizing the integrated processor core of FIG. 1.

FIG. 27 depicts a tree data structure with 18 levels of depth (sometimes called height). The tree organizes data regarding potential VCMR allocations. In this diagram, potential VCMR allocations are called blocks. A block spanning only one memory bank is called "1-wide", whereas a block spanning two memory banks is called "2-wide" and so-on. The largest number of banks that can be spanned in the example of FIG. 27 is 131,072 ("128 k", or 128*1024 since "k" denotes a unit of 1024 in FIG. 27). Each rectangle 2700, 2701, 2702, 2705, 2706, 2709, 2710, 2713, 2714, 2717, 2718, 2721, 2722, 2725, 2726, 2729, 2730, 2733, 2734, 2737, 2738, 2741, 2742, 2745, 2746, 2749, 2750, 2753, 2754, 2757, 2758, 2761, 2762, 2765, 2766, represents a bin data structure into which data structures representing available blocks may be placed. It is noteworthy that in the literature, the term "bin" is sometimes used as a shortening of the word "binary" and is sometimes used as a file extension since file extensions of three letters are a standard method of labeling files; this is not the intended meaning of the term "bin" in this document. In this document the term "bin" is the same as "bucket," as in, for example, the Bucket Sort algorithm. We define the term "bin" here to be a means of collecting multiple pieces of data together. A tree of bins is a tree data structure in which each node has a bin data structure associated within which multiple pieces of data may reside and within which some method of organizing, such as linked list, table, or hash table may be employed. The ellipses 2704, 2708, 2712, 2716, 2720, 2724, 2728, 2732, 2736, 2740, 2744, 2748, 2752, 2756, 2760, 2764 represent the additional bins at a given level 2707, 2711, 2715, 2719, 2723, 2727, 2731, 2735, 2739, 2743, 2747, 2751, 2755, 2759, 2763, 2767 respectively.

The data structure or data for each bin preferably contains a pointer to a parent bin. Put another way, a bin for a given level LX contains a pointer to a parent bin of level LX−1. Additionally, the data structure or data associated with each bin preferably contains two pointers to two child bins at level LX+1, one designated "left" and one designated "right". Every virtual processor in the system is associated with a particular memory bank and maintains a pointer to the bin 2764, 2765, 2766 that holds 1-wide blocks (2767) for that bank. The parent of said 1-wide bin (one of 2760, 2761, 2762 from the set of 65536 L15 bins 2763) will contain 2-wide blocks that include that bank. In one preferred embodiment of the system, the blocks are restricted to be aligned according to their width. This limits the positions at which an n-wide block can begin. If the first bank is at index 0, and the second at index 1, and so on, then 2-wide banks must begin with an even bank number (0, 2, 4, 6, 8 ... etc.). Furthermore, 4-wide banks must begin at a bank with an index that is divisible by 4, 8-wide banks must begin at a bank with an index that is divisible by 8, and so on, for all widths.

Figure 28:
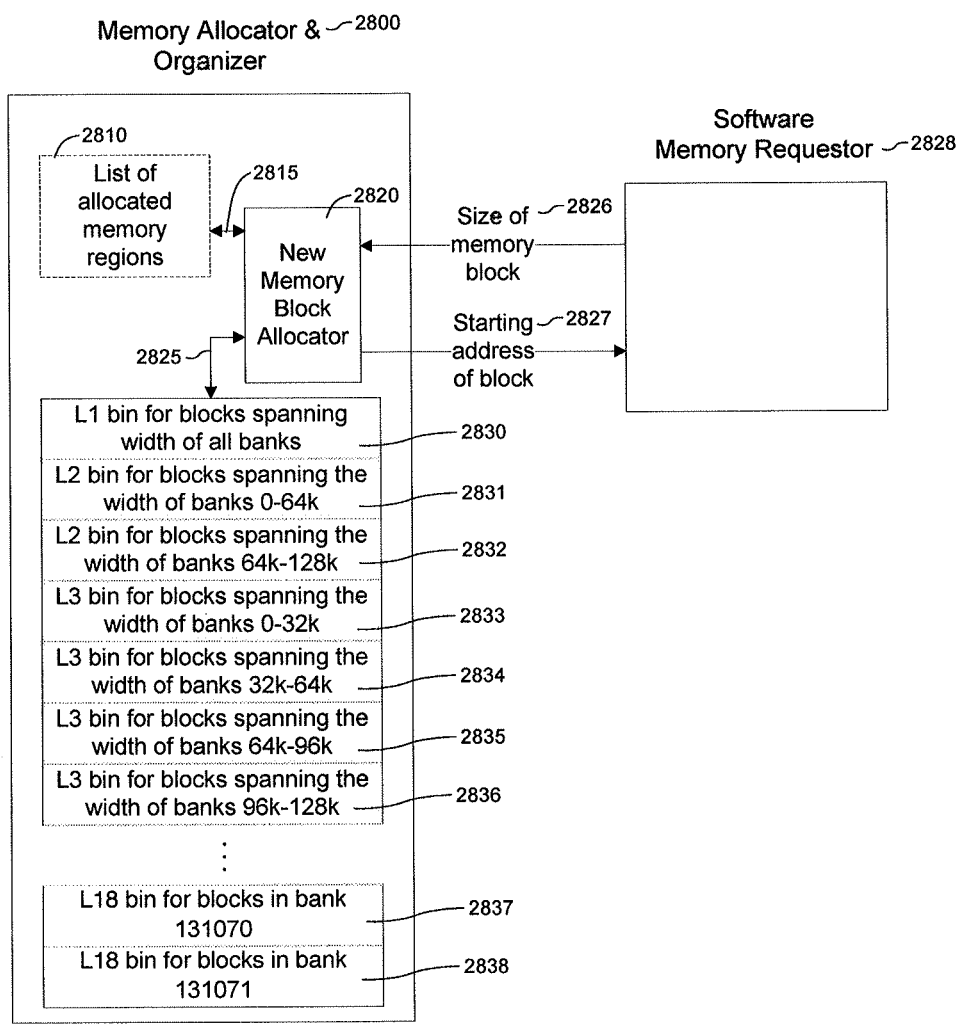
FIG. 28 depicts a Memory Allocator & Organizer of a multi-tiered system utilizing the integrated processor core of FIG. 1.

FIG. 27 shows that there is exactly one L1 bin 2700 containing 128 k-wide blocks (spanning 128 k memory banks), and it has child bins 2701 and 2702 which are the only L2 bins 2703 and contain blocks spanning 64 k memory banks FIG. 28 depicts a Memory Allocator & Organizer 2800 able to utilize the bins organized in the tree structure of FIG. 27. The List of allocated memory regions 2810 is connected via bidirectional link 2815 with the New Memory Block Allocator 2820. Similar to previous examples, the Software Memory Requestor 2828 requests a memory block of a certain size designated by the "Size of memory block" communication 2826 which is received as input by the New Memory Block Allocator 2820. The New Memory Block Allocator 2820 connects via bidirectional link to data structures 2830-2838 which implement the tree of bins data structure of FIG. 27. The Starting address of block 2827 communication is similar to that shown in previous examples.

Figure 29:
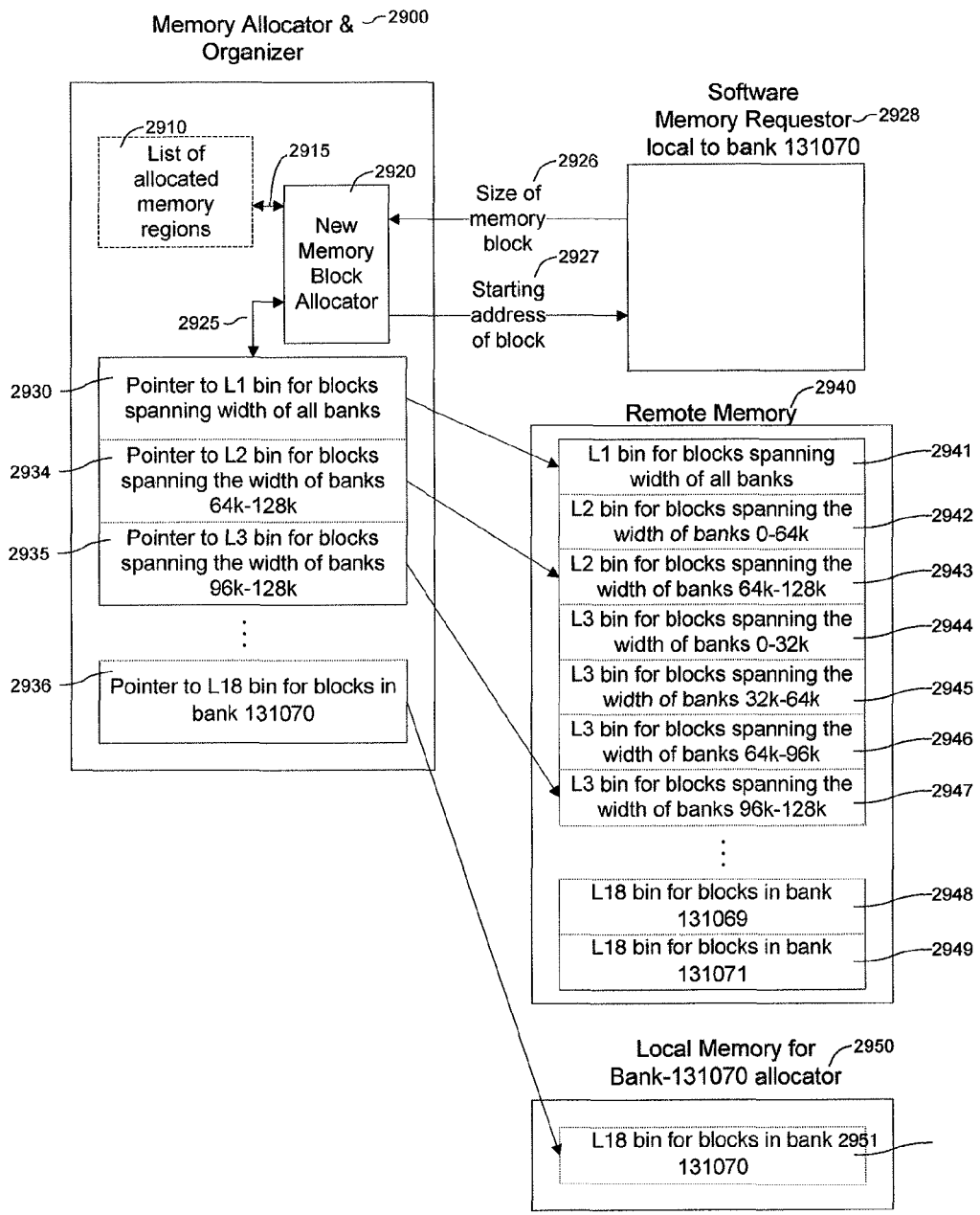
FIG. 29 depicts a Memory Allocator & Organizer of a multi-tiered system utilizing the integrated processor core of FIG. 1.

FIG. 29 depicts a Memory Allocator & Organizer 2900 utilizing pointers 2930-2936 to bins in the tree of bins depicted in FIG. 27. Rather than holding the data of the bins internal to the unit 2900, only pointers (2930, 2934, 2935, 2936) to those bins necessary to allocate blocks that include the bank local to the "Software Memory Requestor local to bank 131070" 2928 are stored internal to the Memory Allocator & Organizer. Thus, only one pointer for each level of the tree data structure must be stored local to the New Memory Block Allocator 2920 handling "Size of memory block" 2926 requests from the "Software Memory Requestor" local to a given bank. Similarly, only a subset (e.g., 2941, 2943, 2947) of the data structures (2941-2949) implementing the bins of the tree data structure of FIG. 27 held in Remote Memory 2940 are pointed to by the Memory Allocator & Organizer 2900 associated with a Software Memory Requestor 2928 local to a given bank. The data structures that hold blocks for a given set of banks can be held in Remote Memory 2940 that is more local to that set of memory banks so that a collection of Memory Allocator & Organizers 2900 can be distributed amongst the memory banks they organize and more local to the particular set of bins they uniquely operate upon. The embodiment depicted in FIG. 29 shows the L16 bin for blocks in bank 131070 (2951) is stored in Local Memory for Bank-131070 allocator (2950), which can improve the performance of the Memory Allocator & Organizer 2900 servicing the Software Memory requestor local to bank 131070 (2928). The "List of allocated memory regions", bidirectional links 2915, 2925, and return communication 2927 are similar to those of FIG. 28.

Figure 30:
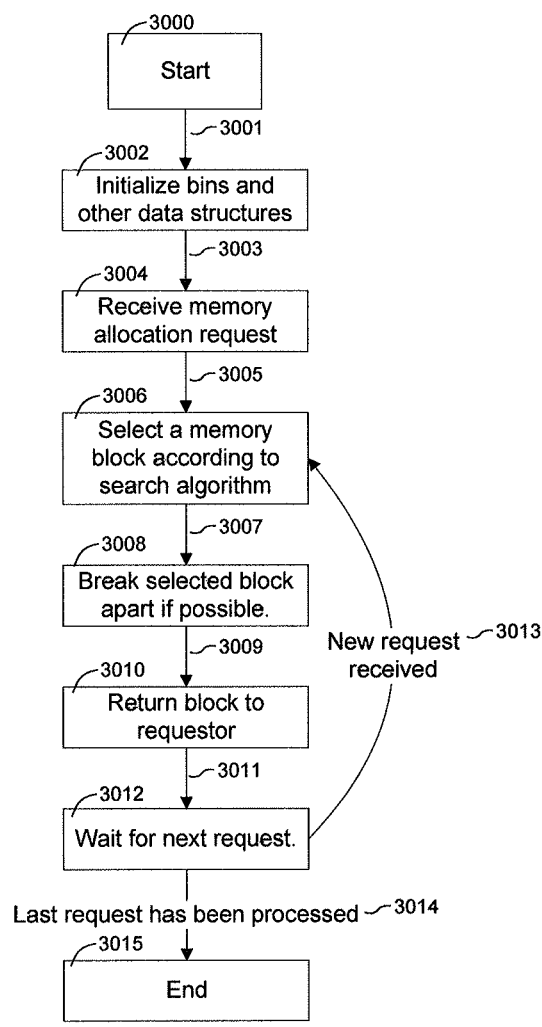
FIG. 30 depicts an embodiment of a process of fulfilling memory allocation requests of a multi-tiered system utilizing the integrated processor core of FIG. 1.

FIG. 30 depicts an embodiment of a process of the system whereby an algorithm is employed to fulfill memory allocation requests. The "start" step 3000 begins the process depicted in FIG. 30. The process immediately proceeds to the "Initialize bins and other data structures" step 3002 via link 3001. In this step, the bin data structures (2830-2838, 2941-2949, 2951) implementing the bins of the tree data structure, such as the example of FIG. 27, are initialized along with support data structures. The initialization process prepares the data structures for processing by the memory block request servicing search algorithm. In one preferred embodiment all of the bins are maintained as empty except for the L1 bin 2700, which has a single entry representing all of the unallocated memory units of the system as a single block spanning all of the memory banks and all of the memory units of each bank. After the completion of Step 3002, the process proceeds to step 3004 via link 3003.

The "Receive memory allocation request" step 3004 is proceeded to via link 3003. In this step 3004, the Memory Allocation & Organizer 2900 receives a memory allocation request of a particular "Size of memory block" 2926 from a particular Software Memory Requestor 2928. After the completion of Step 3004, the process proceeds to step 3006 via link 3005.

The "Select a memory block according to search algorithm" step 3006 is proceeded to via link 3005. In this step 3006, a search algorithm is employed which processes the tree of bins data structure of FIG. 27 stored in Remote 2940 and Local Memory 2950 and accessed via pointers such as 2930-2936. A preferred embodiment of said search algorithm is described below. After the completion of Step 3006 the process proceeds to step 3008 via link 3007.

The "Break selected block apart if possible" step 3008 is proceeded to via link 3007. In this step 3008, the block selected using the search algorithm of step 3006 is broken into smaller blocks if possible. This is possible if the block that was found using the search algorithm was larger, (or may be required to be significantly larger) than the original memory allocation request. To avoid allocating a block larger than necessary, which would otherwise be wasteful, a breaking up process is employed in order to reduce the size of the block that is dedicated to the fulfillment of the memory allocation request. The pieces that will not be used toward the fulfillment of the memory allocation request will be organized in the appropriate bins of the tree data structure so that they can fulfill future memory allocation requests. After the completion of Step 3008, the process proceeds to step 3010 via link 3009.

In the "Return block to requestor" step 3010, the memory block that has been dedicated to the fulfillment of the memory allocation request is returned as the Starting address of block 2927 to the original Software Memory Requestor 2928. After the completion of Step 3010 the process proceeds to step 3012 via link 3011.

In the "Wait for next request" step 3012, the next request for memory 2926, which will be received from a Software memory Requestor 2928, is waited for by the Memory Allocation & Organizer 2900. If all of the memory requests have been processed, the "Last request has been processed" link 3014 is followed. Otherwise, the process returns to step 3006 via the "New request received" link 3013. After the completion of Step 3012, the process proceeds to either step 3006 via the "New Request Received" link 3013 OR proceeds to "End" step 3015 via the "Last request has been processed" link 3014. If the "Last request has been processed" link 3014 is followed then the process reaches its End 3015.

Figure 31:
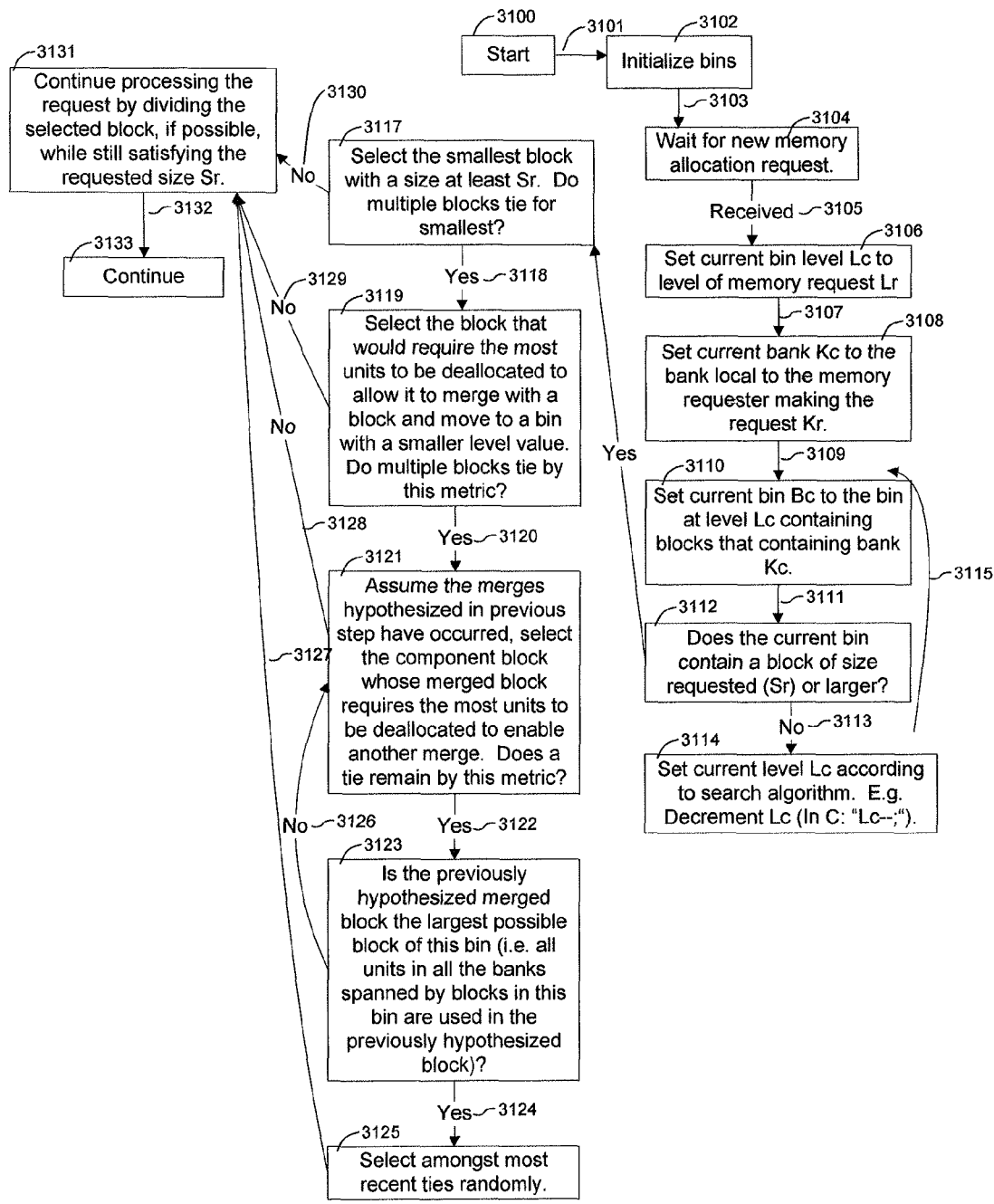
FIG. 31 depicts a preferred embodiment of a search algorithm of the process of FIG. 30.

FIG. 31 depicts a preferred embodiment of the search algorithm (employed by the system) of FIG. 30 step 3006. The "Start" Step 3000 begins the process depicted in FIG. 31. The process immediately proceeds to the "Initialize bins" Step 3102 via link 3101. After the completion of Step 3102, the process proceeds to step 3104 via link 3103.

The process stays in the "Wait for new memory allocation request" step 3104 until a Software Memory Requestor 2928 requests a new memory allocation. After the completion of Step 3104, the process proceeds to Step 3106 via the "Received" link 3105.

In the "Set current bin level Lc to level of memory request Lr" Step 3106, a variable named Lc is initialized with the value Lr. Lr represents the level of the memory request. The level of the memory request is an additional communication sent by the Software Memory Requestor 2928 to the Memory Allocation & Organizer 2900, which indicates the level of bin at which the Software Memory Requestor 2928 would ideally like the block for the fulfillment of the memory allocation request to be drawn. Implicit in the designation of the level is the designation that the bank that is local to the Software Memory Requestor 2928 is included in the block. In another preferred embodiment, the Software Memory Requestor can further specify a bit indicating whether or not it is a priority for the bank local to the Software Memory Requestor 2928 to be included in the block selected for the fulfillment of the memory block allocation request. After the completion of Step 3106, the process proceeds to step 3108 via link 3107.

In the "Set current bank Kc to the bank local to the memory requester making the request Kr" Step 3108, the variable Kc is defined and set to the bank that is local to the memory requestor 2928, which is defined as Kr. In the example of FIG. 29, Kr is, for The Software Memory Requestor 2928, local to bank 131070. After the completion of Step 3108, the process proceeds to Step 3110 via link 3109.

In the "Set current bin Bc to the bin at level Lc containing blocks that contain bank Kc" Step 3110, the variable Bc is defined and set to a particular bin. The bin that Bc is set to is within level Lc, which is initially the bin level requested by the Software Memory Requestor Lr. In one preferred embodiment a restriction of the memory blocks to be aligned with their size restricts them such that only one bin at level Lc contains blocks that may utilize units of bank Kc. The bin Bc is set to that bin at Lc that contains blocks that include units from bank Kc. Upon repeat visitations to step 3110, if any, the level Lc will differ from Lr, such as being equal to Lc+1 in the case that Lc is incremented between the current visitation to step 3110 and a future visitation to step 3110. In one preferred embodiment, it is possible for the value Lc to return to Lr in subsequent visits to step 3110, allowing a more exhaustive search of bins for the selection of the block dedicated to the fulfillment of the memory block allocation request. After the completion of Step 3110, the process proceeds to Step 3112 via link 3111.

The "Does the current bin contain a block of size requested (Sr) or larger?" Step 3112 is proceeded to via link 3111. The size of the requested memory block is communicated via 2926 and has the value Sr. In this step 3112, the blocks held within bin Bc are analyzed to ascertain whether there is a block of sufficient size to fulfill the memory block request. If so, the process proceeds to Step 3117 via the "Yes" link 3116. Otherwise, the process proceeds to Step 3114 via the "No" link 3113. After the completion of Step 3112, the process proceeds to Step 3114 via the "No" link 3113 or to Step 3117 via the "Yes" link 3116.

The "Set current level Lc according to search algorithm. E.g., Decrement Lc (In C: "Lc--;")" Step 3114 is proceeded to via the "No" link 3113. This step is reached in the event that the bin Bc at level Lc does not contain a memory block of sufficient size to satisfy the memory block allocation request. In order to find a satisfactory memory block, a new bin must be selected for analysis. The first part of selecting the next bin for analysis is modifying the parameters by which the bin is selected. In the case of step 3114, the level of the bin that will be searched Lc is modified. One way in which it can be modified is by decrementing its value from its current value Lc to a new value of Lc−1, which is written in the C programming language as "Lc--;". This causes the search algorithm to proceed higher in the tree of FIG. 27.

In another embodiment the algorithm might proceed differently, such as proceeding up in the tree during some steps of the search, and downwards other times, so as to perform a more exhaustive search of the tree leaves before proceeding to the upper levels of the tree. Such a technique might be employed so as to preserve blocks that remain in bins at the upper levels of the tree so that they are dedicated toward those memory allocation requests for which they are absolutely needed, thereby improving the likelihood that future requests for larger memory blocks will be able to be satisfied. In another preferred embodiment, the Software Memory Requestor 2928 designates the search algorithm that is to be employed when it makes the memory block allocation request. The compiler may vary the technique requested by a given line of code, or in a given runtime situation, so as to optimize the layout of the data structures in memory that is eventually arrived upon. The compiler may use profiler feedback to drive this search, which proceeds over separate runs of a user program. After the completion of Step 3114, the process proceeds to step 3110 via the 3115 link. After the completion of Step 3112, the process proceeds to Step 3117.

The "Select the smallest block with a size at least Sr. Do multiple blocks tie for smallest?" via the "Yes" link 3116. This step is reached once a bin has been found Bc that contains at least one memory block that is of sufficient size to satisfy the memory block allocation request. This step 3116 determines whether multiple such blocks are contained in bin Bc, and if so the set of satisfactory blocks within Bc may presently be said to be tied for selection. In this case the process proceeds via the "Yes" link 3118 to step 3119 for a tie-breaking process, otherwise the "No" link 31130 is followed to step 3131 since no tie-breaking process is necessary. After the completion of Step 3117 the process proceeds to step 3131 via "No" link 3130 or proceed to step 3119 via the "Yes" link 3118.

The "Select the block that would require the most units to be deallocated to allow it to merge with a block and move to a bin with a smaller level value. Do multiple blocks tie by this metric?" Step 3119 is proceeded to via link 3118. In this step 3118, one tie-breaking technique is attempted in which the units in other parts of the tree are analyzed as to whether they are presently allocated or unallocated. The idea is that superior allocations are arrived upon by improving the likelihood that future deallocations of memory blocks will result in larger memory blocks higher in the tree data structure of FIG. 27. This technique of optimizing for future deallocations encourages the selection of a block for the current memory block allocation request that is less likely to be able to contribute to a future merger of blocks from bins in lower levels to produce a block for a bin at a higher level. Blocks for which more units would need to be deallocated to allow for their merge are less likely to be needed for a future merger, and therefore their selection is of higher priority, which is the operation this step 3119 performs. Another term for this prioritization scheme is "fragmentation avoidance", or "optimization for future defragmentation", which derive from the term "fragmentation", meaning separation of larger memory blocks which are more valuable into smaller memory blocks which are less valuable (e.g., for purposes of quickly finding satisfactory memory blocks for memory block allocation requests). If, after applying the heuristic of step 3119 a tie is still present, the process proceeds to step 3121 via the "Yes" link 3120, otherwise it proceeds to step 3131 via the "No" link 3129. After the completion of Step 3119, the process proceeds to step 3131 via the "No" link 3129 or step 3121 via the "Yes" link 3120.

The "Assume the merges hypothesized in previous step have occurred, select the component block whose merged block requires the most units to be deallocated to enable another merge. Does a tie remain by this metric?" Step 3121 is proceeded to via link 3120. In this step, the tie-breaking metric of step 3119 is taken further so that those blocks requiring the same number of units to be deallocated before they can merge and become blocks at a higher level in the tree have their ties broken. (Note that since the highest level of the tree has a level index of 1, a higher level in the tree implies a lower index for that level). The ties are broken in this step by comparing the number of units that must be deallocated in order for the blocks to merge twice, once to move up a single level in the tree, and again to move up two levels in the tree. This tie-breaking method can be employed more than twice if ties persist. This is depicted in FIG. 31 as step 3121 being the first step in a two-step loop comprising steps 3121 and 3123. Step 3123 acts as an escape in the case that we arrive at ties that persist even after the largest possible block (spanning all possible banks in the entire system) is considered. If a tie persists, the process proceeds to step 3123. Otherwise, the loop is escaped by proceeding to step 3131.

In another preferred embodiment the merges hypothesized by step 3121 may be vertical merges within a bin, meaning that they do not integrate additional banks but rather additional adjacent units within those banks. In yet another embodiment the selection of with merge to hypothesize during a given encounter with step 3121 is determined by the original memory block allocation request and can be customized by the compiler during recompilation in order to improve the allocations that are arrived at for better performance. After the completion of Step 3121, the process proceeds to Step 3131 via the "No" link 3128 or to Step 3123 via the "Yes" link 3122.

The "Is the previously hypothesized merged block the largest possible block of this bin (i.e. all units in all the banks spanned by blocks in this bin are used in the previously hypothesized block)?" Step 3123 is proceeded to via link 3122. In one preferred embodiment, this step analyzes whether the hypothesized block of step 3121 spans all units of the banks that comprise it, and proceeds via "Yes" link 3124 if so, otherwise it proceeds via "No" link 3126. In another preferred embodiment, the question analyzed in step 3123 is whether the block hypothesized previously in step 3121 spanned all possible banks. If so, the process proceeds via "Yes" link 3124 to step 3125. Otherwise, it proceeds via "No" link 3126 to step 3121. After the completion of Step 3123, the process proceeds to step 3121 via the "No" link 3126 or the process proceeds to Step 3125 via like 3124.

The "Select amongst most recent ties randomly" Step 3125 is proceeded to via link 3124. In this step, the remaining blocks that tie for selection are selected amongst randomly because the set of heuristics employed in the loop including steps 3121 and 3123 have failed to break the tie. After the completion of Step 3125 the process proceeds to Step 3131 via link 3127.

The "Continue processing the request by dividing the selected block, if possible, while still satisfying the requested size Sr." Step 3131 is proceeded to via link 3127. This step signifies process depicted in FIG. 32. After the completion of Step 3131 the process proceeds to step 3133 via link 3132.

Figure 32:
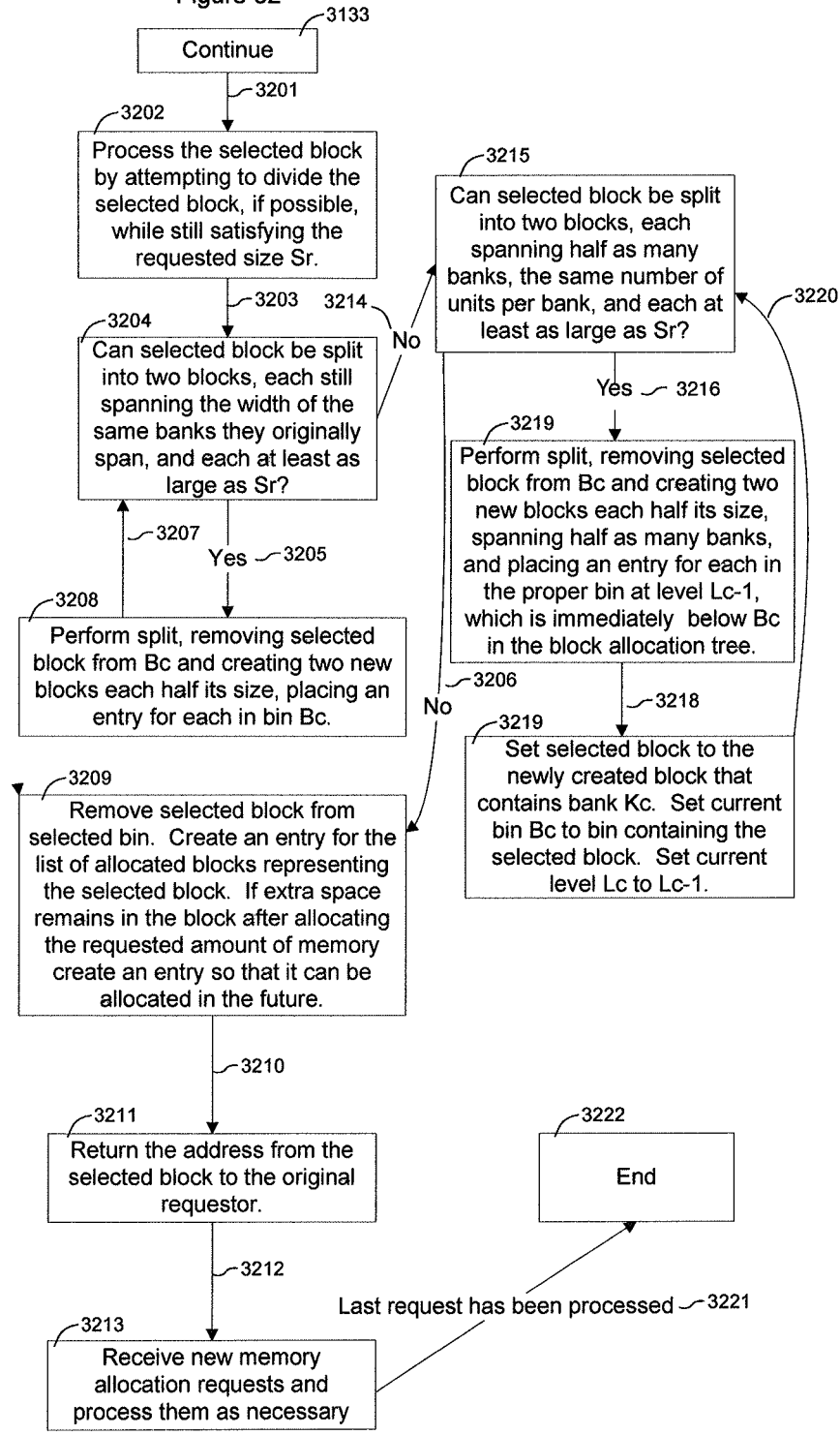
FIG. 32 depicts a process of a multi-tiered system utilizing the integrated processor core of FIG. 1 by which a block selected for fulfillment of a memory block allocation request is refined.

The "Continue" Step 3133 is proceeded to via link 3132, and is the same as step 3133 depicted in FIG. 32. After the completion of Step 3133, the process proceeds to FIG. 32.

FIG. 32 depicts the process by which a block selected for fulfillment of a memory block allocation request, which has already been validated as sufficiently large, is refined so that it is not be overly large relative to the size of the memory block allocation request.

The "Continue" Step 3133 begins the process depicted in FIG. 32. The process immediately proceeds to the "Process the selected block by attempting to divide the selected block, if possible, while still satisfying the requested size Sr." Step 3202 via link 3201. This step 3202 is a summary of the goal of the subsequent steps. After the completion of Step 3202, the process proceeds to step 3204 via link 3203.

The "Can selected block be split into two blocks, each still spanning the width of the same banks they originally span, and each at least as large as Sr?" Step 3204 is proceeded to via link 3203. In this step, the number of units per bank in the selected block is reduced if possible, and this is iteratively performed through the loop including steps 3204 and 3208. After the completion of Step 3204 proceed to Step 3215 via the "No" link 3214 or continue to step 3208 via the "Yes" link 3205.

The "Perform split, removing selected block from Bc and creating two new blocks each half its size, placing an entry for each in bin Bc." Step 3208 is proceeded to via link 3205. In this step, the split hypothesized in step 3204, which reduces the number of units per bank dedicated to the fulfillment of the memory block allocation request, is reduced if possible. This is iteratively performed until no longer possible through the loop involving steps 3204 and 3208. After the completion of Step 3208, the process returns to step 3204 via link 3207 and repeats the splitting until proceeding to Step 3215 via the "No" link 3214.

The "Can selected block be split into two blocks, each spanning half as many banks, the same number of units per bank, and each at least as large as Sr?" Step 3215 is proceeded to via link 3214. In this step 3215, the selected block is reduced, if possible, by reducing the number of banks spanned by the block but maintaining the number of units per bank that are part of the block. This step 3215 is performed iteratively with step 3217 and 3219 until the selected block can no longer be split and still maintain a size of Sr or greater, at which point the "No" link 3206 is taken. After the completion of Step 3215 the process proceeds to Step 3209 via the "No" link 3206 or the process proceeds to Step 3217 via the "Yes" link 3216.

The "Perform split, removing selected block from Bc and creating two new blocks each half its size, spanning half as many banks, and placing an entry for each in the proper bin at level Lc−1, which is immediately below Bc in the block allocation tree." Step 3217 is proceeded to via link 3216. In this step 3217, the split hypothesized in step 3215 is performed, which requires removing the originally selected block from the bin in which it resided, and placing two new entries, each spanning half as many banks as the block that was selected at the beginning of step 3217, into the appropriate bins lower in the tree of bins. This step 3217 occurs in a loop including step 3215 and 3219. After the completion of Step 3217, the process proceeds to step 3219 via link 3218.

The "Set selected block to the newly created block that contains bank Kc. Set current bin Bc to bin containing the selected block. Set current level Lc to Lc−1." Step 3219 is proceeded to via link 3218. The newly created block from step 3217 that contains the memory bank that is local to the original Software Memory Requestor 2928 is then selected. This step 3219 occurs in a loop including step 3215 and 3217. After the completion of Step 3219, the process proceeds to step 3215 via link 3220 and repeats the splitting iteratively through the loop (3215, 3217, 3219) until proceeding to Step 3209 via the "No" link 3206.

The "Remove selected block from selected bin. Create an entry for the list of allocated blocks representing the selected block. If extra space remains in the block after allocating the requested amount of memory create an entry so that it can be allocated in the future" Step 3209 is proceeded to via link 3206. This link begins the post-refinement stage of the memory block allocation request fulfillment process. By the time step 3209 is reached, the selected block has been refined to a size that is within a factor of two of the memory block allocation request. In this step 3209, the selected block is removed from its bin and a representation of it for the list of allocated blocks 2910 is created. In step 3209, units are removed from the selected block that are not required to achieve the satisfactory size Sr. These units are placed in the appropriate bin for their future possible allocation. This step 3209 furthermore may create an entry for memory allocations that are requested at sizes smaller than a single unit, and such entries may be consulted first before the block allocation mechanisms are used. Profiling may guide the system that allocates for the fulfillment of these smaller memory requests in order to optimize for reduced fragmentation. After the completion of Step 3209, the process proceeds to step 3211 via link 3210.

The "Return the address from the selected block to the original requestor" Step 3211 is proceeded to via link 3210. In this step, the requestor 2928 receives the starting address of block 2927 so that it can continue execution. After the completion of Step 3211, the process proceeds to step 3213 via link 3212.

The "Receive new memory allocation requests and process them as necessary" Step 3213 is proceeded to via link 3212. If a memory allocation request is received then processing proceeds to step 3106 of FIG. 31. Otherwise, the completion of Step 3213 causes process to proceed to the "End" step 3222 via the "Last request has been processed" link 3221.

Figure 33:
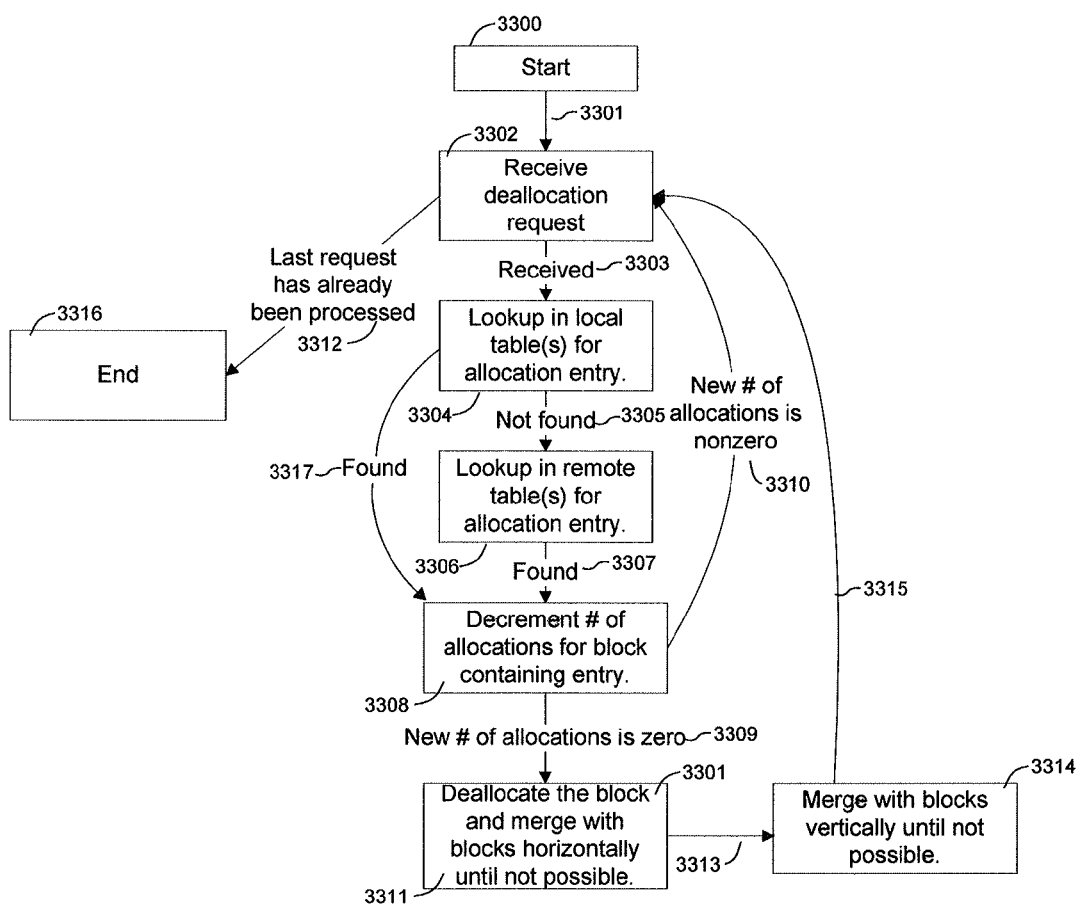
FIG. 33 depicts an exemplary process by which deallocation requests are serviced in a multi-tiered system utilizing the integrated processor core of FIG. 1.

FIG. 33 depicts an exemplary process by which deallocation requests are serviced. The "Start" step 3300 begins the process depicted in FIG. 33. The process immediately proceeds to the "Receive deallocation request" Step 3302 via link 3301. If there are no more deallocation requests to process, the process proceeds via the "Last request has already processed" link 3312 to the End 3316. Otherwise, the process proceeds to Step 3304 via the "Received" link 3303.

The "Lookup in local table(s) for allocation entry" Step 3304 is proceeded to via link 3303. In this step 3304, a local List of allocated memory regions 2910 is searched for the entry representing the allocation that is to be deallocated. The list 2910 may be implemented as a table, hash table, or list. The lookup is performed using the address that was passed to the Memory Allocator & Organizer for deallocation. If found, the process proceeds via the "Found" link 3317 to step 3308. Otherwise, the process proceeds to Step 3306 via the "Not found" link 3305.

The "Lookup in remote table(s) for allocation entry" Step 3306 is proceeded to via link 3305. In this step 3306, one or more remote Lists of allocated memory regions 2910 are searched for the entry representing the allocation that is to be deallocated. The list 2910 may be implemented as a table, hash table, or list. The lookup is performed using the address that was passed to the Memory Allocator & Organizer for deallocation. After the completion of Step 3306, the process proceeds to step 3308 via the "Found" link 3307. (If the entry is not found, an error message is returned to the Software Memory Requestor 2928 indicating that no allocation can be deallocated because none correspond to the address that was passed for deallocation.)

The "Decrement # of allocations for block containing entry" Step 3308 is proceeded to via link 3307. In this step 3308, the "# of allocations" attribute of the found entry is decreased by 1. The "# of allocations" attribute represents the number of times that block has been used to satisfy allocations that have not yet been deallocated. The block cannot return to a bin in the tree of bins for a new allocation until all of the allocations made from that block have been deallocated. (The block may be used to provide new allocations, prior to complete deallocation, using non-block-based searching and allocating schemes, or by freeing sub-blocks prior to complete deallocation). If the new "# of allocations" value for the block is nonzero the process proceeds to Step 3302 via the "New # of allocations is nonzero" link 3310, otherwise it proceeds to step 3311 via the "New # of allocations is zero" link 3309.

The "Deallocate the block and merge with blocks horizontally until not possible" Step 3311 is proceeded to via link 3309. In this step 3311, the found block begins the process of being completely deallocated. This is done by merging the found block with other blocks that are adjacent. In one preferred embodiment, the block adjacent to the found block must be aligned with its size and a merged block must also be aligned with its size. For example, a block comprising four banks with two units per bank, where the units are numbered starting from zero, and the banks are numbered starting from zero, must begin on an even-numbered unit number and begin on a bank number divisible by four, and can only be merged in step 3311 with an adjacent block comprising four banks and two-unit-per-bank block also comprising the same unit numbers in each bank, and the merged block must start on a bank number divisible by eight. This merging process continues for the newly created merged block until no more merges can be performed. In one example, it may be that a block comprising a single bank and a single unit per bank is deallocated, and this leads to a two-bank single-unit-per-bank block being created through a merge, and so on until a block comprising all of the banks with one unit per bank (that unit having the same index in each bank) is created. After the completion of Step 3311, the process proceeds to step 3314 via link 3313.

The "Merge with blocks vertically until not possible" Step 3314 is proceeded to via link 3313. In this step 3314, the found (and possibly merged in step 3311) block begins the process of being completely deallocated. This is done by merging the found block with other blocks that are adjacent. In one preferred embodiment, the block adjacent to the found block must be aligned with its size and a merged block must also be aligned with its size. For example, a block comprising two units per bank for the constituent banks, where the units are numbered starting from zero, must begin on an even-numbered unit number, and can only be merged in step 3314 with an adjacent two-unit-per-bank block also comprising the same banks, and the merged block must start on a unit number divisible by four. This merging process continues for the newly created merged block until no more merges can be performed. In one example, it may be that a block comprising a single unit per bank is deallocated, and this leads to a two-unit-per-bank block being created through a merge, and so on, until a block comprising all of the units of the constituent banks is created. After the completion of Step 3114 the process returns to step 3302 via link 3315.

Step 3302 proceeds to the "End" Step 3316 if the "Last request has already been processed" 3312 via link 3312.

Figure 34:
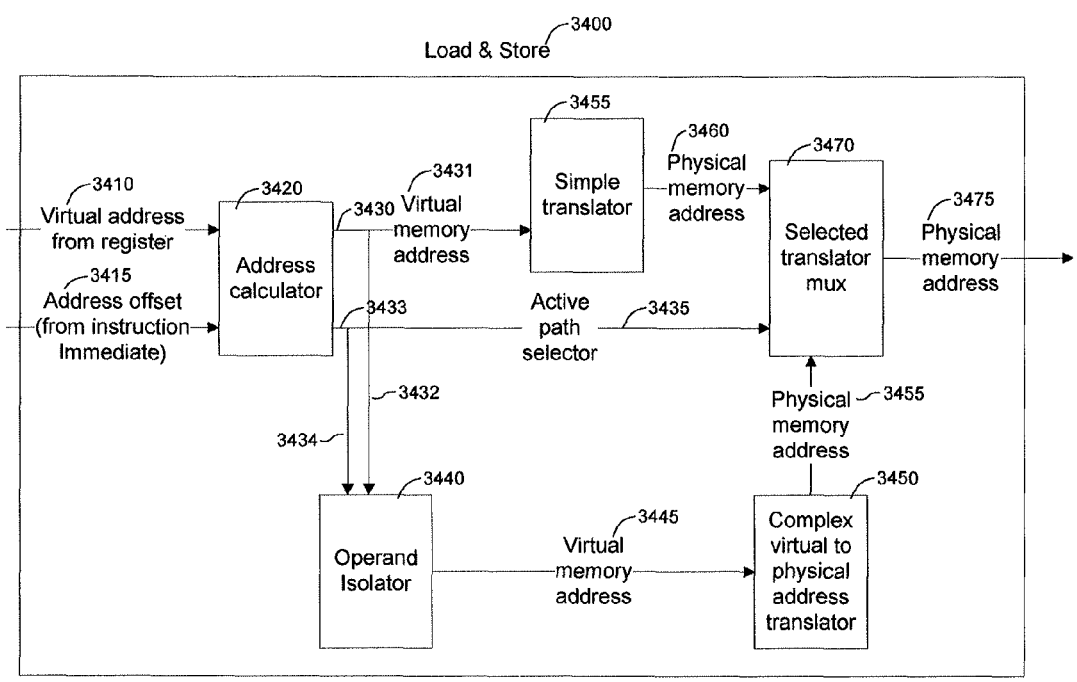
FIG. 34 depicts a Load & Store unit with a Simple translator and Complex virtual-to-physical address translator of a system utilizing the integrated processor core of FIG. 1.

FIG. 34 depicts a Load & Store unit 3400 with a Simple translator 3465 and "Complex virtual-to-physical address translator" 3450 of the system. The Load & Store unit 3400 receives an input Virtual address from register 3410 and "Address offset from instruction immediate" input 3415 which both pass as input to the Address calculator 3420. The Address calculator 3420 processes the inputs and creates a Virtual Memory address output 3430, which is split into an input 3431 for the Simple translator 3455 and an input 3432 for the Operand Isolator 3440. The second output of the Address calculator is the Active path selector 3433, which is split into an input 3435 for the Selected translator mux 3470 and an input 3434 for the Operand isolator 3440. The address calculator may produce the Virtual memory address 3430 output by adding the two inputs 3410, 3415 together. The Active path selector 3435 may be drawn from a single bit within the Virtual address from register input 3410, from the "Address offset (from instruction immediate)" 3415, or from the output Virtual memory address 3430. The value of this bit 3433 indicates "simple" or "complex" as the active path. The Operand Isolator 3440 passes the Virtual Memory address input 3431 onto its output 3445 whenever the Active path selector input 3434 is set to "complex." Otherwise, in the case where input 3434 is set to "simple," the output 3445 is held to its previous value so as to not cause unnecessary switching in the downstream circuits, thereby saving power within the Complex virtual-to-physical address translator 3450.

The Simple translator 3455 receives the Virtual memory address 3431 as input and performs a simple transformation in order to map it to the Physical memory address output 3460. This simple operation may be the shifting, etc. previously described, which enabled the compression of multiple table entries in the translation table into just a single entry. In some embodiments, the values directing the shifting may be provided within the Virtual memory address 3431 so that they do not need to be looked up in a table. In another preferred embodiment the input to the simple translator has its own Operand Isolator that locks its input whenever the Active path selector 3435 is "complex," so as to not cause unnecessary switching within the Simple translator 3455, thereby saving power.

The Complex virtual-to-physical address translator 3450 receives the Virtual memory address 3445 as input and produces the Physical memory address 3455 output. The unit 3450 uses methods to perform translations that are more expensive than the simple translator 3455, such as a content-addressable memory or other table-lookup mechanism. In one preferred embodiment, the output of unit 3450 is provided to the Simple translator 3455 in order to take advantage of some of the mechanisms inside the Simple translator 3455, such as the shifter, etc. In that preferred embodiment, the Simple translator shifting and alignment schemes may be more restrictive, since the Complex virtual-to-physical address translator can be employed in tandem to compensate for the rigidity of the use cases of the Simple translator 3455. The translator 3450 operates in a low power mode when its input is held constant by the Operand isolator 3440 thereby lowering the overhead of the translator's 3450 implementation, but maintaining the flexibility offered by the translator 3450 when it is necessary.

The Selected translator mux 3470 receives the Active path selector input 3435, enabling it to choose between its other two inputs 3460 & 3455 so as to select one for passage onto the output line 3475, which is then output from the Load & Store unit 3400.

Figure 35:
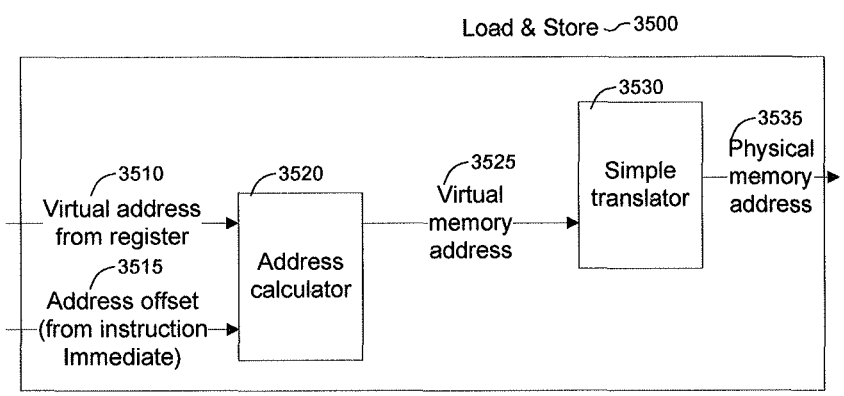
FIG. 35 depicts a Load & Store unit without a Complex virtual-to-physical address translator of a system utilizing the integrated processor core of FIG. 1.

FIG. 35 depicts a Load & Store unit 3500 that forgoes the Complex virtual-to-physical address translator in order to save power, reduce cost, and improve performance. Whereas traditional systems must operate with physical-only addressing in the absence of a table-based or content-addressable-memory-based Complex virtual-to-physical address translator 3450, the present system is able to use remapping mechanisms in the Simple translator to provide some of the flexibilities of virtual memory, such as providing virtual contiguous address regions with physically discontiguous memory blocks.

The Address calculator 3520 receives a virtual address from register 3510 and address offset 3515 and calculates a Virtual memory address 3525 for input to the Simple translator 3530. In one preferred embodiment, the address calculator 3520 performs an addition operation on its inputs. In another embodiment, address calculator 3520 allows certain bits to pass-through and avoid the addition process. The Simple translator performs simple calculations, such as shifting by small amounts, etc., in order to create the Physical memory address output 3535.

Figure 36:
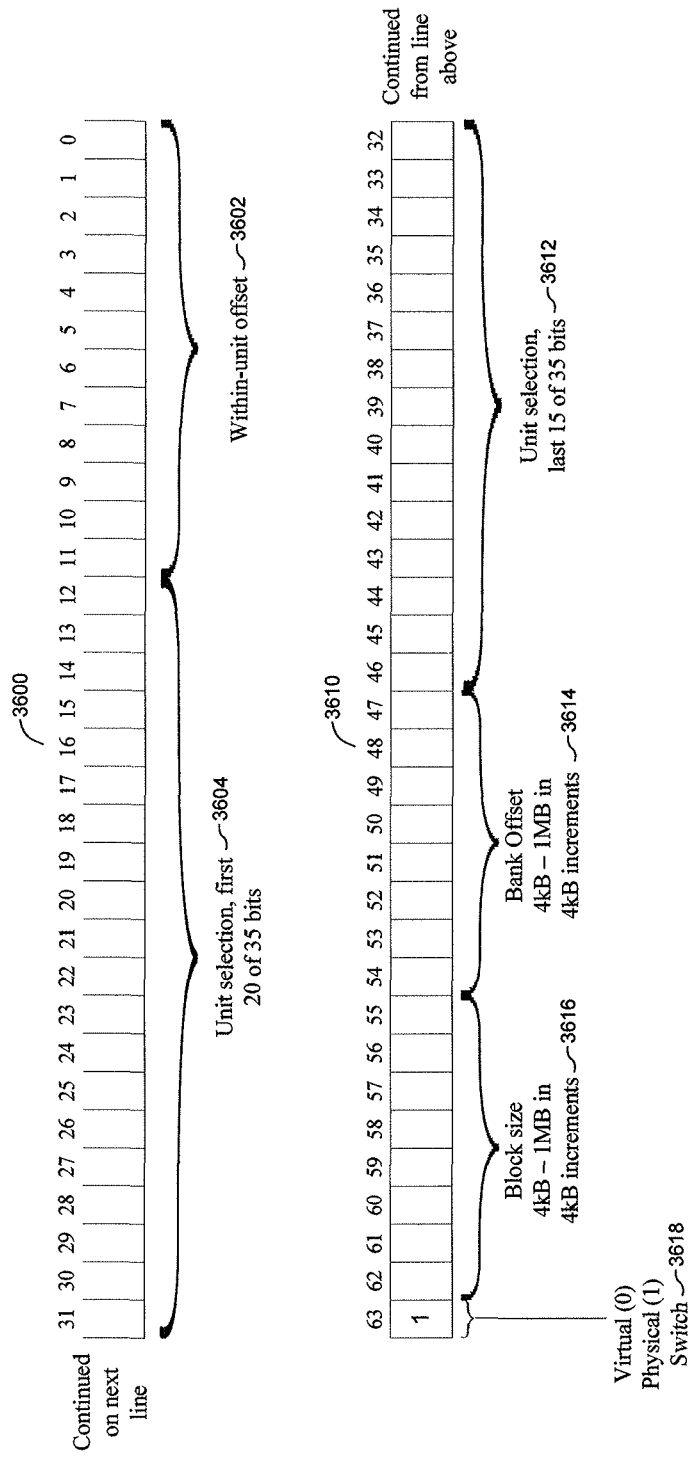
FIG. 36 is an illustration of a 64-bit virtual address of a system utilizing the integrated processor core of FIG. 1.

FIG. 36 depicts how a preferred embodiment of the system implements a 64-bit virtual address with the low 32 bits comprising bits 0-31 (3600) and the high 32 bits (3610) comprising bits 32-63. In this example, bit 63 (3618) indicates that the address is a Physical address, which is the code in this address to utilize the Simple translator 3465, which will be indicated using the Active path selector 3433, 3434, 3435, thereby lowering the power of the Complex translator 3450 via control of the Operand isolator, and invoking the Simple translator 3465, whose output value will be passed through the Selected translator mux 3470. Although the value of "1" for bit 63 (3618) is noted as "Physical", this flag value is equivalent to a flag value of "Simple" in this preferred embodiment.

FIG. 36 further illustrates the use of bits for instruction of the shifting and merging units (3465), which may be implemented as in FIG. 24's units 2452 and 2496. The Block size field 3616 of the 64-bit address indicates the number of 4 kB units per bank that are dedicated to the block containing the address, which is one of the values that controls the behavior of the shifting and merging within the Simple translator (3465). The other value controlling the behavior of the Simple translator 3465 is the Bank Offset value 3614, which indicates which unit is the first unit of each bank that contributes to the block containing the address. Bits 46-12 inclusive (3612, 3604) provide 35 bits for designation of the unit within the memory block containing the address that the address is selecting. The Within-unit offset 3602 designates to which piece of memory within the selected unit the address is referring.

Figure 37:
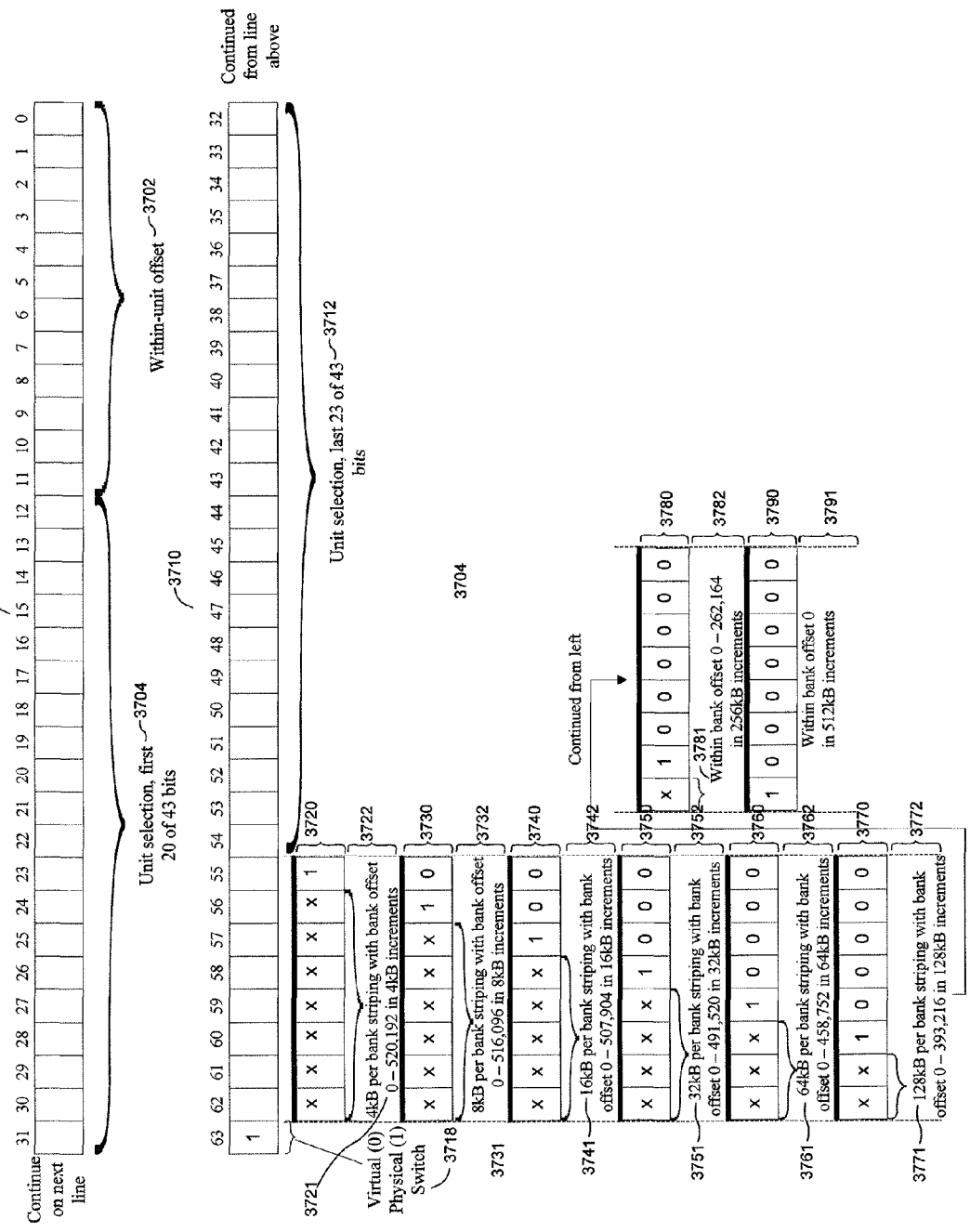
FIG. 37 depicts an alternative encoding of virtual addresses of a system utilizing the integrated processor core of FIG. 1.

FIG. 37 depicts an alternative encoding of virtual addresses, which forces the block size 3616 to be a power of two and the offset 3614 to be aligned according to the block size. The Virtual Physical switch 3718 is similar to that of FIG. 3618, as the Within-unit offset 3702 is similar to 3602. The reduction of the number of bits dedicated to controlling the behavior of the simple translator (3530, 3465) from the combined 16 bits of the 3616 and 3614 fields from FIG. 36 to the 8 bits (3720-3791) of FIG. 37 increases the number of bits that can be dedicated to the Unit selection field (3712, 3704) from 35 bits to 43 bits. This increased address space has interesting advantages, for example it would allow the system to address more physical memory. The additional bits could alternatively be used to support a larger virtual address space with the same physical address space, utilizing the high bits as a tag of which version or plane of the physical address space is referenced by the lower bits.

In a preferred embodiment, eight different encoding schemes are used by bits 62-55 in order to reduce the dedication of bits toward redundant information. In all of the cases, the bank is of size 512 KB (524,288 bytes) and each unit is 4 KB (4096 bytes). Thus, each bank contains 128 units. For the purposes of address encoding, the starting and ending banks are implied as the very first and very last banks in the Shared memory system respectively.

The first code example 3720 is the case (3722) where bit 55 is 1, in which case the block designates one unit per bank to be dedicated to the block containing the address. Bits 62-56 (3721) provide seven bits for identifying which of the 128 units is used in each bank dedicated to the block containing the address.

The second code example 3730 is the case (3732) where bit 55 is 0 and bit 56 is 1, in which case the block designates two units per bank to be dedicated to the block containing the address, and bits 62-57 (3731) provide 6 bits for identifying which of the 64 self-aligned sets of contiguous 2-unit-per-bank blocks is used in each bank dedicated to the block containing the address.

The third code example 3740 is the case (3742) where bit 55 is 0, bit 56 is 0, and bit 57 is 1, in which case the block designates 4 units per bank to be dedicated to the block containing the address, and bits 62-58 (3741) provide 5 bits for identifying which of the 32 self-aligned sets of contiguous 4-unit-per-bank blocks is used in each bank dedicated to the block containing the address.

The fourth code example 3750 is the case (3752) where bit 55 is 0, bit 56 is 0, bit 57 is 0, and bit 58 is 1; in which case the block designates 8 units per bank to be dedicated to the block containing the address, and bits 62-59 (3751) provide 4 bits for identifying which of the 16 self-aligned sets of contiguous 8-unit-per-bank blocks is used in each bank dedicated to the block containing the address.

The fifth code example 3760 is the case (3762) where bit 55 is 0, bit 56 is 0, bit 57 is 0, bit 58 is 0, and bit 59 is 1; in which case the block designates 16 units per bank to be dedicated to the block containing the address, and bits 62-60 (3761) provide 3 bits for identifying which of the 8 self-aligned sets of contiguous 16-unit-per-bank blocks is used in each bank dedicated to the block containing the address.

The sixth code example 3770 is the case (3772) where bit 55 is 0, bit 56 is 0, bit 57 is 0, bit 58 is 0, bit 59 is 0, and bit 60 is 1; in which case the block designates 32 units per bank to be dedicated to the block containing the address, and bits 62-61 (3771) provide 2 bits for identifying which of the 4 self-aligned sets of contiguous 32-unit-per-bank blocks is used in each bank dedicated to the block containing the address.

The seventh code example 3780 is the case (3782) where bit 55 is 0, bit 56 is 0, bit 57 is 0, bit 58 is 0, bit 59 is 0, bit 60 is 0, and bit 61 is 1; in which case the block designates 64 units per bank to be dedicated to the block containing the address, and bit 62 (3781) provides 1 bit for identifying which of the 2 self-aligned sets of contiguous 64-unit-per-bank blocks is used in each bank dedicated to the block containing the address.

The eighth code example 3790 is the case (3791) where bit 55 is 0, bit 56 is 0, bit 57 is 0, bit 58 is 0, bit 59 is 0, bit 60 is 0, bit 61 is 0, and bit 62 is 1; in which case the block designates 128 units per bank (all of the units in each bank) to be dedicated to the block containing the address.

Figure 38:
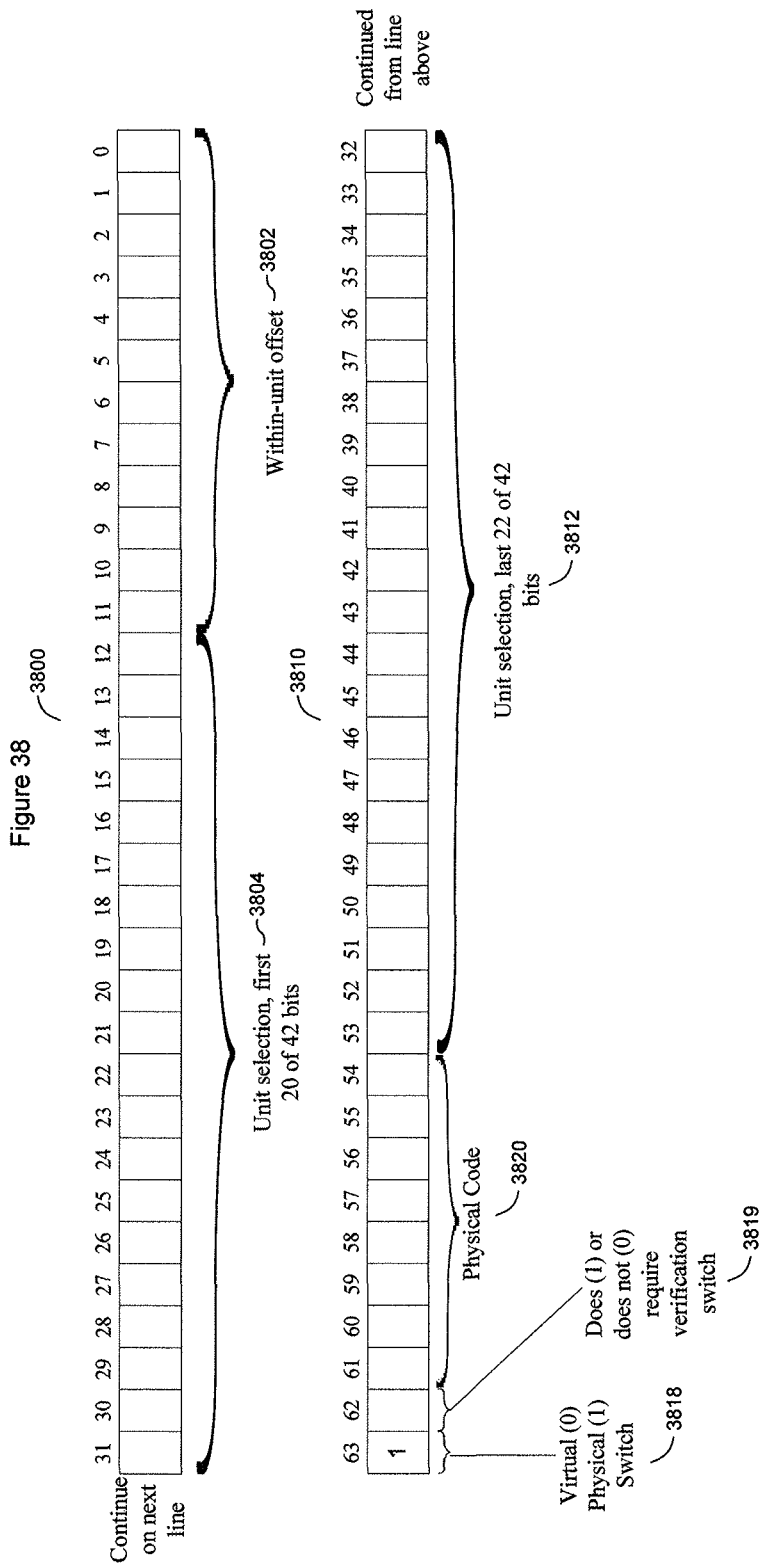
FIG. 38 depicts another embodiment of a 64-bit address of a system utilizing the integrated processor core of FIG. 1.

FIG. 38 depicts an embodiment of a 64-bit address (3800, 3810) scheme with Virtual Physical Switch 3818 (determining simple vs. complex translation) set to 1, and Physical Code 3820 corresponding to the schemes 3720-3790 previously described, although shifted right by one bit position. The within-unit offset 3802 is also similar to 3702, previously described, and the Unit selection set of bits 3804, 3812 are similar to 3712, 3704, except that they cover 42 bits instead of 43 and end at bit index 53. The changes in the example of FIG. 38 make room for a Verification switch 3819 at bit position 62, which enables switching within the address code in order to support a new mechanism that enables movement of the data within a unit while only requiring synchronization between the various virtual processors in the case that those virtual processors attempt to access that data. When this bit 3819 is set to 1, it indicates that the data within the unit may have moved and that it should be verified that it has not been moved.

Figure 39:
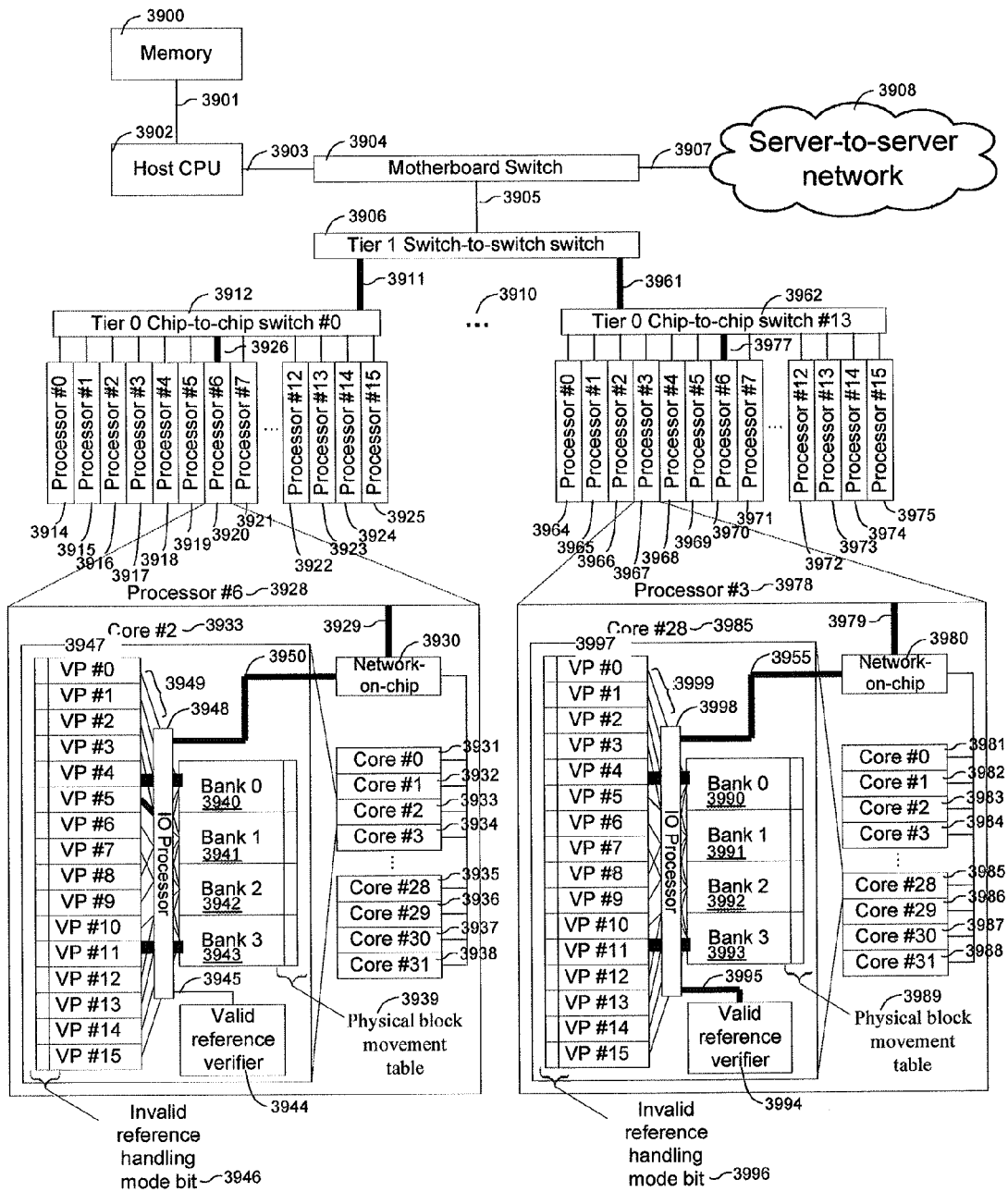
FIG. 39 depicts a memory operation from one Virtual processor to a bank of memory on a different chip in a system utilizing the integrated processor core of FIG. 1.

FIG. 39 depicts how the system conveys a memory operation from one Virtual processor 3947 to a bank of memory on a different chip utilizing a Valid reference verifier 3994 implementing the verification whose use is designated by bit index 62 (3819) in the addressing architecture described with respect to FIG. 38. The system implements a Shared memory system, such as shared memory system 2500 of FIG. 25. A Host CPU 3902 is connected to Host Memory 3900 via link 3901. The Host CPU is also connected via link 3903 to a Motherboard Switch 3904 that connects the Host system to a Server-to-server network 3908 via link 3907, and also to a network of accelerating processors. The accelerating processors connect to the Motherboard Switch 3904 through the Tier 1 Switch-to-switch switch 3906, which is connected to the Motherboard Switch 3904 via link 3905.

Processors 3914-3925 & 3964-3975 connect to the Tier 0 Chip-to-chip switches 3912, 3910, 3962, which connect to the Tier 1 Switch-to-switch switch 3906 via links 3911, 3961.

FIG. 39 further shows a zoom-in of Processor #6 (3928) attached to Tier 0 switch #0 (3912). Processor #6 (3928) comprises multiple cores 3931-3938 connected via Network-on-chip 3930. Core #2 of said Processor #6 (3933) comprises multiple memory banks (3940-3943), IO Processor (3948), Virtual Processors 3947 and Valid reference verifier 3944 connected to the IO Processor via link 3945.

FIG. 39 further shows a zoom-in of Processor #3 (3978) attached to Tier 0 switch #13 (3962). This processor (3978) comprises multiple cores 3981-3988 connected via Network-on-chip 3980. Core #28 of said Processor #3 (3985) comprises multiple memory banks (3990-3993), IO Processor (3998), Virtual Processors 3997 and Valid reference verifier 3994 connected to the IO Processor via link 3995.

The virtual processors are connected to the IO Processor 3948, 3998 via links 3949, 3999. The Memory banks 3940-3943 & 3990-3993 contain Physical block movement tables 3939 & 3989 respectively. The Virtual Processors (e.g., 3947, 3997) also have an attribute named the "Invalid reference handling mode bit" (3946 & 3996, respectively), which may replace bit 62 (3819) in virtual addresses, thereby controlling whether memory references exiting a particular Virtual Processor are forced to have the validity of their memory references validated or not. In one preferred embodiment, the mode bit 3946, 3996 overrides bit 62 of an address whenever the mode bit is set to 1, otherwise defaulting to bit 62 coming natively from the address calculated by the address calculators (e.g., 3420).

FIG. 39 further depicts an example of Virtual Processor #5 3947 of Core #2 3933, of Processor #6 3928 connected to Tier 0 Chip-to-chip switch #0 3912. The bold lines (3950, 3929, 3926, 3911, 3961, 3977, 3979, 3955, & 3995) show connections used as said Virtual Processor #5 (3947) is performing a Memory Load for a memory address residing within a certain memory bank of Core #28 3985, or Processor #3 3978, of Tier 0 Chip-to-chip switch #13 3962.

After exiting the Load & Store unit of Core #2 3985, the memory address of said memory operation has an address such as the 64-bit address of FIG. 38, with bit 62 (3819) indicating that the memory access does indeed require valid reference verification. Because one of banks 3990-3993 is referenced by the address, Valid reference verifier 3994 must be accessed for the verification. The memory operation proceeds via one of the 3949 links through the IO Processor 3948, and then through link 3950 to the Network-on-chip 3930, where it proceeds through link 3929 to link 3926, through Tier 0 Chip-to-chip switch #0 (3912) and through link 3911 to arrive at the Tier 1 Switch-to-switch switch 3906. The Load memory operation then proceeds via link 3961 through the Tier 0 Chip-to-chip switch #13 (3962), through link 3977 and link 3979 to the Network-on-chip 3980, and then through link 3955 to IO Processor 3998.

Once the memory operation arrives at the IO Processor 3998, the "require verification switch" bit 62 (3819) of the memory address indicates to IO processor 3998 that the reference must be verified. Therefore, the IO Processor 3998 forwards the memory reference on to the Valid reference verifier 3994 via link 3995. If the reference is verified then the memory operation proceeds normally, otherwise handling of the invalid reference proceeds.

Figure 40:
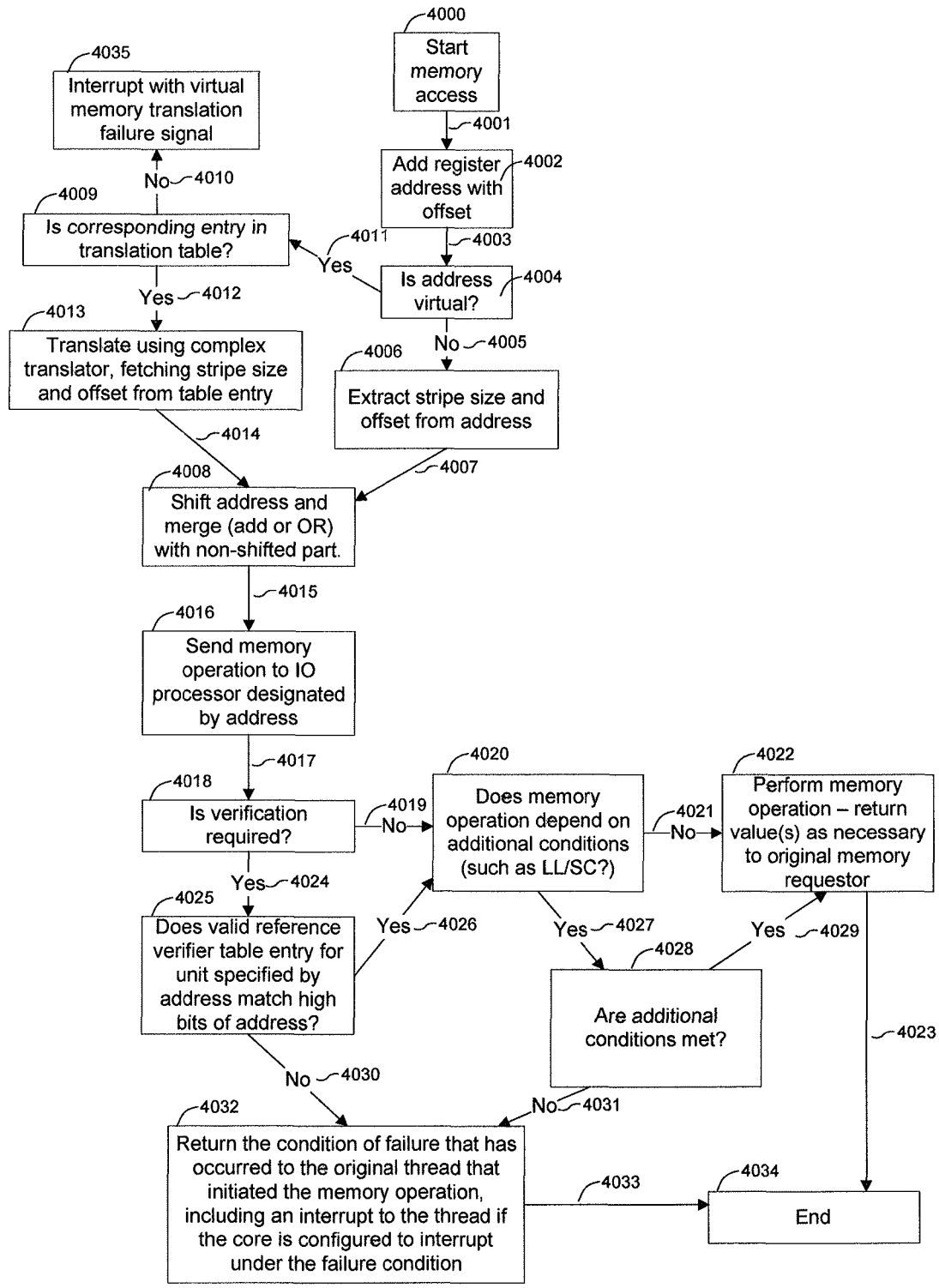
FIG. 40 is an exemplary process for memory access of a system utilizing the integrated processor core of FIG. 1.

FIG. 40 depicts how a preferred embodiment of the system performs a memory access. The "Start memory access" Step 4000 begins the process depicted in FIG. 40. The process immediately proceeds to the "add register address with offset" step 4002 via link 4001. This operation may be performed by an address calculator such as 3520 of FIG. 35. After the completion of Step 4002 the process proceeds to step 4004 via link 4003.

The "Is address virtual" Step 4004 is proceeded to via link 4003. In the context of step 4004, "Is address virtual?" is asking whether the address is translated via a complex translator such as 3450 of FIG. 34. If so, the process proceeds via "Yes link 4011" to step 4009. Otherwise, it proceeds via "No" link 4005 to step 4006.

The "Is corresponding entry in translation table?" Step 4009 is proceeded to via link 4011. In this step, the complex virtual-to-physical address translator 3450 looks in its internal table structure for an entry that matches the input virtual memory address 3445. If such a match exists then the "Yes" link 4012 is traversed to step 4013. Otherwise the "No" link 4010 is traversed on toward step 4035. After the completion of Step 4009 the process either proceeds to Step 4013 via "Yes" link 4012 or Step 4035 via the "No" link 4010.

The "Interrupt with virtual memory translation failure signal" Step 4035 is proceeded to via link 4010. In this step 4035, the system is in a failure mode and a software interrupt occurs to fix and possibly log the error. One way in which the error could be fixed is to remove an entry in the tables internal to the complex address translator 3450 and to subsequently add an entry into the tables that handles the address that originally caused the translation failure. The completion of Step 4035 thereby ends the process depicted in FIG. 40, however the process may be restarted after the translation failure is fixed.

After the completion of Step 4009, the process proceeds to Step 4013 via "Yes" link 4012. The "Translate using complex translator, fetching stripe size and offset from table entry" Step 4013 is proceeded to via link 4012. In this step, the complex translator 3450 operates on the virtual memory address 3445. The stripe size and offset values are equivalent or derivable from 2470, 2480, 2490, and the x-value positions of matching entries in 2449, 2420, or a subset thereof. They may be used in step 4008 override the stripe size and offset values derivable from the Physical code 3820 of the address. After the completion of Step 4013, the process proceeds to step 4008 via link 4014.

The "Shift address and merge (add or OR) with non-shifted part." Step 4008 is proceeded to via links 4007 or 4014. In this step, the stripe size and offset, derived either from the Physical Code 3820 within the address or from the table entries in the complex address translator 3450 is used to further translate the memory address using a mechanism such as that of the Middle Virtual Bits Shifter 2452 to allow a virtual contiguous memory region to be inferred directly from the stripe size and offset. Stripe size can mean the number of banks allocated to the memory block of the address, and the number of units per bank dedicated to said memory block. The offset can mean which unit of a bank involved in the block starts the contiguous units allocated to the block in each bank involved in the block. In this way, a simple translator can operate as a post-processing step to the complex translator, or the simple translator can operate as the only translator. After the completion of Step 4008, the process proceeds to step 4016 via link 4015.

The "send memory operation to IO processor designated by address" Step 4016 is proceeded to via link 4015. In this step, the memory operation is conveyed from the originating processor core to the local IO processor or a remote IO processor, whichever IO processor is local to the memory banks holding the data for the address of the memory operation. After the completion of Step 4016, the process proceeds to step 4018 via link 4017.

The "Is verification required?" Step 4018 is proceeded to via link 4017. In this step, the bit 62 (3819) of the memory address is investigated by the receiving IO processor and the process path diverges based on whether the bit is set or not. After the completion of Step 4018 the process proceeds to either Step 4020 via the "No" link 4019 or to Step 4025 via the "Yes" link 4024.

The "Does valid reference verifier table entry for unit specified by address match high bits of address" Step 4025 is proceeded to via link "Yes" 4024. In this step 4025, the Valid reference verifier 3944, 3994 receives the physical address as input and searches its internal table to verify the high bits of the physical address match the bits held in the table at the index specified by a given range of lower bits. In a preferred embodiment, the lower range of bits extend from the first bit specifying the unit # within a given bank (e.g., bit index 12 for 4 KB units) through to the highest bit required to specify all hardware banks in the Shared Memory system (e.g., bit 39 if all of the memory comprises 1 Terabyte in total). If the bits match, the process proceeds via the "Yes" link 4026, otherwise the "No" link is taken. After the completion of Step 4025 the process either proceeds to step 4032 via "No" link 4030 or to Step 4020 via "Yes" link 4026.

The "Does memory operation depend on additional conditions (such as LL/SC?)" Step 4020 is proceeded to via "No" link 4019 or "Yes" link 4026. This step 4020 is reached if no verification was required, or if the verification was required and was successfully validated. Step 4020 performs an additional check or checks to verify that the memory operation should proceed. In one preferred embodiment, the memory operation is checked as to whether it is a "Store Conditional" memory operation and, if so, the Store memory operation will only be carried out if the "Load Linked" attribute corresponding to the physical memory address of the memory operation is verified as not having been accessed since the Virtual Processor originally initiating the "Store Conditional" memory operation originally performed its previous and corresponding "Load Linked" memory operation. If the memory operation is a "Store Conditional" memory operation or other memory operation requiring a condition to be met in order for the memory operation to be carried out, then the process proceeds via the "Yes" link 4027. Otherwise, it proceeds via the "No" link 4021.

The "Are additional conditions met?" Step 4028 is proceeded to via the "Yes" link 4027. In this step, the condition or conditions that triggered stepping via "Yes" link 4027 to step 4028 are verified as having been met (such as the aforementioned "Store Conditional" condition). If the condition(s) are met, then the process proceeds via "Yes" link 4029. Otherwise, the process proceeds via "No" link 4031. After the completion of Step 4028 the process proceeds to either Step 4032 via the "No" link 4031 or to Step 4022 via the "Yes" link 4029.

The "Perform memory operation—return value(s) as necessary to original memory requestor" Step 4022 is proceeded to via "Yes" link 4029 or via the "No" link 4021. In this step 4022, the memory operation has already been routed to the memory being operated upon and has already been verified that it should be performed. Step 4022 therefore executes the memory operation on the memory at the address designated by the address of the memory operation. If the memory operation is a Load, data is fetched from the address and returned to the original memory operation initiator. If an outstanding Load Linked operation exists for the designated memory address, the attribute data pertaining to that Load Linked operation is modified so that future "Store Conditional" operations behave properly relative to the history of accesses that affects the Store Conditional behavior.

Any other information that must be conveyed back to the original memory operation initiator is conveyed back to the initiator in step 4022 as well. One example might be returning an "ack" message to the initiator if a Store memory operation is being performed and the Store memory operation is a "Store-with-ack" style memory operation which requires an ack message to be returned to said initiator. Otherwise, program progress will stall at some point in the future, or continue stalling if the stall has already begun, until the ack is received. If silent message delivery failure is a possibility, the communication comprising the "ack" or "Load" memory operation result may need to be resent at some point due to a communication failure. After the completion of Step 4022, the process proceeds to the "End" Step 4034 via link 4023.

The "Return the condition of failure that has occurred to the original thread that initiated the memory operation, including an interrupt to the thread if the core is configured to interrupt under the failure condition" Step 4032 is proceeded to via the "No" links 4030 and 4031. This step 4032 is reached if a failure has occurred during valid reference verification or some other condition verification. In this case the thread originally initiating the memory operation is sent a message so that it will interrupt and begin an error handling process through which the failure may be recovered from. After the completion of Step 4032 the process proceeds to the "End" Step 4034 via link 4033.

Figure 41:
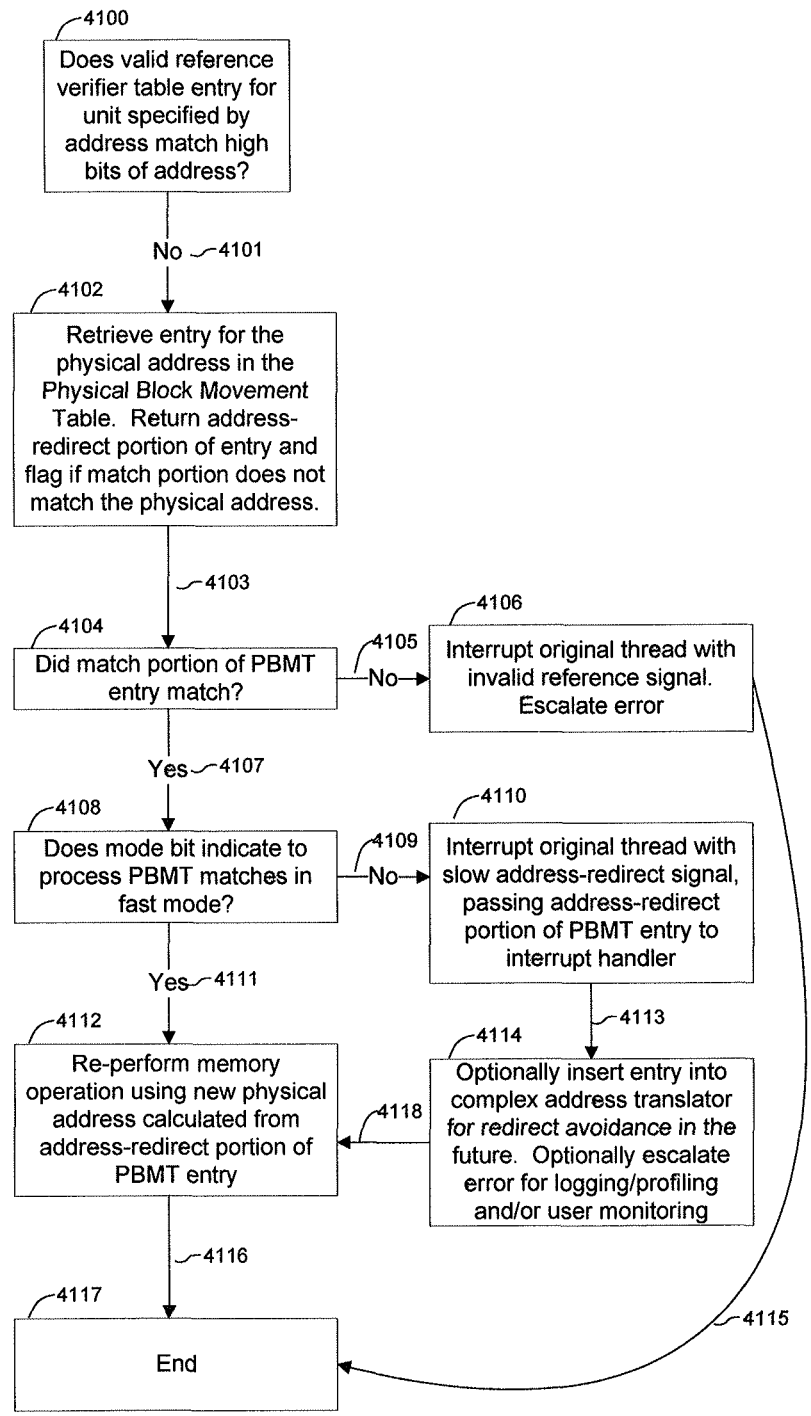
FIG. 41 depicts an exemplary process for handling a failure condition of the process of FIG. 40.

FIG. 41 depicts an exemplary process for detailed handling of the failure condition of step 4032 in the case that it is reached via passage of "No" link 4030 from step 4025. The "Does valid reference verifier table entry for unit specified by address match high bits of address?" step 4100 begins the process depicted in FIG. 41 and represents the same step 4025 from FIG. 40.

The process proceeds to the "Retrieve entry for the physical address in the Physical Block Movement Table. Return address-redirect portion of entry and flag if match portion does not match the physical address" Step 4102 via the "No" link 4101. Step 4102 proceeds to the "Did match portion of PBMT entry match?" Step 4104 via link 4103. In these steps 4102, 4104, the Physical Block Movement Table (PBMT) 3939, 3989 local to the physical location of the memory corresponding to the physical memory address is consulted. The PBMT is looked into similar to the table within the Valid reference verifiers (3944, 3994), except that the data is held in regular memory banks 3940-3943 & 3990-3993 in order to reduce the hardware overhead associated with the PBMT and increase its flexibility by allowing more or less memory to be dedicated toward it depending on the performance requirements of the PBMT.

Whereas the Valid reference verifier 3944, 3994 looks up an entry based on a middle bit field within the memory address, and the value held within the entry must match the high bits of the address, the PBMT operates by performing the lookup using those same middle a separate set of middle bits from the address, which, for example, may be a superset of the middle bits used to lookup entries in the Valid reference verifiers 3944, 3994 that includes bits adjacent to the middle bit field on the more-significant end of the field. If the "match portion" of the data held within the PBMT at the entry designated by the PBMT lookup bit field of the original memory operation physical address matches the high bits of the memory address then the process proceeds via "Yes" link 4107, otherwise it proceeds via "No" link 4105. After the completion of Step 4104 the process proceeds either to Step 4106 via the "No" link 4105 or the process proceeds to Step 4108 via the "Yes" link 4107.

The "Interrupt original thread with invalid reference signal. Escalate error" Step 4106 is proceeded to via the "No" link 4105. In this case no fast-mode handling is possible because the data required to perform fast-mode processing is not available from the entry retrieved in step 4102 (e.g., the physical memory address of the memory operation does not match the entry that was looked up). Error handling is initiated within the Virtual Processor that originally initiated the memory operation in order to recover from the failure condition. Because we are already attempting to recover from a fail condition (namely that the Valid reference verifier was unable to verifier the memory operation) the error handling initiated by step 4106 is called error escalation. After the completion of Step 4106 the process proceeds to "End" Step 4117 via the 4115 link.

Upon the completion of Step 4104, the process proceeds to step 4108 via the "Yes" link 4107. Then, the "Does mode bit indicate to process PBMT matches in fast mode?" Step 4108 is proceeded to. In this step, a mode bit is consulted and, if it indicates that fast-mode processing should be performed, the "Yes" link 4111 is taken. Otherwise, the "No" link 4109 is taken. The mode bit may be set according to a number of rules. After the completion of Step 4108, the process proceeds to either step 4112 via the "Yes" link 4111 or to Step 4110 via the "No" link 4109.

The "Interrupt original thread with slow address-redirect signal, passing address-redirect portion of PBMT entry to interrupt handler" Step 4110 is proceeded to via link 4109. Step 4110 proceeds to the "Optionally insert entry into complex address translator for redirect avoidance in the future. Optionally escalate error for logging/profiling and/or user monitoring" step 4114 via link 4113. In these steps 4110, 4114, the Virtual Processor originally initiating the memory operation is provided the redirect portion of the PBMT entry that was matched, and the Virtual Processor is interrupted in order to invoke the slow-address-redirect handler to process said redirect portion of the PBMT entry.

The Virtual Processor may carry out the slow-address-redirect handler methods that enable it to recover from the error of the invalid reference. One method by which this may be carried out is insertion into the complex translator's internal 3450 table of an entry capable of handling the memory operation (possibly requiring removal of a different entry to make room in the table). The entry may be created using the redirect data parameter that is passed to the handler. The slow address-redirect signal handler is useful for preventing future invalid references through leveraging of the complex translator's capabilities, so that the overall all performance may be higher when the slow address-redirect signal handler is used. This is because the slow address-redirect signal handler attempts to more completely handle the error and prevent its future occurrence for the given Virtual Processor and even for other Virtual Processors with which it shares a core. The step 4114 may further escalate the error handling so that additional profiling data is available to the compiler when recompilation is performed in the future. This may enable the recompilation to achieve higher performance through improved memory allocation request parameterization that results in fewer memory movements, and therefore fewer invalid references and PBMT processing. After the completion of Step 4114, the process proceeds to step 4112 via link 4118.

The "Re-perform memory operation using new physical address calculated from address-redirect portion of PBMT entry" Step 4112 is proceeded to via either the "Yes" link 4111 or link 4118. In this step, the address for the memory operation is recomputed using the redirect portion of the PBMT entry that was matched. In this way it is possible for no intervening error handling software to need to run to recover from the error, since the means of recovery can be implemented in hardware, which integrates the redirect data into the memory address and re-initiates the memory operation.

In one preferred embodiment an initial miss in the PBMT does not mean that the PBMT does not have a matching entry, but instead that the first lookup failed and a subsequent lookup may succeed. In that embodiment, multiple lookups may be performed before a true failure such as that of 4106 is escalated-to. One such implementation of said preferred embodiment would be hash table implementation of the PBMT, where collisions are detected as non-matching PBMT entries but only empty entries are detected as complete table misses and collisions are retried after where as complete misses move the process to step 4106. After the completion of Step 4112, the process proceeds to the "End" Step 4117 via link 4116.

Figure 42:
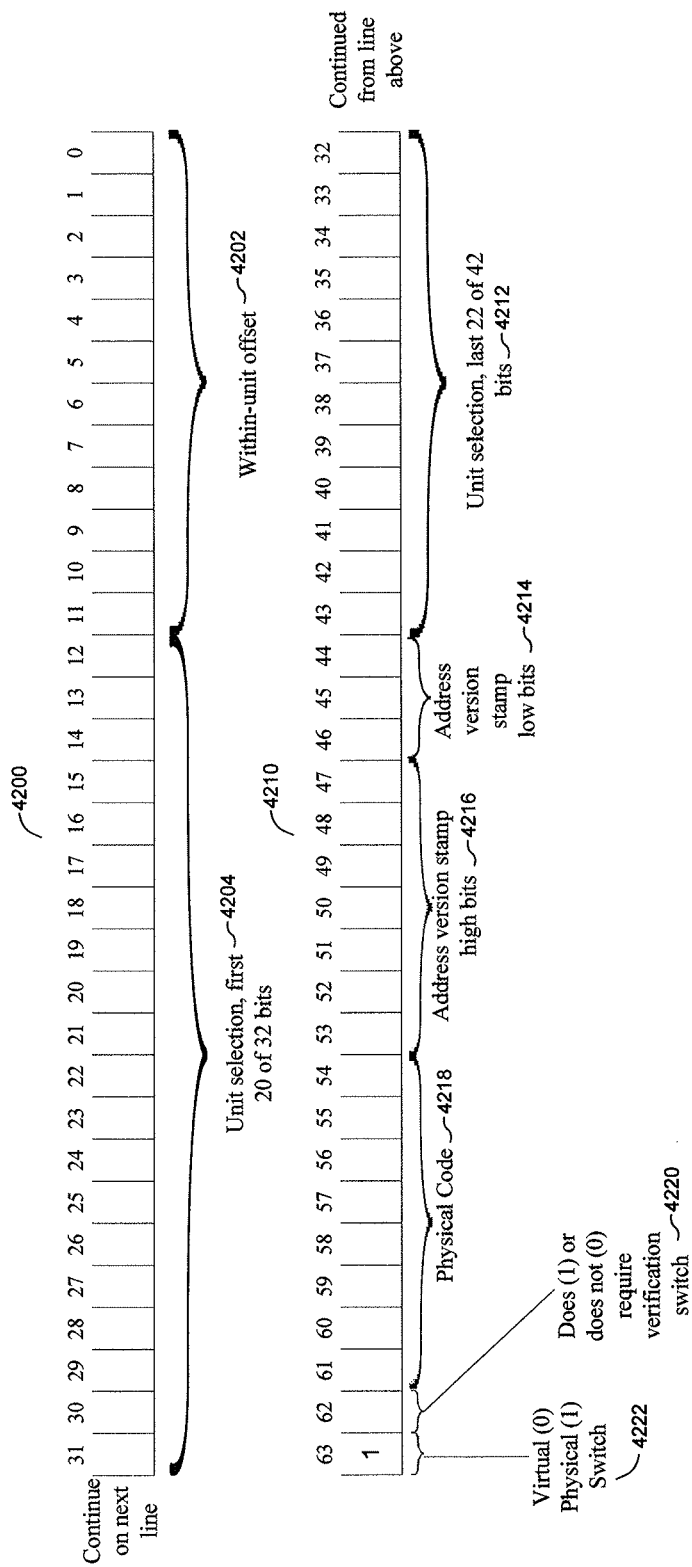
FIG. 42 is an illustration of another 64-bit virtual address scheme for use with a system utilizing the integrated processor core of FIG. 1.

FIG. 42 depicts an exemplary 64-bit address (4200 & 4210) with the Address version stamp high bits 4216 and Address version stamp low bits 4214 comprising bit ranges 53-47 and 46-44, respectively. The bits in the fields 4222, 4220, 4218 and 4202 are similar to those of FIG. 38 bit fields 3818, 3819, 3820 and 3802, respectively. Bit fields 4212 & 4204 are similar to bit fields 3812 & 3804 except that instead of spanning 42 bits from index 53 through 12, it spans 32 bits from bit index 43 through 12.

The Valid reference verifier (3994 of FIG. 39) local to the bank (one of 3990, 3991, 3992, 3993 in the example of FIG. 39) addressed by a given address uses a given range of bits from the address to perform the lookup. In one preferred embodiment, the nine bits that specify the unit within the banks local to the core of the valid reference verifier unit 3994 are used as the bits that look up the entry in the valid reference verifier 3994. In FIG. 42, where each unit of a core gets an entry in the valid reference verifier table of that core, and the units are 4 kB and each bank is 512 KB, these would be bits 20-12. In the preferred embodiment depicted in FIG. 42, the 3 bits of the Address version stamp low bits 4214 bit field are joined with those 9 bits utilized by the Valid Reference Verifier 3994 to create a 12-bit lookup into the PBMT which is distributed across the banks of the core. A preferred embodiment of the system implements the PBMT across the banks such that addresses held within a given bank have their PBMT entries held in that same bank and the memory cycle reserved for the memory access that was prevented by the failed verification of the Valid reference verifier 3994 is used instead to perform a lookup into said PBMT. In one preferred embodiment all of bit fields 4204, 4212, and 4216 are verified to match the match portion of the PBMT entry. In another embodiment, only those bits of fields 4204 and 4212 that are more significant than the most significant bit necessary to identify every physical memory bank in the Shared memory system contribute the portion of bits used from fields 4204 & 4212 in the matching operation (i.e. along with field 4216 being utilized in the matching process).

In another embodiment, only the bits 4216 are used in the matching operation, and the memory allocation system uses knowledge that these bits are used for matching to ensure that the PBMT matches addresses and redirects properly. In this embodiment, it may be the case that only the total amount of physical memory local to cores in the shared memory system multiplied by 2 raised to the number of bits in field 4216 may be allocated in total. This embodiment reduces the overhead of the matching operation that utilizes the entries of the PBMT. It may be the case that the compiler only configures the memory allocation to utilize this version of the matching system when a previous run of a given program has shown that it does not need more than said amount of memory.

Figure 43:
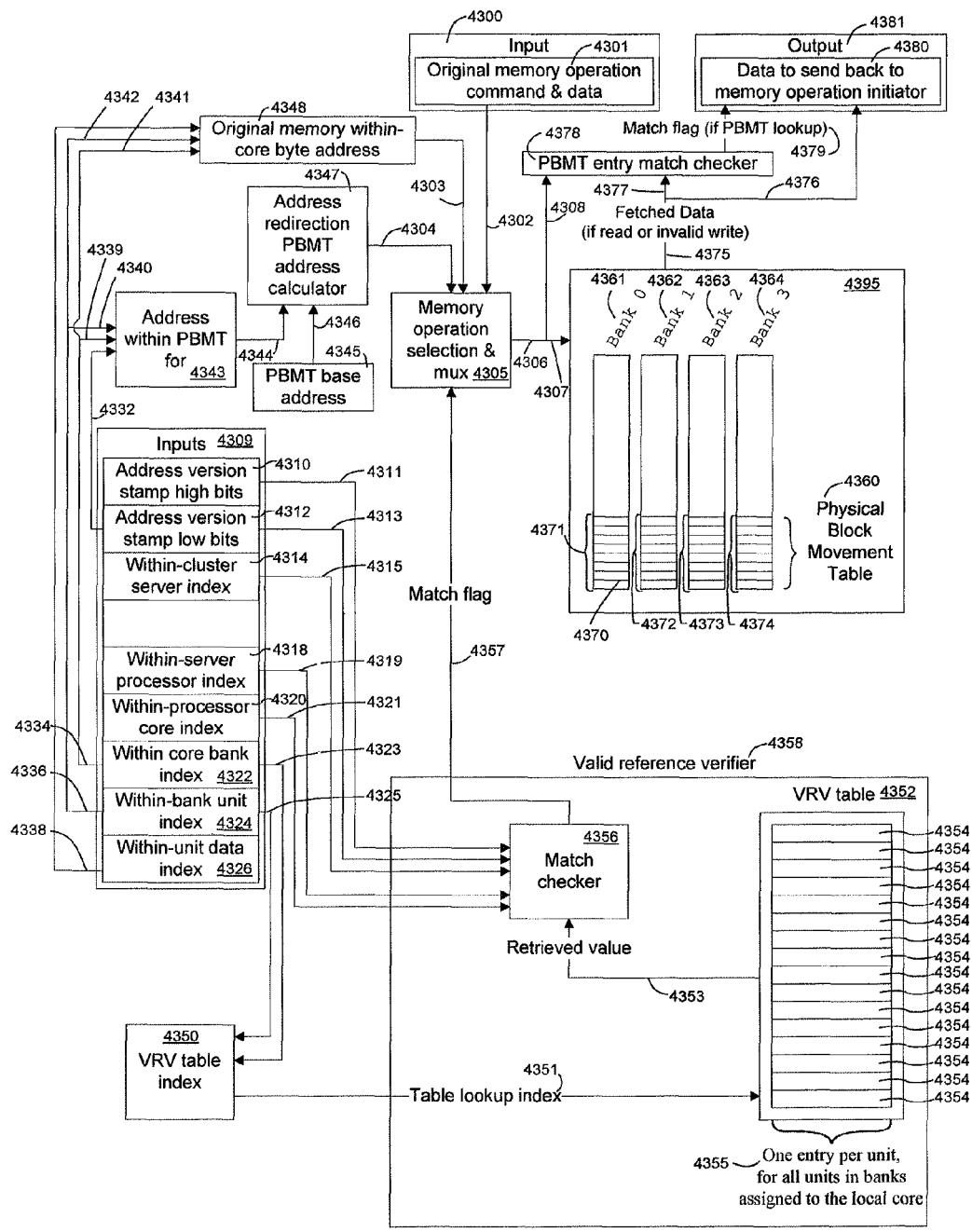
FIG. 43 is an illustration of memory reference verification for a system utilizing the integrated processor core of FIG. 1.

FIG. 43 depicts a preferred embodiment of the system including identifying which bits are used for table indexing and other features. Input 4300 is the Original memory operation command (Load or Store) and data (e.g., the data to write in the case of a Store). The address of the original memory operation is provided in Inputs 4309 and is divided into eight separate pieces including (from least to most significant bit field): within-unit data index (4326), within-bank unit index (4324), within-core bank index (4322), within-processor core index (4320), within-server processor index (4318), within-cluster server index (4314), Address version stamp low bits (4312), and Address version stamp high bits (4310).

FIG. 43 may be described by detailing a process by which the Output 4381 comprising Data to send back to memory operation initiator 4380 is generated from the inputs 4300, 4309. The table index for the Valid reference verifier 4358 is calculated in unit 4350 as the combination of the within-bank unit index 4324 and the within-core bank index 4322 which are received by the VRV table index 4350 as inputs 4325 and 4323 respectively. The VRV table index sends the Table lookup index 4351 to the VRV table 4352, which has "One entry per unit for all units in banks assigned to the local core" 4355. Each entry is designated as 4354. The table lookup index 4351 retrieves the proper entry 4354 from the VR table 4352 which is then sent as the Retrieved value 4353 to the Match checker 4356. The match checker matches the match part of the Retrieved value 4353 with the matching part of the input address 4309, which includes the within-processor core index 4320, within-server processor index 4318, within-cluster server index 4314, Address stamp low bits 4312, and Address version stamp high bits 4310 sent to the Match checker 4356 as inputs 4321, 4319, 4315, 4313, and 4311, respectively. The result of the comparison performed by the Match checker 4356 is output as the Match flag 4357 from the Valid reference verifier 4358 to the Memory operation section & mux unit 4305. Mux 4305 also receives input from the Original memory operation command & data 4301 as input 4302.

The Original memory within-core byte address 4348 is created by combining the values of the within-unit data index 4326, which it receives as input 4338, the within-bank unit index 4324, which it receives as input 4342 from link 4336, and the within-core bank index 4322, which it receives as input 4341 from link 4334. The combination of these three fields within unit 4348 is output 4303 to Memory operation selection & mux unit 4305. The last input received by the Memory operation selection & mux unit 4305 is input 4304, which is output from the Address redirection PBMT address calculator 4347.

The Address redirection PBMT address calculator 4347 calculates its output 4304 by combining the PBMT base address 4345, which it receives as input 4346, which may include striping info (allowing the physically discontiguous PBMT 4360 to be distributed as 4371, 4372, 4373, 4374 across multiple banks 4361, 4362, 4363, 4364, respectively, and appear as a single virtually contiguous address region so as to operate as a single table) so as to distribute the PBMT over the banks appropriately, along with the Address within PBMT 4343 which is provided to it as input 4344. The Address within PBMT 4343 is the table index that is looked up into the PBMT 4360 and is calculated as the combination of bit fields comprising the within-bank unit index 4324 transmitted to it as input 4340 after input 4340 receives it from link 4336, the within-core bank index 4322 as input 4339 after input 4339 receives it from link 4334, and the Address version stamp low bits 4312 received as input 4332.

In the event that the Original memory operation command & data 4301 provided as input 4302 specify that the Valid reference verifier 4358 must produce a match (e.g., a 1-bit value) for the Match flag 4357 in order for the memory operation to proceed normally, then the Memory operation selection & mux 4305 verifies that the Match flag indicates a match and, if so, forwards the Original memory operation command & data 4301 from input 4302 onto output line 4306 combined with the Original memory within-core byte address 4348, which it received as input 4303, which will command the Memory 4395 to perform the Original memory operation command & data. It is noteworthy that the address provided via Input 4309 is a physical address, which will have already been processed by address translators if a virtual memory address space is implemented, and will be post-translation before it becomes Input 4309.

In the event that the Memory operation selection & mux unit 4305 is told that the Valid reference verifier's 4358 Match flag output 4357 must indicate a match in order to perform the normal memory operation, and the Match flag input 4357 indicates "No Match" (e.g., the flag bit is set to zero), the Memory operation selection & mux unit 4305 overrides the normal memory operation with a PBMT lookup. The unit 4305 does this by forwarding the address from unit 4347 provided to it as input 4304 onto the output 4306, which becomes input 4307 to memory 4395. Unit 4305 also outputs the value to be matched by the PBMT entry match checker 4378 via output 4306, which is presented as input 4308 to unit 4378. The value may be the Address version stamp high bits 4310. The unit 4305 also indicates to unit 4378 whether or not the PBMT entry must match. The entry in the PBMT 4370 is an example entry that is looked up in the case that the Valid reference a PBMT lookup is being performed.

The PBMT 4360 distributed pieces 4371-4374 held in memory 4395 within the memory banks 4361-4364 are searched in the event that the Match Flag (4357) indicated "No Match", and the Original memory operation command & data 4301 indicated that a match must occur in order for normal operation to commence. The memory 4395 reads its input 4307 and looks up the value requested, if the operation commanded from input 4307 is a Load (as in the case of a PBMT lookup or a normal Load memory operation) and the value that is read from memory is output onto link 4375, which is sent as input 4377 to unit 4378, and input 4376 to Output 4380. The PBMT entry match checker reads the signal from its input 4308, which indicates whether a PBMT match is to be checked. If the check is to be made, the unit 4378 creates the Match flag output 4379, which is sent to the Output unit 4381. The output unit 4381 sends back the data received from unit 4395 and, if applicable, the Match flag it receives from unit 4378.

Figure 44:
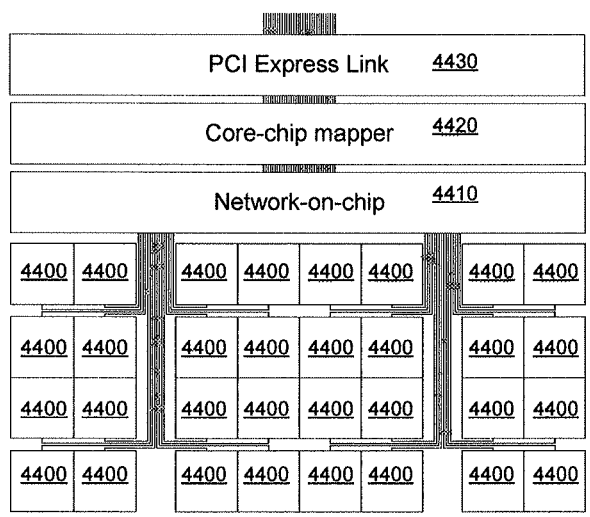
FIG. 44 depicts an exemplary processor chip of a system comprising multiple integrated processor cores of FIG. 1.

FIG. 44 depicts an exemplary processor chip of the system comprising multiple cores 4400 connected to a Network-on-chip 4410. Although shown as a centralized unit, in a preferred embodiment, the Network-on-chip 4410 is implemented as a fat-tree network architecture including many individual network switches, each connecting together some combination of cores and switches (or just cores, or just switches), with the switches distributed amongst the processor cores, where only the higher tier switches that connect together other switches are centralized into a single unit. The network-on-chip 4410 connects to the Core-chip mapper 4420, which connects to off-chip network components via, in this example, PCI Express Link 4430. The chip-to-chip network, which may be implemented using PCI Express chips, connects together multiple processors and other components.

Figure 45:
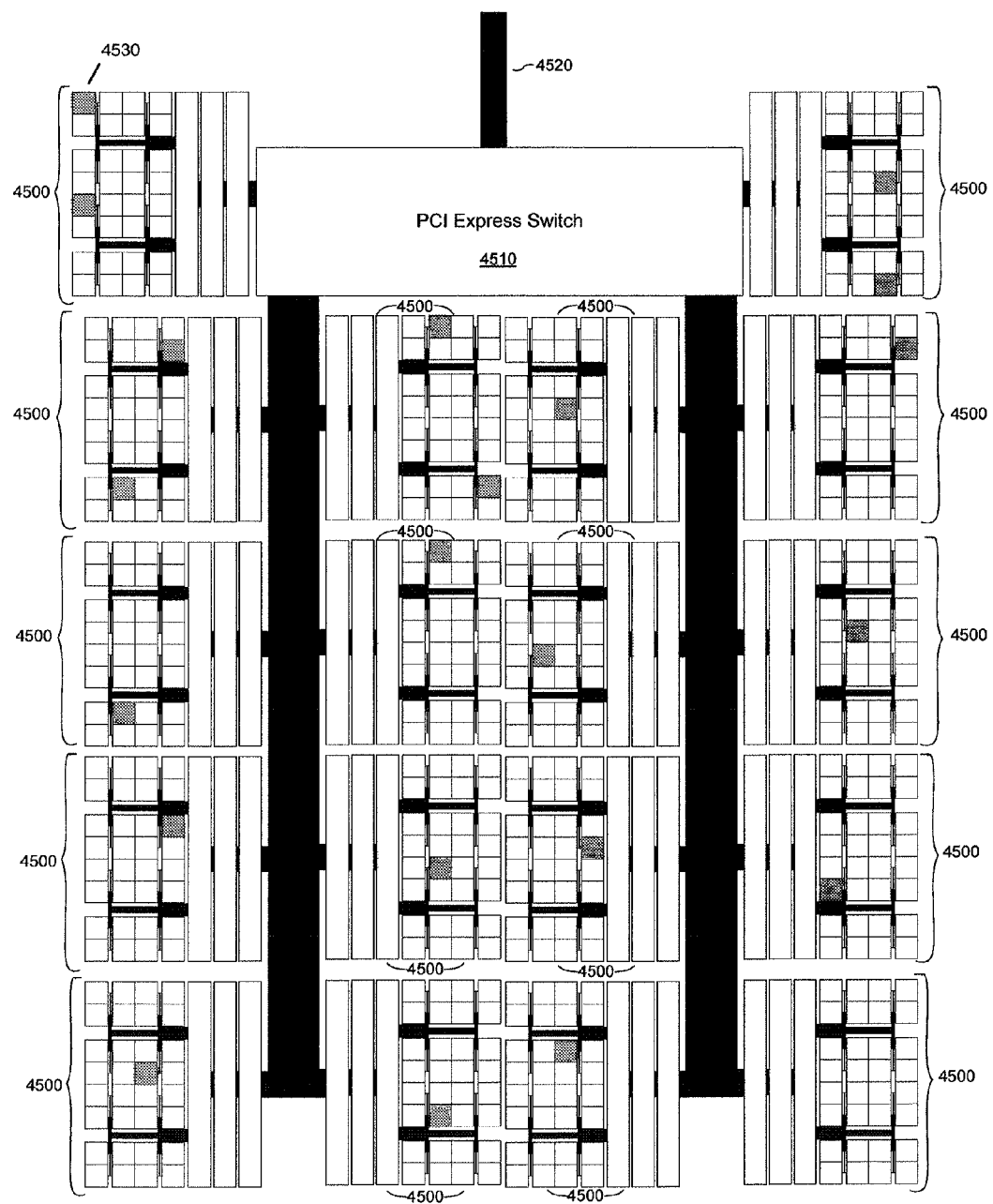
FIG. 45 depicts a printed circuit board (PCB) with multiple integrated processor cores of FIG. 1.

FIG. 45 depicts a printed circuit board (PCB) with multiple processor chips 4500 connected to a PCI Express switch chip 4510 which itself uplinks to a network 4520 connecting together multiple PCI Express Switches. The shaded boxes represent failed processor cores 4530 that do not work and whose memory is inaccessible to the system. Using the memory striping methods of the system to create virtual contiguous memory regions from discontiguous memory units requires a regular layout of the memory banks, which is not available in the system of FIG. 45. The system employs a technique whereby core-chip mappings are remapped in order to provide virtually contiguous address regions using the virtual-to-physical address mapping without suffering from memory holes which the failed cores and their failed memory banks 4530 would otherwise cause.

Figure 46:
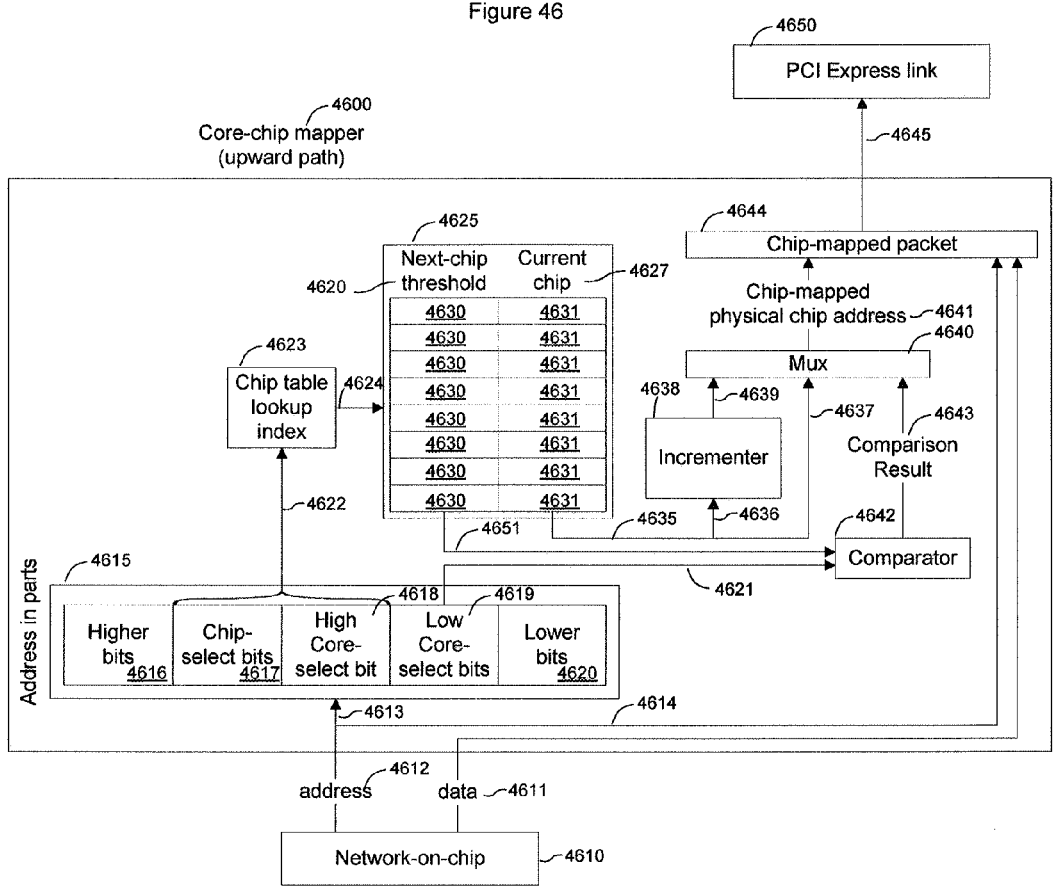
FIG. 46 is an illustration of an exemplary Core-chip mapper of a system comprising multiple integrated processor cores of FIG. 1.

FIG. 46 is an illustration of an exemplary Core-chip mapper 4600, which allows processor cores connected to the Network-on-chip 4610 to send messages to the PCI Express link 4650. The processor cores expect a regular physical memory layout without holes, but the processor chips connected via PCI Express link 4650 may have failed cores that, without the core-chip mapper, would disrupt the virtual-to-physical mapping of the system that implements virtual contiguous memory regions.

The Network-on-chip 4610 sends the address 4612 to the Address-in-parts 4615 unit (broken out for explanatory purposes) as input 4613 and as input 4614 to the Chip-mapped packet 4644. The Address-in-parts breakout 4615 comprises Higher bits 4616, Chip-select bits 4617, the highest Core-select bit 4618, Low Core-select bits 4619, and the Lower bits 4620. The Chip-select bits 4617 and highest Core-select bit 4618 together comprise portion 4622 of the Address in parts 4615, which is the Chip table lookup index 4623. The Chip-table lookup index 4623 is received as input 4624 by table 4625, which maintains the Next-chip threshold values 4626 and Current chip values 4627 for each entry (4630, 4631) in the table 4625. An entry is read from the table 4625 at index 4623 and the corresponding Next-chip threshold value 4630 and Current chip value 4631 for the entry are sent via output lines 4651 and 4635. The Comparator unit receives the Next-chip threshold 4630 via input 4651 and the Low-Core-select bits 4619 via input 4621. If the Low Core-select bits 4619 are less than the Next-chip threshold 4630 then the resulting output of the Comparator 4642, which is Comparison Result 4643, is equal to "Less than" (e.g., a bit flag set to 0). Otherwise the comparison result 4643 is equal to "Greater than or equal" (e.g., a bit flag set to 1). The Comparison Result 4643 is received by the Mux unit 4640 and acts as the mux unit's Select input (one of the standard inputs that a Mux unit receives, which selects which of the other inputs to forward onto the mux unit's output). The Incrementer unit 4638 receives the Current chip value 4631 of the selected entry 4635 via input 4636. The Incrementer creates output 4639 by adding 1 to its input 4636. In this way the output 4639 represents the "Next chip" whereas 4637 represents the "Current chip," since it is the same as value 4635 taken from the Current chip column 4627 of the table 4625.

The Mux unit 4640 determines whether to output the current chip 4637 as the Chip-mapped physical chip address output 4641 or the "Next chip" 4639 based on whether the Comparison Result input 4643 is "Greater than or equal", or "Less Than" respectively. This means that if input 4643 is "Less than," then the current chip is forward onto output 4641. Otherwise, the "Next chip" 4639 is output. The Chip-mapped packet 4644 receives the Chip-mapped physical chip address 4641 as well as the address 4614 and data 4611 as input and creates output 4645 which is sent to the PCI Express link.

Figure 47:
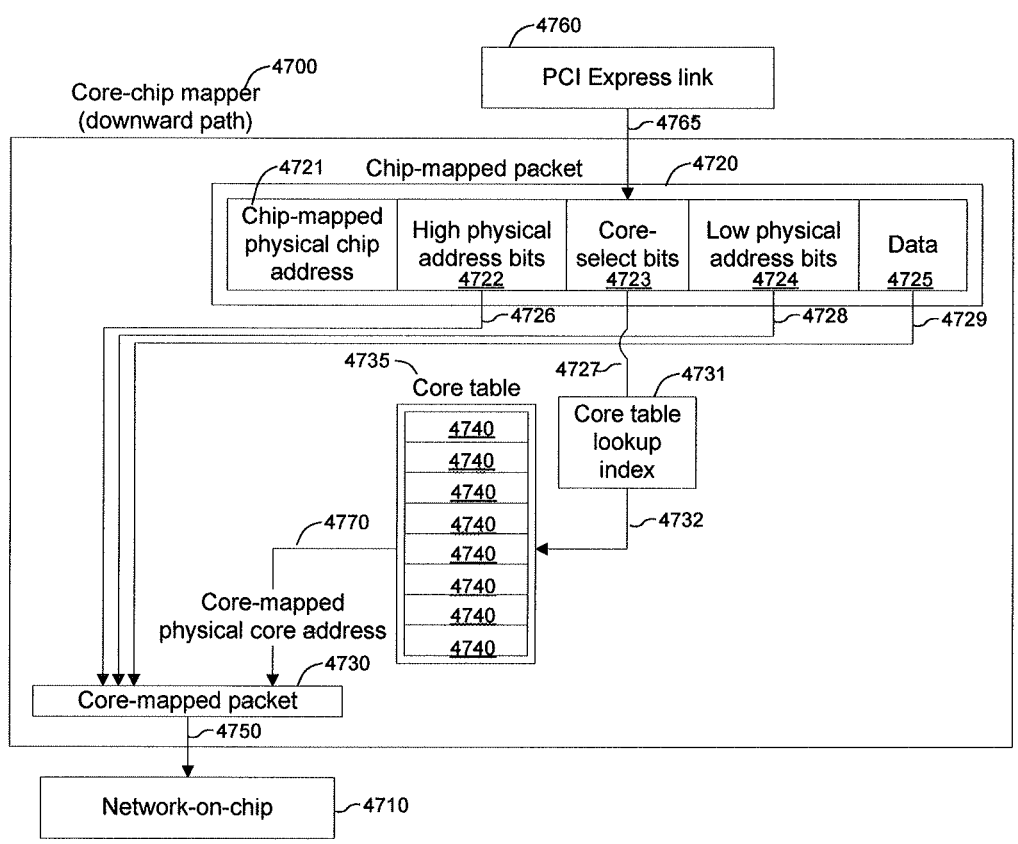
FIG. 47 depicts the Core-chip mapper of a system comprising multiple integrated processor cores of FIG. 1.
Figure 48:
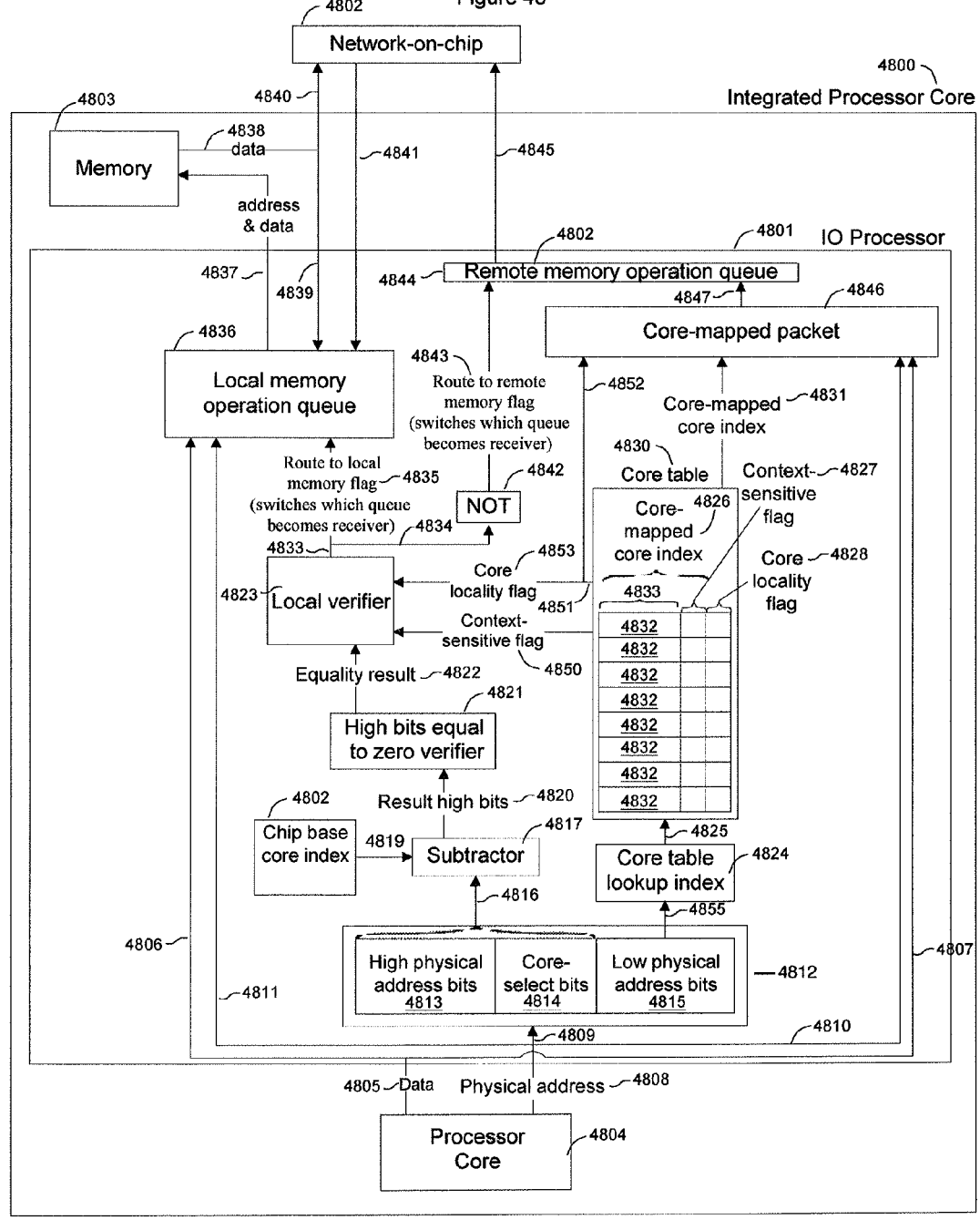
FIG. 48 is an illustration of exemplary components for carrying out core-to-core mapping in an Integrated Processor Core of a system comprising multiple integrated processor cores of FIG. 1.

The Core-chip mapper (upward path) 4600 and its internal table 4625 allow chips that contain a number of functional cores between two adjacent powers of two, such as between 16 and 32 functional cores (inclusive), to continue to be able to contribute their memory to a Shared memory system supporting the system's striping address scheme and its ability to create virtual contiguous memory regions from physically discontiguous units of memory. FIGS. 46-48, and the associated descriptions, describe how the mapping system could compensate for chips with a variable number of functional cores and memory banks. In essence, the input Chip-select bits 4617 are remapped in the Chip-mapped packet 4644 so that non-functional cores and memory banks are not associated with virtual address space.

As an example, suppose we have a system with four chips, each supporting 32 cores, except for the second, which supports only 20 cores. In this case the first entry of table 4625 would have a Next-chip threshold of 32 and a Current chip value of 0. (In an alternative implementation that saves implementation space by not requiring support for Next-chip-thresholds larger than 31, the same the next-chip threshold is set to 0 and the current-chip is set to −1 so that the Incrementer value 4638 will always be taken and will be equal to 0.) The second entry would have a Next-chip threshold value of 20 and a current chip value of 1. The third entry would have a next-chip threshold value of 20 and a current chip value of 2. The fourth entry would have a next-chip threshold value of 20 and a current chip value of 3. In this way, four processors create a logically contiguous set of cores even though each processor supports an arbitrary number of cores between two adjacent powers of two.

FIG. 47 depicts the Core-chip mapper (downward path) 4700, whereby packets arriving from the PCI Express link 4760 are conveyed to the Network-on-chip 4710 after remapping performed internal to the Core-chip mapper downward path 4700. The Chip-mapped packet 4720 is received from the PCI Express link 4760 via link 4765. The packet 4720 comprises five sections, including: a Chip-mapped-physical chip address 4721, High physical address bits 4722, Core-select bits 4723, Low physical address bits 4724, and Data 4725. The High physical address bits 4722, Low physical address bits 4724, and Data 4725 are all forwarded to the Core-mapped packet via links 4726, 4728, and 4729. The core-mapped physical core address 4770 portion of the Core-mapped packet 4730 is derived directly from the Core table map 4735. This remapping enables the packet go to the correct on-chip core even though the chip may have an irregular number of cores functioning, such as 27 out of 32 cores working. The Core-select bits 4723 from the original physical address are sent via 4727 as the Core table lookup index 4731 which are input 4732 to the Core table 4735.

An example Core table can be considered. In this example, the number of cores per chip is always between 16 and 32 inclusive, and the number of functioning cores that occur in processors with lower processor indices than the example processor number 150. When the physical address Core-select bits are equal to 150 (the 151$^{st}$ core), which has binary representation 0b 1001 0110, the bits "10110" must be translated to the proper on-chip core index, which is Core 0. Since 150 should map to the first core on the chip (Core 0), the entry in Core table at index 0bxxx10110 (a value of 22 in the least significant 5 bits) is 0. The entry at 0bxxx10111 (the entry 4740 in the Core table 4735 at index 23) should be 1, and so on, with wrap-around after 0bxxx11111 (entry at index 31, which should be 9), so that the entry 4740 at index 0bxxx00000 should have value 10. This proceeds until 0bxxx10101 (index 21) has value 31. If fewer than 32 cores are implemented on the chip, then, in fact, no packets 4720 will arrive from the PCI Express link that designate a Core-select 4723 value (or Core table lookup index 4731) as 31, so the translation which maps to a missing core will in fact never be used.

After the mapping process, the Core-mapped packet 4730 proceeds via link 4750 onto the Network-on-chip 4710 where it can be routed to the particular core, and eventually the particular bank of that particular core, to which it applies.

FIG. 48 is an illustration of exemplary components for carrying out core-to-core mapping in an Integrated Processor Core 4800, which enables a variable number of cores to be functioning per processor chip while preserving the ability to use the virtual contiguous memory region translation scheme. In the example of FIG. 48, a Processor Core 4804 sends a Physical address 4808 and Data 4805 to its local IO Processor 4801. The IO Processor interfaces with a Memory 4803 by sending it address & data output 4837 and receiving data output 4838 from Memory 4803 and received as input 4839. The Memory 4803 also sends data 4838 to the Network-on-chip 4802, which is received as input 4840. Finally, the IO processor 4801 interfaces with the Network-on-chip 4802 by receiving input 4841 and sending output via 4845.

The Local memory operation queue 4836 receives memory operations from the Network-on-chip 4802 via input 4841 and also from the Processor Core 4804 via 4806 and 4811. The Input 4835 to the Local memory operation queue determines whether the Data 4806 and Physical address 4811 will be appended to the internal data queue structure. If the "Route to local memory flag (switches which queue becomes receiver)" 4835 indicates "Local" (such as if the flag bit of 4835 is set to 1), then 4806 and 4811 are added as a memory operation to the Local memory operation queue 4836. The majority of the components remaining to be described in FIG. 48 carry out the determination as to whether the memory operation should be routed locally and if not, whether it should be routed off-chip, or which core the memory operation should be sent to if it should be sent to an on-chip core.

The Physical address 4808 is conveyed to 4812 via 4809, where it is shown as three components: High physical address bits 4813, Core-select bits 4814, and Low physical address bits 4815. The High physical address bits 4813 and Core-select bits 4814 merge to provide input to the Subtractor 4817 as input 4816. As described previously, the shared memory address space orders all of the cores from 0 to the total number of cores in the Shared memory address space minus 1. The number of the core is its index. The core on a chip with the lowest index of all cores on the chip is the Chip base core index value, which is stored in unit 4818 so that it can be read by the Subtractor 4817 via 4819. The Subtractor 4817 subtracts the Chip base core index 4818 from the higher address bits presented in 4816 which produces the Result high bits output 4820.

The "High bits equal to zero verifier" 4821 receives the Result high bits 4820 and verifies that the bits not needed to index on-chip cores (e.g., all bits of Result high bits, except the bottom five bits in the case that the chip has between 16 and 32 cores) are equal to zero. The "Equality result" 4822 is set by unit 4821 as either "equal to zero" or "not equal to zero". The Core table index 4824 is derived from the Low physical address bits 4815 via 4855 and is presented to the Core table 4830 as input 4825.

The Core table 4830 has a number of entries 4832, each with three attributes (columns): column 4833, a Context-sensitive flag (4827) and a Core locality flag 4828. The Core-mapped core index 4826 is derived from attribute 4833 and the Context-sensitive flag 4827. The Core locality flag 4853 signals whether the Context-sensitive flag 4850 has special meaning and, if not, the Core-mapped core index 4826 maintains its significance. Using the Core table lookup index 4824 an entry 4832 is selected in the Core table 4830, whose Context-sensitive flag is sent to the Local verifier 4823 via 4850. The selected entry's Core locality flag is transmitted as output 4851 where it is directed to the Local verifier 4823 as input 4853, and to the Core-mapped packet 4846 as input 4852. The Core-mapped core index 4826 is sent as output 4831 to the Core-mapped packet 4846.

The Local verifier 4823 reads the Core locality flag 4853, which is set to 1 when the core represented by the table is either remote, or the core originating the memory operation 4800. The Core locality flag 4828 for the selected entry is set to 0 in the case that the core corresponding to the Core table lookup index 4824 is on-chip but is not the local core 4800. In the case that the Local verifier receives a Core locality flag 4853 of zero, the unit 4823 outputs "Not-local," which may be implemented as a flag bit equal to 0. If the Core locality flag 4853 is set to 1, the Context-sensitive flag 4850 is consulted and, if it is set to "Local core" (e.g., a flag value of 1), the output 4833 of the Local verifier unit 4823 is set to "Local" (flag value 1). If the Core locality flag 4853 is set to 1, the Context-sensitive flag 4850 is set to "Remote Core" (e.g., a flag value of 0) and the output 4833 of the Local verifier unit 4823 is set to "Remote" (flag value 0).

If the output 4833 of the Local verifier 4823 is "Local," then the Local memory operation queue 4836 receives this information as input 4835 and appends the memory operation corresponding to that sent by the Processor Core 4804, which is received over 4806 and 4811 is appended to the Local memory operation queue 4836. In one preferred embodiment, the Local memory operation queue 4836 maintains an "originating locally" queue, which is added-to based on the flag 4835, and an "originating remotely" queue, which has memory operations originating from the Network-on-chip 4802 appended to it. In this embodiment, the "originating locally" may be assigned higher priority, or temporary priority may be assigned to either queue in order to control which memory operations are performed most quickly.

The Remote memory operation queue 4844 directs memory operations originating from the Processor Core 4804 that are bound for the network-on-chip 4802 which are destined for a different core on the same chip or for a core on a different processor. Core-mapped packets 4846 received as input 4847 are appended to the Remote memory operation queue 4844 for sending to the Network-on-chip 4802 via 4845 if the output of the Local verifier 4834, which is inverted in NOT unit 4842, indicates that the message is bound for a core that is not the local core. The memory operation originating from the Processor core 4804 arrives at the Core-mapped packet via 4810 and 4807. The Core-mapped core index is adjusted in the Core-mapped packet with the Core-mapped core index 4831, which allows cores to know the indices of the other cores onboard the physical chip even when the physical address space is expected to be contiguous and without holes (such as when utilizing the virtual contiguous address region scheme). The core-mapped core index skips cores that are on-chip but not functional, thereby maintaining a contiguous and regular physical address space even when actual hardware cores may be non-functional.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. A method of allocating memory comprising:
   receiving, from a process being executed by a first processor, a request for memory allocation, the request comprising a requested size;
   identifying an available virtually-contiguous physically-non-contiguous memory region (VCPNCMR) of at least the requested size, wherein the VCPNCMR is arranged such that physical memory addresses for the VCPNCMR may be derived from a corresponding virtual memory addresses by:
      shifting a contiguous set of bits of the virtual memory address, wherein the shifting is performed in accordance with information regarding memory address translation associated with a determined matching row of a virtual memory address matching table; and
      combining the shifted contiguous set of bits of the virtual memory address with high-order physical memory address bits associated with the determined matching row of the virtual memory address matching table, and with low-order bits of the virtual memory address; and
   providing to the requesting process a starting address of the identified VCPNCMR of at least the requested size.

2. The method of claim 1 further comprising:
   adding a row to the virtual memory address matching table for the identified VCPNCMR.

3. The method of claim 2 wherein the added row of the virtual memory address matching table comprises a memory address matching pattern and information regarding memory address translation comprising information regarding a range of contiguous bits to be shifted and a degree of shift.

4. The method of claim 1 wherein identifying an available VCPNCMR of at least the requested size comprises:
   responsive to a determination that more than one VCPNCMR of the same sufficient size is available, selecting the VCPNCMR for which the most memory units would need to be deallocated to allow merge of the selected VCPNCMR with another VCPNCMR.

5. The method of claim 4 wherein identifying an available VCPNCMR of at least the requested size further comprises:
   responsive to a determination that all VCPNCMRs of the same sufficient size would require the same number of units to be deallocated to allow merge of the VCPNCMR with another VCPNCMR, selecting the VCPNCMR requiring the largest number of memory units to be deallocated to enable a subsequent merge.

6. The method of claim 5 wherein identifying an available VCPNCMR of at least the requested size further comprises:
   responsive to a determination that the VCPNCMRs requiring the same number of memory units to be deallocated to allow merge of the VCPNCMR with another VCPNCMR also require the same number of memory units to be deallocated to enable a subsequent merge, selecting one of those VCPNCMRs randomly.

7. The method of claim 1 wherein the VCPNCMR comprises corresponding portions of at least two memory banks associated with the first processor.

8. The method of claim 1 wherein the VCPNCMR comprises corresponding physical regions of each of a plurality of memory banks, the combined corresponding regions having a combined size of at least the requested size.

9. The method of claim 8 wherein the VCPNCMR comprises corresponding physical regions of each of a plurality of memory banks comprising all memory banks of each of a plurality of processors.

10. The method of claim 9 wherein the VCPNCMR comprises corresponding physical regions of each of a plurality of memory banks comprising all memory banks of each of a plurality of processors comprising all processors of each of a plurality of processor cards.

11. The method of claim 10 wherein the VCPNCMR comprises corresponding physical regions of each of a plurality of memory banks comprising all memory banks of each of a plurality of processors comprising all processors of each of a plurality of processor cards comprising all processor cards of each of a plurality of servers.

12. The method of claim 1 wherein identifying an available VCPNCMR of at least the requested size comprises:
    traversing a data structure of unallocated VCPNCMRs; and
    selecting an unallocated VCPNCMR of at least the selected size.

13. The method of claim 12 wherein the data structure of unallocated VCPNCMRs comprises information regarding unallocated VCPNCMRs comprising physical memory local to the first processor.

14. The method of claim 12 further comprising:
    maintaining a data structure of unallocated VCPNCMRs comprising memory regions that are addressable by a contiguous set of virtual memory addresses but span discontiguous physical memory locations.

15. The method of claim 14 wherein the data structure of unallocated VCPNCMRs is stored as a tree structure.

16. The method of claim 14 further comprising:
    removing the selected VCPNCMR from the data structure of unallocated VCPNCMRs.

17. The method of claim 14 further comprising:
    adding an entry for at least a portion the selected VCPNCMR that exceeds the requested size to the data structure of unallocated VCPNCMRs.

18. The method of claim 1 wherein the first processor comprises an integer number of virtual processors that is a multiple of four and is associated with a memory comprising a number of banks that is a multiple of two.

19. The method of claim 5 wherein each memory unit comprises 64 kB of memory and each memory bank comprises 1 MB of memory.

20. A system for allocating memory comprising:
    a second processor for executing program code for a memory allocation process, the program code causing the processor to perform the steps of:
       receiving, from a process being executed by a first processor, a request for memory allocation, the request comprising a requested size;
       identifying an available virtually-contiguous physically-non-contiguous memory region (VCPNCMR) of at least the requested size, wherein the VCPNCMR is arranged such that physical memory addresses for the VCPNCMR may be derived from a corresponding virtual memory addresses by:
          shifting a contiguous set of bits of the virtual memory address, wherein the shifting is performed in accordance with information regarding memory address translation associated with a determined matching row of a virtual memory address matching table; and combining the shifted contiguous set of bits of the virtual memory address with high-order physical memory address bits associated with the determined matching row of the virtual memory address matching table, and with low-order bits of the virtual memory address; and providing to the requesting process a starting address of the identified VCPNCMR of at least the requested size.

* * * * *